United States Patent
Wilbert et al.

(10) Patent No.: US 11,436,652 B1
(45) Date of Patent: Sep. 6, 2022

(54) SYSTEM AND METHOD FOR ELECTRONIC PROCESSING OF VEHICLE TRANSACTIONS BASED ON IMAGE DETECTION OF VEHICLE LICENSE PLATE

(71) Applicant: Blinker, Inc., Denver, CO (US)

(72) Inventors: Anthony Russell Wilbert, Denver, CO (US); David Ching-Chien Chung, San Francisco, CA (US); Hans Brandon Wach, Longmont, CO (US); Goran Matko Rauker, Longmont, CO (US); Solomon John White, Parker, CO (US)

(73) Assignee: Blinker Inc., Denver, CO (US)

( * ) Notice: Subject to any disclaimer, the term of this patent is extended or adjusted under 35 U.S.C. 154(b) by 0 days.

(21) Appl. No.: 17/110,219

(22) Filed: Dec. 2, 2020

Related U.S. Application Data

(63) Continuation of application No. 15/785,741, filed on Oct. 17, 2017, now Pat. No. 10,867,327, which is a
(Continued)

(51) Int. Cl.
*G06Q 30/06* (2012.01)
*G06V 20/62* (2022.01)
*H04L 67/12* (2022.01)

(52) U.S. Cl.
CPC ..... *G06Q 30/0609* (2013.01); *G06Q 30/0611* (2013.01); *G06Q 30/0641* (2013.01);
(Continued)

(58) Field of Classification Search
None
See application file for complete search history.

(56) References Cited

U.S. PATENT DOCUMENTS 3,544,771 A 12/1970 O'Meara
3,550,084 A 12/1970 Bigelow et al.
(Continued)

FOREIGN PATENT DOCUMENTS

CN 103985256 A 8/2014
CN 204303027 U 4/2015
(Continued)

OTHER PUBLICATIONS

US 7,970,635 B1, 06/2011, Medina et al. (withdrawn)
(Continued)

*Primary Examiner* — Anand P Bhatnagar
(74) *Attorney, Agent, or Firm* — ArentFox Schiff LLP

(57) ABSTRACT

A system and method is provided for automatically identifying a vehicle and facilitating a transaction related to the vehicle. The system includes a first computing apparatus having an image sensor that captures optical images of a vehicle and an interface that transmits the captured optical image. The system further includes a remote server that receives the transmitted and captured optical image, automatically scans the captured optical image to identify one or more distinguishing features of the vehicle, automatically compares the identified distinguishing features with a unique feature database that includes respective vehicle identification information associated with unique vehicle features, automatically identify the vehicle identification information that corresponds to the vehicle upon determining a match, automatically identify vehicle configuration information based on the identified vehicle identification information, and automatically transmit the identified vehicle configuration information to the first computing apparatus to be displayed thereon.

10 Claims, 43 Drawing Sheets

Related U.S. Application Data continuation-in-part of application No. 15/363,960, filed on Nov. 29, 2016, now Pat. No. 9,818,154, which is a continuation-in-part of application No. 14/716,808, filed on May 19, 2015, now Pat. No. 9,754,171, and a continuation-in-part of application No. 14/716,738, filed on May 19, 2015, now Pat. No. 9,607,236, and a continuation-in-part of application No. 14/716,743, filed on May 19, 2015, now Pat. No. 9,779,318, and a continuation-in-part of application No. 14/716,793, filed on May 19, 2015, now Pat. No. 10,572,758, and a continuation-in-part of application No. 14/716,651, filed on May 19, 2015, now Pat. No. 9,589,201, and a continuation-in-part of application No. 14/716,445, filed on May 19, 2015, now Pat. No. 9,563,814, said application No. 14/716,808 is a continuation-in-part of application No. 14/613,323, filed on Feb. 3, 2015, now Pat. No. 10,579,892, said application No. 14/716,738 is a continuation-in-part of application No. 14/613,323, filed on Feb. 3, 2015, now Pat. No. 10,579,892, said application No. 14/716,743 is a continuation-in-part of application No. 14/613,323, filed on Feb. 3, 2015, now Pat. No. 10,579,892, said application No. 14/716,793 is a continuation-in-part of application No. 14/613,323, filed on Feb. 3, 2015, now Pat. No. 10,579,892, said application No. 14/716,651 is a continuation-in-part of application No. 14/613,323, filed on Feb. 3, 2015, now Pat. No. 10,579,892, said application No. 14/716,445 is a continuation-in-part of application No. 14/613,323, filed on Feb. 3, 2015, now Pat. No. 10,579,892, which is a continuation-in-part of application No. 14/455,841, filed on Aug. 8, 2014, now abandoned, and a continuation-in-part of application No. 14/318,397, filed on Jun. 27, 2014, now abandoned.

(52) U.S. Cl.
CPC ............ *G06V 20/62* (2022.01); *G06V 20/625* (2022.01); *H04L 67/12* (2013.01)

(56) References Cited

U.S. PATENT DOCUMENTS

| | | |
|---|---|---|
| 4,817,166 A | 3/1989 | Gonzalez et al. |
| 5,227,803 A | 7/1993 | O'Connor et al. |
| 5,579,008 A | 11/1996 | Hulderman et al. |
| 5,579,021 A | 11/1996 | Lee |
| 5,651,075 A | 7/1997 | Frazier et al. |
| 5,706,457 A | 1/1998 | Dwyer et al. |
| 5,708,425 A | 1/1998 | Dwyer et al. |
| 5,734,337 A | 3/1998 | Kupersmit |
| 5,864,306 A | 1/1999 | Dwyer et al. |
| 5,963,253 A | 10/1999 | Dwyer |
| 6,081,206 A | 6/2000 | Kielland |
| 6,140,941 A | 10/2000 | Dwyer et al. |
| 6,339,651 B1 | 1/2002 | Tian et al. |
| 6,404,902 B1 | 6/2002 | Takano et al. |
| 6,536,961 B1 | 3/2003 | Gillies |
| 6,571,279 B1 | 5/2003 | Herz |
| 6,622,131 B1 | 9/2003 | Brown et al. |
| 6,705,521 B1 | 3/2004 | Wu et al. |
| RE38,626 E | 10/2004 | Kielland |
| 6,814,284 B2 | 11/2004 | Ehlers et al. |
| 6,847,965 B2 | 1/2005 | Walker et al. |
| 6,922,156 B2 | 7/2005 | Kavner |
| 7,016,518 B2 | 3/2006 | Vernon |
| 7,046,169 B2 | 5/2006 | Bucholz |
| 7,053,792 B2 | 5/2006 | Aoki et al. |
| 7,076,349 B2 | 7/2006 | Davidson et al. |
| 7,104,447 B1 | 9/2006 | Lopez et al. |
| 7,124,006 B2 | 10/2006 | Davidson et al. |
| 7,136,828 B1 | 11/2006 | Allen et al. |
| 7,146,345 B2 | 12/2006 | Weik, III et al. |
| 7,171,049 B2 | 1/2007 | Snapp |
| 7,174,044 B2 | 2/2007 | Ding et al. |
| 7,253,946 B2 | 8/2007 | Bellonard et al. |
| 7,262,790 B2 | 8/2007 | Bakewell |
| 7,265,656 B2 | 9/2007 | McMahon et al. |
| 7,301,115 B2 | 11/2007 | Elliot et al. |
| 7,302,098 B2 | 11/2007 | Tang et al. |
| 7,319,379 B1 | 1/2008 | Melvin |
| 7,339,495 B2 | 3/2008 | Kavner |
| 7,346,222 B2 | 3/2008 | Lee et al. |
| 7,346,553 B2 | 3/2008 | Barnett |
| 7,347,368 B1 | 3/2008 | Gravelle et al. |
| 7,355,527 B2 | 4/2008 | Franklin et al. |
| 7,359,553 B1 | 4/2008 | Wendt et al. |
| 7,367,058 B2 | 4/2008 | Lawson et al. |
| 7,377,426 B1 | 4/2008 | Makeever |
| 7,407,097 B2 | 8/2008 | Robinson et al. |
| 7,412,078 B2 | 8/2008 | Kim |
| 7,424,968 B2 | 9/2008 | Meyerhofer et al. |
| 7,428,337 B2 | 9/2008 | Gao et al. |
| 7,433,764 B2 | 10/2008 | Janssen |
| 7,436,437 B2 | 10/2008 | Fletcher et al. |
| 7,439,847 B2 | 10/2008 | Pederson |
| 7,460,028 B2 * | 12/2008 | Garibotto ............... G08G 1/017 340/425.5 |
| 7,482,910 B2 | 1/2009 | Melvin |
| 7,504,965 B1 * | 3/2009 | Windover ............ G08G 1/0175 340/933 |
| 7,522,766 B2 | 4/2009 | Ishidera |
| 7,539,331 B2 | 5/2009 | Wendt et al. |
| 7,542,588 B2 | 6/2009 | Ekin et al. |
| 7,579,965 B2 | 8/2009 | Bucholz |
| 7,583,858 B2 | 9/2009 | Gallagher |
| 7,630,515 B2 | 12/2009 | Takahashi et al. |
| 7,646,895 B2 | 1/2010 | Haupt et al. |
| 7,676,392 B2 | 3/2010 | Hedley et al. |
| 7,679,497 B1 | 3/2010 | Arant |
| 7,693,629 B2 | 4/2010 | Kawasaki |
| 7,710,452 B1 | 5/2010 | Lindberg |
| 7,711,150 B2 | 5/2010 | Simon |
| 7,714,705 B2 | 5/2010 | Rennie et al. |
| 7,725,348 B1 | 5/2010 | Allen et al. |
| 7,734,097 B1 | 6/2010 | Porikli et al. |
| 7,734,500 B1 | 6/2010 | Allen et al. |
| 7,738,706 B2 | 6/2010 | Aradhye et al. |
| 7,739,000 B2 | 6/2010 | Kevaler |
| 7,751,975 B2 | 7/2010 | Allen et al. |
| 7,774,228 B2 | 8/2010 | Robinson et al. |
| 7,778,447 B2 | 8/2010 | Takahashi et al. |
| 7,812,711 B2 | 10/2010 | Brown et al. |
| 7,813,581 B1 | 10/2010 | Fitzpatrick et al. |
| 7,860,344 B1 | 12/2010 | Fitzpatrick et al. |
| 7,860,639 B2 | 12/2010 | Yang |
| 7,881,498 B2 | 2/2011 | Simon |
| 7,890,355 B2 | 2/2011 | Gay et al. |
| 7,893,963 B2 | 2/2011 | Gallagher et al. |
| 7,902,978 B2 | 3/2011 | Pederson |
| 7,908,237 B2 | 3/2011 | Angell et al. |
| 7,925,440 B2 | 4/2011 | Allen et al. |
| 7,933,455 B2 | 4/2011 | Haupt et al. |
| 7,970,644 B2 | 6/2011 | Hedley et al. |
| 7,982,634 B2 | 7/2011 | Arrighetti |
| 7,987,103 B2 | 7/2011 | Gay et al. |
| 7,991,629 B2 | 8/2011 | Gay et al. |
| 8,009,870 B2 | 8/2011 | Simon |
| 8,019,629 B1 | 9/2011 | Medina, III et al. |
| 8,044,824 B2 | 10/2011 | Vu et al. |
| 8,059,864 B2 | 11/2011 | Huang et al. |
| 8,089,340 B2 | 1/2012 | Cochran et al. |
| 8,094,887 B2 | 1/2012 | Axemo et al. |
| 8,101,677 B2 | 1/2012 | Angell et al. |
| 8,120,473 B2 | 2/2012 | Rennie et al. |
| RE43,245 E | 3/2012 | Ouimet et al. |
| 8,155,384 B2 | 4/2012 | Chew |

(56) References Cited

U.S. PATENT DOCUMENTS

| | | | |
|---|---|---|---|
| 8,175,917 B2 | 5/2012 | Flynn et al. |
| 8,203,425 B1 | 6/2012 | Medina et al. |
| 8,218,822 B2 | 7/2012 | Sefton |
| 8,218,871 B2 | 7/2012 | Angell et al. |
| 8,229,168 B2 | 7/2012 | Geva et al. |
| 8,229,171 B2 | 7/2012 | Takahashi et al. |
| 8,238,610 B2 | 8/2012 | Shah et al. |
| 8,254,631 B2 | 8/2012 | Bongard |
| 8,260,002 B2 | 9/2012 | Almbladh |
| 8,260,639 B1 | 9/2012 | Medina, III et al. |
| 8,265,963 B1 | 9/2012 | Hanson et al. |
| 8,265,988 B2 | 9/2012 | Hedley et al. |
| 8,279,088 B2 | 10/2012 | Khim |
| 8,284,037 B2 | 10/2012 | Rennie et al. |
| 8,284,996 B2 | 10/2012 | Winkler |
| 8,290,213 B2 | 10/2012 | Chen et al. |
| 8,307,037 B2 | 11/2012 | Bain et al. |
| 8,311,856 B1 | 11/2012 | Hanson et al. |
| 8,321,264 B2 | 11/2012 | Goldmann et al. |
| 8,330,769 B2 | 12/2012 | Moore et al. |
| 8,331,621 B1 | 12/2012 | Allen et al. |
| 8,345,921 B1 | 1/2013 | Frome et al. |
| 8,346,578 B1 | 1/2013 | Hopkins, III et al. |
| 8,364,439 B2 | 1/2013 | Mintz et al. |
| 8,473,332 B2 | 1/2013 | Robinson et al. |
| 8,369,653 B1 | 2/2013 | Cohen |
| 8,380,389 B2 | 2/2013 | Wright et al. |
| 8,384,560 B2 | 2/2013 | Malarky |
| 8,401,327 B2 | 3/2013 | Almbladh |
| 8,401,343 B2 | 3/2013 | Braun |
| 8,411,992 B2 | 4/2013 | Hamada et al. |
| 8,417,035 B2 | 4/2013 | Angell et al. |
| 8,437,551 B2 | 5/2013 | Noonan et al. |
| 8,441,535 B2 | 5/2013 | Morin |
| 8,447,112 B2 | 5/2013 | Paul et al. |
| 8,457,408 B2 * | 6/2013 | Challa ............... G06K 9/3258 |
| | | 382/190 |
| 8,463,642 B2 | 6/2013 | Hedley et al. |
| 8,473,333 B2 | 6/2013 | Robinson et al. |
| 8,478,480 B2 | 7/2013 | Mian et al. |
| 8,493,216 B2 | 7/2013 | Angell et al. |
| 8,497,769 B2 | 7/2013 | Rennie et al. |
| 8,502,698 B2 | 8/2013 | Chen et al. |
| 8,504,415 B2 | 8/2013 | Hedley |
| 8,508,341 B2 | 8/2013 | Kohli et al. |
| 8,527,305 B1 | 9/2013 | Hanson et al. |
| 8,543,285 B2 | 9/2013 | Allen et al. |
| 8,548,201 B2 | 10/2013 | Toon et al. |
| 8,571,751 B1 | 10/2013 | Blair |
| 8,571,895 B1 | 10/2013 | Medina, III et al. |
| 8,577,184 B2 | 11/2013 | Young |
| 8,577,344 B2 | 11/2013 | Kobylarz |
| 8,581,922 B2 | 11/2013 | Moore et al. |
| 8,582,832 B2 | 11/2013 | Angell et al. |
| 8,587,454 B1 | 11/2013 | Dearworth |
| 8,588,470 B2 | 11/2013 | Rodriguez Serrano et al. |
| 8,593,521 B2 | 11/2013 | Schofield et al. |
| 8,625,853 B2 | 1/2014 | Carbonell et al. |
| 8,629,755 B2 | 1/2014 | Hashim-Waris |
| 8,630,497 B2 | 1/2014 | Badawy et al. |
| 8,637,801 B2 | 1/2014 | Schofield et al. |
| 8,639,433 B2 | 1/2014 | Meis et al. |
| 8,660,890 B2 | 2/2014 | Hedley |
| 8,665,079 B2 | 3/2014 | Pawlicki et al. |
| 8,666,196 B2 | 3/2014 | Young |
| 8,682,066 B2 | 3/2014 | Milgrom et al. |
| 8,693,733 B1 * | 4/2014 | Harrison ............ G06Q 30/0265 |
| | | 382/105 |
| 8,694,341 B1 | 4/2014 | Hanson et al. |
| 8,698,895 B2 | 4/2014 | Nerayoff et al. |
| 8,704,682 B1 | 4/2014 | Chau |
| 8,704,889 B2 | 4/2014 | Hofman |
| 8,704,948 B2 | 4/2014 | Mountain |
| 8,712,630 B2 | 4/2014 | Walwer |
| 8,712,803 B1 | 4/2014 | Buentello |
| 8,712,806 B1 | 4/2014 | Medina, III et al. |
| 8,713,121 B1 | 4/2014 | Bain et al. |
| 8,725,542 B1 | 5/2014 | Hanson et al. |
| 8,725,543 B1 | 5/2014 | Hanson et al. |
| 8,730,066 B2 | 5/2014 | Malarky |
| 8,731,244 B2 | 5/2014 | Wu |
| 8,744,905 B2 | 6/2014 | Robinson et al. |
| 8,751,099 B2 | 6/2014 | Blair |
| 8,751,270 B1 | 6/2014 | Hanson et al. |
| 8,751,391 B2 | 6/2014 | Freund |
| 8,760,316 B2 | 6/2014 | Kohli et al. |
| 8,761,446 B1 | 6/2014 | Frome et al. |
| 8,768,009 B1 | 7/2014 | Smith |
| 8,768,753 B2 | 7/2014 | Robinson et al. |
| 8,768,754 B2 | 7/2014 | Robinson et al. |
| 8,773,266 B2 | 7/2014 | Starr et al. |
| 8,774,462 B2 | 7/2014 | Kozitsky et al. |
| 8,774,465 B2 * | 7/2014 | Christopulos ...... G06K 9/00671 |
| | | 382/104 |
| 8,775,236 B2 | 7/2014 | Hedley et al. |
| 8,775,238 B2 | 7/2014 | Angell et al. |
| 8,781,172 B2 | 7/2014 | Kozitsky et al. |
| 8,788,300 B1 | 7/2014 | Hanson et al. |
| 8,792,677 B2 | 7/2014 | Kephart |
| 8,792,682 B2 | 7/2014 | Fan et al. |
| 8,799,034 B1 | 8/2014 | Brandmaier et al. |
| 8,799,036 B1 | 8/2014 | Christensen et al. |
| 8,818,042 B2 | 8/2014 | Schofield et al. |
| 8,825,271 B2 | 9/2014 | Chen |
| 8,825,368 B2 | 9/2014 | Rakshit |
| 8,831,970 B2 | 9/2014 | Weik, III et al. |
| 8,831,972 B2 | 9/2014 | Angell et al. |
| 8,837,830 B2 | 9/2014 | Bala et al. |
| 8,855,621 B2 | 10/2014 | Chen |
| 8,855,853 B2 | 10/2014 | Blair |
| 8,860,564 B2 | 10/2014 | Rubin et al. |
| 8,862,117 B2 | 10/2014 | Chen |
| 8,879,120 B2 | 11/2014 | Thrasher et al. |
| 8,879,846 B2 | 11/2014 | Amtrup et al. |
| 8,884,782 B2 | 11/2014 | Rubin et al. |
| 8,885,229 B1 | 11/2014 | Amtrup et al. |
| 8,897,820 B2 | 11/2014 | Marovets |
| 8,917,910 B2 | 12/2014 | Rodriguez Serrano |
| 8,922,391 B2 | 12/2014 | Rubin et al. |
| 8,924,851 B2 | 12/2014 | Wichmann |
| 8,934,676 B2 | 1/2015 | Burry et al. |
| 8,935,094 B2 | 1/2015 | Rubin et al. |
| 8,937,559 B2 | 1/2015 | Ioli |
| 8,953,846 B2 | 2/2015 | Wu et al. |
| 8,954,226 B1 | 2/2015 | Binion et al. |
| 8,957,759 B1 | 2/2015 | Medina, III et al. |
| 8,958,605 B2 | 2/2015 | Amtrup et al. |
| 8,958,630 B2 | 2/2015 | Gallup et al. |
| 8,971,582 B2 | 3/2015 | Dehart |
| 8,971,587 B2 | 3/2015 | Macciola et al. |
| 8,982,208 B2 | 3/2015 | Takeuchi et al. |
| 8,989,515 B2 | 3/2015 | Shustorovich et al. |
| 8,993,951 B2 | 3/2015 | Schofield et al. |
| 9,004,353 B1 | 4/2015 | Block et al. |
| 9,008,369 B2 | 4/2015 | Schofield et al. |
| 9,008,370 B2 | 4/2015 | Burry et al. |
| 9,008,958 B2 | 4/2015 | Rubin et al. |
| 9,014,429 B2 | 4/2015 | Badawy et al. |
| 9,014,432 B2 | 4/2015 | Fan et al. |
| 9,014,908 B2 | 4/2015 | Chen et al. |
| 9,019,092 B1 | 4/2015 | Brandmaier et al. |
| 9,020,657 B2 | 4/2015 | Uhler |
| 9,020,837 B1 | 4/2015 | Oakes, III et al. |
| 9,021,384 B1 | 4/2015 | Beard et al. |
| 9,031,858 B2 | 5/2015 | Angell et al. |
| 9,031,948 B1 | 5/2015 | Smith |
| 9,035,755 B2 | 5/2015 | Rennie et al. |
| 9,058,515 B1 | 6/2015 | Amtrup et al. |
| 9,058,580 B1 | 6/2015 | Amtrup et al. |
| 9,092,808 B2 | 7/2015 | Angell et al. |
| 9,092,979 B2 | 7/2015 | Burry et al. |
| 9,105,066 B2 | 8/2015 | Gay et al. |
| 9,111,331 B2 | 8/2015 | Parikh et al. |
| 9,118,872 B1 | 8/2015 | Goodman et al. |

(56) References Cited

U.S. PATENT DOCUMENTS

| | | |
|---|---|---|
| 9,123,034 B2 | 9/2015 | Rydbeck et al. |
| 9,129,159 B2 | 9/2015 | Cardoso et al. |
| 9,129,289 B2 | 9/2015 | Vaughn et al. |
| 9,137,417 B2 | 9/2015 | Macciola et al. |
| 9,141,112 B1 | 9/2015 | Loo et al. |
| 9,141,503 B1 | 9/2015 | Chen |
| 9,141,926 B2 | 9/2015 | Kilby et al. |
| 9,158,967 B2 | 10/2015 | Shustorovich et al. |
| 9,165,187 B2 | 10/2015 | Macciola et al. |
| 9,165,188 B2 | 10/2015 | Thrasher et al. |
| 9,177,211 B2 | 11/2015 | Lehning |
| 9,208,536 B2 | 12/2015 | Macciola et al. |
| 9,223,769 B2 | 12/2015 | Tsibulevskiy et al. |
| 9,223,893 B2 | 12/2015 | Rodriguez |
| 9,235,599 B1 | 1/2016 | Smith |
| 9,253,349 B2 | 2/2016 | Amtrup et al. |
| 9,311,531 B2 | 4/2016 | Amtrup et al. |
| 9,365,188 B1 * | 6/2016 | Penilla ............... G06Q 10/02 |
| 9,384,423 B2 * | 7/2016 | Rodriguez-Serrano .................... G06K 9/3258 |
| 9,589,202 B1 | 3/2017 | Wilbert et al. |
| 9,607,236 B1 | 3/2017 | Wilbert et al. |
| 9,966,065 B2 | 5/2018 | Gruber et al. |
| 10,027,662 B1 | 7/2018 | Mutagi et al. |
| 2001/0032149 A1 | 10/2001 | Fujiwara |
| 2001/0034768 A1 | 10/2001 | Bain et al. |
| 2002/0000920 A1 | 1/2002 | Kavner |
| 2002/0106135 A1 | 8/2002 | Iwane |
| 2002/0140577 A1 | 10/2002 | Kavner |
| 2003/0019931 A1 | 1/2003 | Tsikos et al. |
| 2003/0042303 A1 | 3/2003 | Tsikos et al. |
| 2003/0095688 A1 | 5/2003 | Kirmuss |
| 2003/0146839 A1 | 8/2003 | Ehlers et al. |
| 2004/0039690 A1 | 2/2004 | Brown et al. |
| 2005/0238252 A1 | 10/2005 | Prakash et al. |
| 2006/0015394 A1 | 1/2006 | Sorensen |
| 2006/0025897 A1 | 2/2006 | Shostak et al. |
| 2006/0056658 A1 | 3/2006 | Kavner |
| 2006/0059229 A1 | 3/2006 | Bain et al. |
| 2006/0069749 A1 | 3/2006 | Hertz et al. |
| 2006/0078215 A1 | 4/2006 | Gallagher |
| 2006/0095301 A1 | 5/2006 | Gay |
| 2006/0098874 A1 | 5/2006 | Lev |
| 2006/0109104 A1 | 5/2006 | Kevaler |
| 2006/0120607 A1 | 6/2006 | Lev |
| 2006/0159345 A1 | 7/2006 | Clary et al. |
| 2006/0215882 A1 | 9/2006 | Ando et al. |
| 2006/0222244 A1 | 10/2006 | Haupt et al. |
| 2006/0269104 A1 | 11/2006 | Ciolli |
| 2006/0269105 A1 | 11/2006 | Langlinais |
| 2006/0278705 A1 | 12/2006 | Hedley et al. |
| 2006/0287872 A1 | 12/2006 | Simrell |
| 2007/0008179 A1 | 1/2007 | Hedley et al. |
| 2007/0009136 A1 | 1/2007 | Pawlenko et al. |
| 2007/0016539 A1 | 1/2007 | Groft et al. |
| 2007/0058856 A1 | 3/2007 | Boregowda et al. |
| 2007/0058863 A1 | 3/2007 | Boregowda et al. |
| 2007/0061173 A1 | 3/2007 | Gay |
| 2007/0085704 A1 | 4/2007 | Long |
| 2007/0088624 A1 | 4/2007 | Vaughn et al. |
| 2007/0106539 A1 | 5/2007 | Gay |
| 2007/0124198 A1 | 5/2007 | Robinson et al. |
| 2007/0130016 A1 | 6/2007 | Walker et al. |
| 2007/0156468 A1 | 7/2007 | Gay et al. |
| 2007/0183688 A1 | 8/2007 | Hollfelder |
| 2007/0192177 A1 | 8/2007 | Robinson et al. |
| 2007/0208681 A1 | 9/2007 | Bucholz |
| 2007/0252724 A1 | 11/2007 | Donaghey et al. |
| 2007/0265872 A1 | 11/2007 | Robinson et al. |
| 2007/0288270 A1 | 12/2007 | Gay et al. |
| 2007/0294147 A1 | 12/2007 | Dawson et al. |
| 2007/0299700 A1 | 12/2007 | Gay et al. |
| 2008/0021786 A1 * | 1/2008 | Stenberg ............ G06Q 30/0239 705/14.39 |
| 2008/0031522 A1 | 2/2008 | Axemo et al. |
| 2008/0036623 A1 | 2/2008 | Rosen |
| 2008/0040210 A1 | 2/2008 | Hedley |
| 2008/0040259 A1 | 2/2008 | Snow et al. |
| 2008/0063280 A1 | 3/2008 | Hofman et al. |
| 2008/0077312 A1 | 3/2008 | Mrotek |
| 2008/0120172 A1 | 5/2008 | Robinson et al. |
| 2008/0120392 A1 | 5/2008 | Dillon |
| 2008/0137910 A1 | 6/2008 | Suzuki et al. |
| 2008/0166018 A1 | 7/2008 | Li et al. |
| 2008/0175438 A1 | 7/2008 | Alves |
| 2008/0175479 A1 | 7/2008 | Sefton et al. |
| 2008/0212837 A1 | 9/2008 | Matsumoto et al. |
| 2008/0221916 A1 | 9/2008 | Reeves et al. |
| 2008/0249857 A1 | 10/2008 | Angell et al. |
| 2008/0253616 A1 | 10/2008 | Mizuno et al. |
| 2008/0277468 A1 | 11/2008 | Mitschele |
| 2008/0285803 A1 | 11/2008 | Madsen |
| 2008/0285804 A1 | 11/2008 | Sefton |
| 2008/0310850 A1 | 12/2008 | Pederson et al. |
| 2008/0319837 A1 | 12/2008 | Mitschele |
| 2009/0005650 A1 | 1/2009 | Angell et al. |
| 2009/0006125 A1 | 1/2009 | Angell et al. |
| 2009/0018721 A1 | 1/2009 | Mian et al. |
| 2009/0018902 A1 | 1/2009 | Miller et al. |
| 2009/0024493 A1 | 1/2009 | Huang et al. |
| 2009/0070156 A1 | 3/2009 | Cleland-Pottie |
| 2009/0070163 A1 | 3/2009 | Angell et al. |
| 2009/0083121 A1 | 3/2009 | Angell et al. |
| 2009/0083122 A1 | 3/2009 | Angell et al. |
| 2009/0089107 A1 | 4/2009 | Angell et al. |
| 2009/0089108 A1 | 4/2009 | Angell et al. |
| 2009/0110300 A1 | 4/2009 | Kihara et al. |
| 2009/0136141 A1 | 5/2009 | Badawy et al. |
| 2009/0138344 A1 | 5/2009 | Dawson et al. |
| 2009/0138345 A1 | 5/2009 | Dawson et al. |
| 2009/0016819 A1 | 6/2009 | Vu et al. |
| 2009/0161913 A1 | 6/2009 | Son |
| 2009/0167865 A1 | 7/2009 | Jones, Jr. |
| 2009/0174575 A1 | 7/2009 | Allen et al. |
| 2009/0174777 A1 | 7/2009 | Smith |
| 2009/0198587 A1 | 8/2009 | Wagner et al. |
| 2009/0202105 A1 | 8/2009 | Castro Abrantes et al. |
| 2009/0208060 A1 | 8/2009 | Wang et al. |
| 2009/0226100 A1 | 9/2009 | Gao et al. |
| 2009/0232357 A1 | 9/2009 | Angell et al. |
| 2009/0292597 A1 | 11/2009 | Schwartz et al. |
| 2009/0307158 A1 | 12/2009 | Kim et al. |
| 2010/0054546 A1 | 3/2010 | Choi |
| 2010/0064305 A1 | 3/2010 | Schumann et al. |
| 2010/0080461 A1 | 4/2010 | Ferman |
| 2010/0082180 A1 | 4/2010 | Wright et al. |
| 2010/0085173 A1 | 4/2010 | Yang et al. |
| 2010/0088123 A1 | 4/2010 | McCall et al. |
| 2010/0111365 A1 | 5/2010 | Dixon et al. |
| 2010/0128127 A1 | 5/2010 | Ciolli |
| 2010/0150457 A1 | 6/2010 | Angell et al. |
| 2010/0153146 A1 | 6/2010 | Angell et al. |
| 2010/0153147 A1 | 6/2010 | Angell et al. |
| 2010/0153180 A1 | 6/2010 | Angell et al. |
| 2010/0153279 A1 | 6/2010 | Zahn |
| 2010/0153353 A1 | 6/2010 | Angell et al. |
| 2010/0179878 A1 | 7/2010 | Dawson et al. |
| 2010/0189364 A1 | 7/2010 | Tsai et al. |
| 2010/0191584 A1 | 7/2010 | Fraser et al. |
| 2010/0228607 A1 * | 9/2010 | Hedley ............... G06K 9/325 705/13 |
| 2010/0228608 A1 | 9/2010 | Hedley et al. |
| 2010/0229247 A1 | 9/2010 | Phipps |
| 2010/0232680 A1 | 9/2010 | Kleihorst |
| 2010/0246890 A1 | 9/2010 | Ofek et al. |
| 2010/0272317 A1 | 10/2010 | Riesco Prieto et al. |
| 2010/0272364 A1 | 10/2010 | Lee et al. |
| 2010/0274641 A1 | 10/2010 | Allen et al. |
| 2010/0278389 A1 | 11/2010 | Tsai et al. |
| 2010/0278436 A1 | 11/2010 | Tsai et al. |
| 2010/0299021 A1 | 11/2010 | Jalili |
| 2010/0302362 A1 | 12/2010 | Birchbauer et al. |
| 2011/0047009 A1 | 2/2011 | Deitiker et al. |
| 2011/0096991 A1 | 4/2011 | Lee et al. |

(56) References Cited

U.S. PATENT DOCUMENTS

| | | |
|---|---|---|
| 2011/0115917 A1 | 5/2011 | Lee et al. |
| 2011/0116686 A1 | 5/2011 | Gravelle |
| 2011/0118967 A1 | 5/2011 | Tsuda |
| 2011/0145053 A1 | 6/2011 | Hashim-Waris |
| 2011/0161140 A1 | 6/2011 | Polt et al. |
| 2011/0169953 A1 | 7/2011 | Sandler et al. |
| 2011/0191117 A1 | 8/2011 | Hashim-Waris |
| 2011/0194733 A1 | 8/2011 | Wilson |
| 2011/0208568 A1 | 8/2011 | Deitiker et al. |
| 2011/0218896 A1 | 9/2011 | Tonnon et al. |
| 2011/0224865 A1 | 9/2011 | Gordon et al. |
| 2011/0234749 A1 | 9/2011 | Alon |
| 2011/0235864 A1 | 9/2011 | Shimizu |
| 2011/0238290 A1 | 9/2011 | Feng et al. |
| 2011/0261200 A1 | 10/2011 | Kanning et al. |
| 2011/0288909 A1 | 11/2011 | Hedley et al. |
| 2012/0007983 A1 | 1/2012 | Welch |
| 2012/0033123 A1 | 2/2012 | Inque et al. |
| 2012/0057756 A1 | 3/2012 | Yoon et al. |
| 2012/0069183 A1 | 3/2012 | Aoki et al. |
| 2012/0070086 A1 | 3/2012 | Miyamoto |
| 2012/0078686 A1 | 3/2012 | Bashani |
| 2012/0089462 A1 | 4/2012 | Hot |
| 2012/0089675 A1 | 4/2012 | Thrower, III et al. |
| 2012/0106781 A1 | 5/2012 | Kozitsky et al. |
| 2012/0106801 A1 | 5/2012 | Jackson |
| 2012/0106802 A1 | 5/2012 | Hsieh et al. |
| 2012/0116661 A1 | 5/2012 | Mizrachi |
| 2012/0128205 A1 | 5/2012 | Lee et al. |
| 2012/0130777 A1 | 5/2012 | Kaufman |
| 2012/0130872 A1 | 5/2012 | Baughman et al. |
| 2012/0140067 A1 | 6/2012 | Crossen |
| 2012/0143657 A1 | 6/2012 | Silberberg |
| 2012/0148092 A1 | 6/2012 | Ni et al. |
| 2012/0148105 A1 | 6/2012 | Burry et al. |
| 2012/0158466 A1 | 6/2012 | John |
| 2012/0170814 A1 | 7/2012 | Tseng |
| 2012/0195470 A1 | 8/2012 | Fleming et al. |
| 2012/0215594 A1 | 8/2012 | Gravelle |
| 2012/0223134 A1 | 9/2012 | Smith et al. |
| 2012/0246007 A1 | 9/2012 | Williams et al. |
| 2012/0256770 A1* | 10/2012 | Mitchell ............ G08G 1/127 340/989 |
| 2012/0258731 A1 | 10/2012 | Smith et al. |
| 2012/0263352 A1 | 10/2012 | Fan et al. |
| 2012/0265574 A1 | 10/2012 | Olding et al. |
| 2012/0275653 A1 | 11/2012 | Hsieh et al. |
| 2012/0310712 A1 | 12/2012 | Baughman et al. |
| 2013/0004024 A1 | 1/2013 | Challa |
| 2013/0010116 A1 | 1/2013 | Breed |
| 2013/0018705 A1 | 1/2013 | Heath et al. |
| 2013/0039542 A1 | 2/2013 | Guzik |
| 2013/0041961 A1 | 2/2013 | Thrower, III et al. |
| 2013/0046587 A1 | 2/2013 | Fraser et al. |
| 2013/0050493 A1 | 2/2013 | Mitic |
| 2013/0058523 A1 | 3/2013 | Wu et al. |
| 2013/0058531 A1 | 3/2013 | Hedley et al. |
| 2013/0060786 A1 | 3/2013 | Serrano et al. |
| 2013/0066667 A1 | 3/2013 | Gulec et al. |
| 2013/0066757 A1 | 3/2013 | Lovelace et al. |
| 2013/0073347 A1 | 3/2013 | Bogaard et al. |
| 2013/0077888 A1 | 3/2013 | Meyers et al. |
| 2013/0080345 A1 | 3/2013 | Rassi |
| 2013/0084010 A1 | 4/2013 | Ross et al. |
| 2013/0097630 A1 | 4/2013 | Rodriguez |
| 2013/0100286 A1 | 4/2013 | Lao |
| 2013/0108114 A1 | 5/2013 | Aviad et al. |
| 2013/0113936 A1 | 5/2013 | Cohen et al. |
| 2013/0121581 A1 | 5/2013 | Wei et al. |
| 2013/0129152 A1 | 5/2013 | Rodriguez Serrano et al. |
| 2013/0132166 A1 | 5/2013 | Wu et al. |
| 2013/0136310 A1 | 5/2013 | Hofman et al. |
| 2013/0144492 A1 | 6/2013 | Takano et al. |
| 2013/0148846 A1 | 6/2013 | Maeda et al. |
| 2013/0148858 A1 | 6/2013 | Wiegenfeld et al. |
| 2013/0158777 A1 | 6/2013 | Brauer et al. |
| 2013/0162817 A1 | 6/2013 | Bernal |
| 2013/0163822 A1 | 6/2013 | Chigos et al. |
| 2013/0163823 A1 | 6/2013 | Chigos et al. |
| 2013/0166325 A1 | 6/2013 | Ganapathy et al. |
| 2013/0170711 A1 | 7/2013 | Chigos et al. |
| 2013/0173481 A1 | 7/2013 | Hirtenstein et al. |
| 2013/0182910 A1 | 7/2013 | Burry et al. |
| 2013/0204719 A1 | 8/2013 | Burry et al. |
| 2013/0216101 A1 | 8/2013 | Wu et al. |
| 2013/0216102 A1 | 8/2013 | Ryan et al. |
| 2013/0229517 A1 | 9/2013 | Kozitsky |
| 2013/0238167 A1 | 9/2013 | Stanfield et al. |
| 2013/0238441 A1 | 9/2013 | Panelli |
| 2013/0242123 A1 | 9/2013 | Norman et al. |
| 2013/0243334 A1 | 9/2013 | Meyers et al. |
| 2013/0246132 A1 | 9/2013 | Buie |
| 2013/0253997 A1 | 9/2013 | Robinson et al. |
| 2013/0262194 A1 | 10/2013 | Hedley |
| 2013/0265414 A1 | 10/2013 | Yoon et al. |
| 2013/0266190 A1 | 10/2013 | Wang et al. |
| 2013/0268155 A1 | 10/2013 | Mian et al. |
| 2013/0272579 A1 | 10/2013 | Burry et al. |
| 2013/0272580 A1 | 10/2013 | Karel et al. |
| 2013/0278761 A1 | 10/2013 | Wu |
| 2013/0278768 A1 | 10/2013 | Paul et al. |
| 2013/0279748 A1 | 10/2013 | Hastings |
| 2013/0279758 A1 | 10/2013 | Burry et al. |
| 2013/0279759 A1 | 10/2013 | Kagarlitsky et al. |
| 2013/0282271 A1 | 10/2013 | Rubin et al. |
| 2013/0290201 A1 | 10/2013 | Rodriguez Carrillo |
| 2013/0294643 A1 | 11/2013 | Fan et al. |
| 2013/0294653 A1 | 11/2013 | Burry et al. |
| 2013/0297353 A1 | 11/2013 | Strange et al. |
| 2013/0317693 A1 | 11/2013 | Jefferies et al. |
| 2013/0325629 A1 | 12/2013 | Harrison |
| 2013/0329943 A1 | 12/2013 | Christopulos et al. |
| 2013/0329961 A1 | 12/2013 | Fan et al. |
| 2013/0336538 A1 | 12/2013 | Skaff et al. |
| 2014/0003712 A1 | 1/2014 | Eid et al. |
| 2014/0025444 A1 | 1/2014 | Willis |
| 2014/0029839 A1 | 1/2014 | Mensink et al. |
| 2014/0029850 A1 | 1/2014 | Meyers et al. |
| 2014/0037142 A1 | 2/2014 | Bhanu et al. |
| 2014/0039987 A1 | 2/2014 | Nerayoff et al. |
| 2014/0046800 A1* | 2/2014 | Chen ............... G06Q 30/0623 705/26.61 |
| 2014/0056483 A1 | 2/2014 | Angell et al. |
| 2014/0056520 A1 | 2/2014 | Rodriguez Serrano |
| 2014/0064564 A1 | 3/2014 | Hofman et al. |
| 2014/0067631 A1 | 3/2014 | Dhuse et al. |
| 2014/0072178 A1 | 3/2014 | Carbonell et al. |
| 2014/0074566 A1 | 3/2014 | McCoy et al. |
| 2014/0074567 A1 | 3/2014 | Hedley et al. |
| 2014/0078304 A1 | 3/2014 | Othmer |
| 2014/0079315 A1 | 3/2014 | Kozitsky et al. |
| 2014/0081858 A1 | 3/2014 | Block et al. |
| 2014/0085475 A1 | 3/2014 | Bhanu et al. |
| 2014/0119651 A1 | 5/2014 | Meyers et al. |
| 2014/0126779 A1 | 5/2014 | Duda |
| 2014/0129440 A1 | 5/2014 | Smith et al. |
| 2014/0136047 A1 | 5/2014 | Mian et al. |
| 2014/0140578 A1 | 5/2014 | Ziola et al. |
| 2014/0149190 A1 | 5/2014 | Robinson et al. |
| 2014/0168436 A1 | 6/2014 | Pedicino |
| 2014/0169633 A1 | 6/2014 | Seyfried et al. |
| 2014/0169634 A1 | 6/2014 | Prakash et al. |
| 2014/0172519 A1 | 6/2014 | Nerayoff et al. |
| 2014/0172520 A1 | 6/2014 | Nerayoff et al. |
| 2014/0188579 A1 | 7/2014 | Regan et al. |
| 2014/0188580 A1 | 7/2014 | Nerayoff et al. |
| 2014/0195099 A1 | 7/2014 | Chen |
| 2014/0195138 A1 | 7/2014 | Stelzig et al. |
| 2014/0195313 A1 | 7/2014 | Nerayoff et al. |
| 2014/0200970 A1 | 7/2014 | Nerayoff et al. |
| 2014/0201064 A1 | 7/2014 | Jackson et al. |
| 2014/0201213 A1 | 7/2014 | Jackson et al. |
| 2014/0201266 A1 | 7/2014 | Jackson et al. |
| 2014/0207541 A1 | 7/2014 | Nerayoff et al. |

(56) References Cited

U.S. PATENT DOCUMENTS

| | | |
|---|---|---|
| 2014/0214499 A1 | 7/2014 | Hudson et al. |
| 2014/0214500 A1 | 7/2014 | Hudson et al. |
| 2014/0219563 A1 | 8/2014 | Rodriguez-Serrano et al. |
| 2014/0236786 A1 | 8/2014 | Nerayoff et al. |
| 2014/0241578 A1 | 8/2014 | Nonaka et al. |
| 2014/0241579 A1 | 8/2014 | Nonaka |
| 2014/0244366 A1 | 8/2014 | Nerayoff et al. |
| 2014/0247347 A1 | 9/2014 | McNeill et al. |
| 2014/0247372 A1 | 9/2014 | Byren |
| 2014/0249896 A1 | 9/2014 | Nerayoff et al. |
| 2014/0254866 A1 | 9/2014 | Jankowski et al. |
| 2014/0254877 A1 | 9/2014 | Jankowski et al. |
| 2014/0254878 A1 | 9/2014 | Jankowski et al. |
| 2014/0254879 A1 | 9/2014 | Smith |
| 2014/0257942 A1 | 9/2014 | Nerayoff et al. |
| 2014/0257943 A1 | 9/2014 | Nerayoff et al. |
| 2014/0270350 A1 | 9/2014 | Rodriguez-Serrano et al. |
| 2014/0270383 A1 | 9/2014 | Pederson |
| 2014/0270386 A1 | 9/2014 | Leihs et al. |
| 2014/0278839 A1 | 9/2014 | Am et al. |
| 2014/0278841 A1 | 9/2014 | Natinsky |
| 2014/0289024 A1 | 9/2014 | Robinson et al. |
| 2014/0294257 A1 | 10/2014 | Tussy |
| 2014/0301606 A1 | 10/2014 | Paul et al. |
| 2014/0307923 A1 | 10/2014 | Johansson |
| 2014/0307924 A1 | 10/2014 | Fillion et al. |
| 2014/0309842 A1 | 10/2014 | Jefferies et al. |
| 2014/0310028 A1 | 10/2014 | Christensen et al. |
| 2014/0314275 A1 | 10/2014 | Edmondson et al. |
| 2014/0316841 A1 | 10/2014 | Kilby et al. |
| 2014/0324247 A1 | 10/2014 | Jun |
| 2014/0328518 A1 | 11/2014 | Kozitsky et al. |
| 2014/0334668 A1 | 11/2014 | Saund |
| 2014/0336848 A1 | 11/2014 | Saund et al. |
| 2014/0337066 A1 | 11/2014 | Kephart |
| 2014/0337319 A1* | 11/2014 | Chen .............. G06Q 10/10 707/722 |
| 2014/0337756 A1 | 11/2014 | Thrower et al. |
| 2014/0340570 A1 | 11/2014 | Meyers et al. |
| 2014/0348391 A1 | 11/2014 | Schweid et al. |
| 2014/0348392 A1 | 11/2014 | Burry et al. |
| 2014/0355835 A1 | 12/2014 | Rodriguez-Serrano et al. |
| 2014/0355836 A1 | 12/2014 | Kozitsky et al. |
| 2014/0355837 A1 | 12/2014 | Hedley et al. |
| 2014/0363051 A1 | 12/2014 | Burry et al. |
| 2014/0363052 A1 | 12/2014 | Kozitsky et al. |
| 2014/0369566 A1 | 12/2014 | Chigos et al. |
| 2014/0369567 A1 | 12/2014 | Chigos et al. |
| 2014/0376778 A1 | 12/2014 | Muetzel et al. |
| 2014/0379384 A1 | 12/2014 | Duncan et al. |
| 2014/0379385 A1 | 12/2014 | Duncan et al. |
| 2014/0379442 A1 | 12/2014 | Dutta et al. |
| 2015/0012309 A1 | 1/2015 | Buchheim et al. |
| 2015/0019533 A1 | 1/2015 | Moody et al. |
| 2015/0025932 A1 | 1/2015 | Ross et al. |
| 2015/0032580 A1 | 1/2015 | Altermatt et al. |
| 2015/0041536 A1 | 2/2015 | Matsur |
| 2015/0049914 A1 | 2/2015 | Alves |
| 2015/0051822 A1 | 2/2015 | Joglekar |
| 2015/0051823 A1 | 2/2015 | Joglekar |
| 2015/0052022 A1 | 2/2015 | Christy et al. |
| 2015/0054950 A1 | 2/2015 | Van Wiemeersch |
| 2015/0058210 A1 | 2/2015 | Johnson et al. |
| 2015/0066349 A1 | 3/2015 | Chan et al. |
| 2015/0066605 A1 | 3/2015 | Balachandran et al. |
| 2015/0081362 A1 | 3/2015 | Chadwick et al. |
| 2015/0095251 A1 | 4/2015 | Alazraki et al. |
| 2015/0100448 A1 | 4/2015 | Binion et al. |
| 2015/0100504 A1 | 4/2015 | Binion et al. |
| 2015/0100505 A1 | 4/2015 | Binion et al. |
| 2015/0100506 A1 | 4/2015 | Binion et al. |
| 2015/0104073 A1 | 4/2015 | Rodriguez-Serrano et al. |
| 2015/0112504 A1 | 4/2015 | Binion et al. |
| 2015/0112543 A1 | 4/2015 | Binion et al. |
| 2015/0112545 A1 | 4/2015 | Binion et al. |
| 2015/0112730 A1 | 4/2015 | Binion et al. |
| 2015/0112731 A1 | 4/2015 | Binion et al. |
| 2015/0112800 A1 | 4/2015 | Binion et al. |
| 2015/0120334 A1 | 4/2015 | Jones |
| 2015/0125041 A1 | 5/2015 | Burry et al. |
| 2015/0127730 A1 | 5/2015 | Aviv |
| 2015/0138001 A1 | 5/2015 | Davies et al. |
| 2015/0149221 A1 | 5/2015 | Tremblay |
| 2015/0154578 A1 | 6/2015 | Aggarwal et al. |
| 2015/0205760 A1 | 7/2015 | Hershey et al. |
| 2015/0206357 A1 | 7/2015 | Chen et al. |
| 2015/0221041 A1 | 8/2015 | Hanson et al. |
| 2015/0222573 A1 | 8/2015 | Bain et al. |
| 2015/0249635 A1 | 9/2015 | Thrower, III et al. |
| 2015/0254781 A1 | 9/2015 | Binion et al. |
| 2015/0269433 A1 | 9/2015 | Amtrup et al. |
| 2015/0310293 A1 | 10/2015 | Dehart |
| 2015/0324924 A1 | 11/2015 | Wilson et al. |
| 2015/0332407 A1 | 11/2015 | Wilson, II et al. |
| 2016/0036899 A1 | 2/2016 | Moody et al. |
| 2016/0180428 A1* | 6/2016 | Cain ................ G07C 5/08 705/26.61 |
| 2016/0358297 A1* | 12/2016 | Alon ............... G06F 16/245 |

FOREIGN PATENT DOCUMENTS

| | | |
|---|---|---|
| HU | 0302998 A2 | 12/2003 |
| JP | 10134219 | 11/1996 |
| JP | 4243411 B2 | 3/2009 |
| WO | 0169569 A2 | 9/2001 |
| WO | 02059852 A3 | 1/2002 |
| WO | 02059838 A2 | 8/2002 |
| WO | 02059852 A2 | 8/2002 |
| WO | 2013138186 A1 | 3/2013 |
| WO | 2014158291 A2 | 10/2014 |
| WO | 2014160426 A1 | 10/2014 |

OTHER PUBLICATIONS

Vimeo, LLC, online presentation for Five Focal's engineering service offering titled "Test and Validation," website Tocation https://vimeo.com/85556043, date site last visited Aug. 24, 2015.

Arayanswamy, Ramkumar; Johnson, Gregory E.; Silveira, Paulo E. X.; Wach, Hans B., article titled Extending the Imaging Volume for Biometric Iris Recognition, published Feb. 2005 in Applied Optics IP, vol. 44, Issue 5, pp. 701-712, website location http://adsabs.harvard.edu/abs/2005ApOpt..44..701N.

Alshahrani, M.A. A., Real Time Vehicle License Plate Recognition on Mobile Devices {Thesis, Master of Science MSc)). Mar. 2013. University of Waikato, Hamilton, New Zealand.

Anagnostopoulos, Christos-Nikolaos E., et al. "License plate recognition from still images and video sequences: A survey." IEEE Transactions on intelligent transportation systems 9.3 (2008): 377-391.

Chan, Wen-Hsin, and Ching-Twu Youe. Video CCD based portable digital still camera. IEEE transactions on consumer electronics 41.3 (1995): 455-459.

Charge-Coupled Device, Wikipedia, the free encyclopedia, Version: Mar. 4, 2013, http://en.wikipedia.org/w/index.php?tille=Chargecoupled_device&oldid=542042079.

CARFAX, Inc., "Find Used Cars for Sale," iTunes App, updated as of Feb. 18, 2016.

CARFAX, Inc., "Vehicle History Report," Mobile App, CARFAX Blog dated Aug. 27, 2012.

Brandon Turkus, re: DiDi Plate App Report dated Jun. 13, 2014.

Jason Hahn, "Scan License Plates So You Can Text Flirty Messages to Cute Drivers with GM's New App," digitaltrends.com (http://www.digitaltrends.com/cars/scan-license-plate-text-drivers-gm-didi-plate-app/) dated Jun. 21, 2014.

Progressive, "Progressive's Image Capture technology saves users time, helps drivers quote and buy auto insurance using their smartphone camera," Mayfield Village, Ohio—Feb. 2, 2012.

(56) References Cited

OTHER PUBLICATIONS

Don Jergler, "There's an App for That: Mobile Phone Quoting," Insurance Journal, http://www.insurancejournal.com/news/naiional/2012AI2/21/236521.htm, dated Feb. 21, 2012.

\* cited by examiner

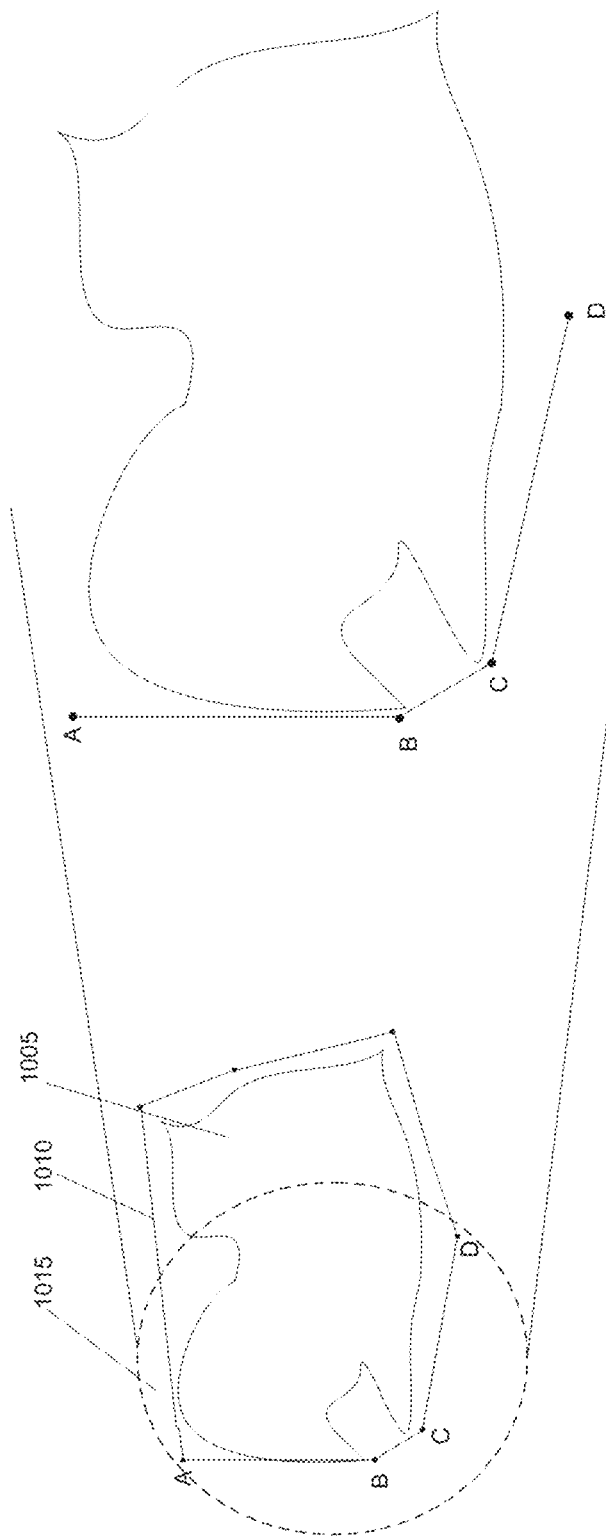
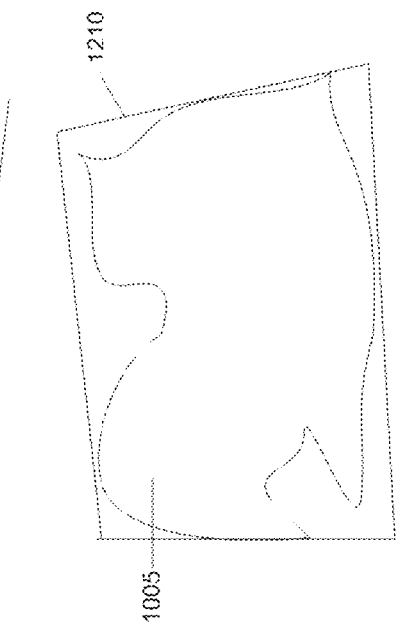
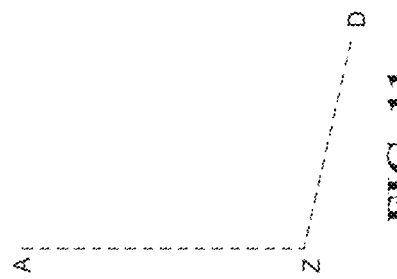
FIG. 10
FIG. 12
FIG. 11

SYSTEM AND METHOD FOR ELECTRONIC PROCESSING OF VEHICLE TRANSACTIONS BASED ON IMAGE DETECTION OF VEHICLE LICENSE PLATE

CLAIM OF BENEFIT TO PRIOR APPLICATIONS

This application is a continuation of U.S. patent application Ser. No. 15/785,741, which is a continuation-in-part application of U.S. application Ser. No. 15/363,960, filed Nov. 29, 2016, now issued as U.S. Pat. No. 9,818,154. In turn, U.S. application Ser. No. 15/363,960, is a continuation-in-part application of each of U.S. patent application Ser. No. 14/716,808, filed May 19, 2015; U.S. patent application Ser. No. 14/716,738, filed May 19, 2015; U.S. patent application Ser. No. 14/716,743, filed May 19, 2015; U.S. patent application Ser. No. 14/716,793, filed May 19, 2015; U.S. patent application Ser. No. 14/716,651, filed May 19, 2015; and U.S. patent application Ser. No. 14/716,445, filed May 19, 2015. Each of these prior applications is a continuation-in-part of U.S. patent application Ser. No. 14/613,323, filed on Feb. 3, 2015, which is a continuation-in-part of each of U.S. patent application Ser. No. 14/318,397, filed on Jun. 27, 2014, and U.S. patent application Ser. No. 14/455,841, filed on Aug. 8, 2014. This application claims the benefit of priority to each of these applications and hereby incorporates by reference the contents of each of these applications.

BACKGROUND

Field

The present disclosure relates generally to a method and apparatus for detecting license plate information from an image of a license plate and more specifically, detecting license plate information from an optical image, captured by a mobile apparatus, that includes a license plate image and several other object images.

Background

In recent years, collecting still images of license plates has become a common tool used by authorities to catch the drivers of vehicles that may engage in improper or unlawful activity. For example, law enforcement authorities have set up stationary traffic cameras to photograph the license plates of vehicles that may be traveling above a posted speed limit at a specific portion of a road or vehicles that drive through red lights. Toll booth operators also commonly use such stationary cameras to photograph vehicles that may pass through a toll booth without paying the required toll. However, all of these scenarios have a common thread. The camera must be manually installed and configured such that it will always photograph the vehicle's license plate at a specific angle and when the vehicle is in a specific location. Any unexpected modifications, such as a shift in angle or location of the camera would render the camera incapable of properly collecting license plate images.

Additionally, camera equipped mobile apparatuses (e.g., smartphones) have become increasingly prevalent in today's society. Mobile apparatuses are frequently used to capture optical images and for many users serve as a replacement for a simple digital camera because the camera equipped mobile apparatus provides an image that is often as good as those produced by simple digital cameras and can easily be transmitted (shared) over a network.

The positioning constraints put on the traffic cameras make it difficult to take images of license plates from different angles and distances and still achieve an accurate reading. Therefore, it would be difficult to scale the same license plate image capture process performed by law enforcement authorities to mobile apparatuses. In other words, it is difficult to derive license plate information from an image of a license plate taken from a mobile image capture apparatus at a variety of angles, distances, ambient conditions, mobile apparatus motion, and when other object images are also in the image, which hinders a user's ability to easily gather valuable information about specific vehicles when engaging in a number of different vehicle related activities such as buying and selling vehicles, insuring vehicles, and obtaining financing for vehicles.

SUMMARY

Several aspects of the present invention will be described more fully hereinafter with reference to various methods and apparatuses.

Some aspects of the invention relate to a computer-implemented method for automatically identifying vehicle information and facilitating a transaction related to a vehicle. In an exemplary aspect, the method includes capturing, by an image sensor of a first computing apparatus, an optical image of a vehicle, with the optical image including at least one distinguishing feature of the vehicle; and transmitting, by an interface of the first computing apparatus, the transmit the captured optical image. Moreover, the method further includes receiving, by a remote server, the transmitted and captured optical image; automatically scanning, by the remote server, the captured optical image to identify the at least one distinguishing feature of the vehicle; automatically comparing, by the remote server, the identified at least one distinguishing feature with a unique feature database that includes respective vehicle identification information associated with each of a plurality of unique vehicle features; automatically identifying, by the remote server, the respective vehicle identification information that corresponds to the vehicle upon determining a match between the identified at least one distinguishing feature of the vehicle and the respective one of the plurality of unique vehicle features; automatically identifying, by the remote server, corresponds vehicle configuration information based on the identified vehicle identification information; and automatically transmitting, by the remote server, the identified vehicle configuration information to the first computing apparatus to be displayed thereon.

Another aspect of the invention relates to a system for automatically identifying vehicle information and facilitating a transaction related to a vehicle. In this aspect, the system includes a first computing apparatus having an image sensor configured to capture an optical image of a vehicle, with the optical image including at least one distinguishing feature of the vehicle, and an interface configured to transmit the captured optical image. Moreover, the system further includes a remote server having a computer processor and configured to receive the transmitted and captured optical image, automatically scan the captured optical image to identify the at least one distinguishing feature of the vehicle, automatically compare the identified at least one distinguishing feature with a unique feature database that includes respective vehicle identification information associated with each of a plurality of unique vehicle features, automatically identify the respective vehicle identification information that corresponds to the vehicle upon determining a match between the identified at least one distinguishing feature of the vehicle and the respective one of the plurality of unique vehicle features, automatically identify corresponds vehicle configuration information based on the identified vehicle identification information, and automatically transmit the identified vehicle configuration information to the first computing apparatus to be displayed thereon.

It is understood that other aspects of methods and apparatuses will become readily apparent to those skilled in the art from the following detailed description, wherein various aspects of apparatuses and methods are shown and described by way of illustration. As understood by one of ordinary skill in the art, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of processes and apparatuses will now be presented in the detailed description by way of example, and not by way of limitation, with reference to the accompanying drawings, wherein:

FIG. 10 illustrates an exemplary embodiment of an object image with a convex hull fit around the object image.

FIG. 11 illustrates an exemplary embodiment of a method for forming a quadrilateral from a convex hull.

FIG. 12 illustrates an exemplary embodiment of an object image enclosed in a quadrilateral.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The word "exemplary" or "embodiment" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

It will be further understood that the terms "comprises" and/or "comprising," when used in this specification, specify the presence of stated features, steps, operations, elements, and/or components, but do not preclude the presence or addition of one or more other features, integers, steps, operations, elements, components, and/or groups thereof. The term "and/or" includes any and all combinations of one or more of the associated listed items.

Unless otherwise defined, all terms (including technical and scientific terms) used herein have the same meaning as commonly understood by a person having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In the following detailed description, various aspects of the present invention will be presented in the context of apparatuses and methods for recovering vehicle license plate information from an image. However, as those skilled in the art will appreciate, these aspects may be extended to recovering other information from an image. Accordingly, any reference to an apparatus or method for recovering vehicle license plate information is intended only to illustrate the various aspects of the present invention, with the understanding that such aspects may have a wide range of applications.

Figure 1:
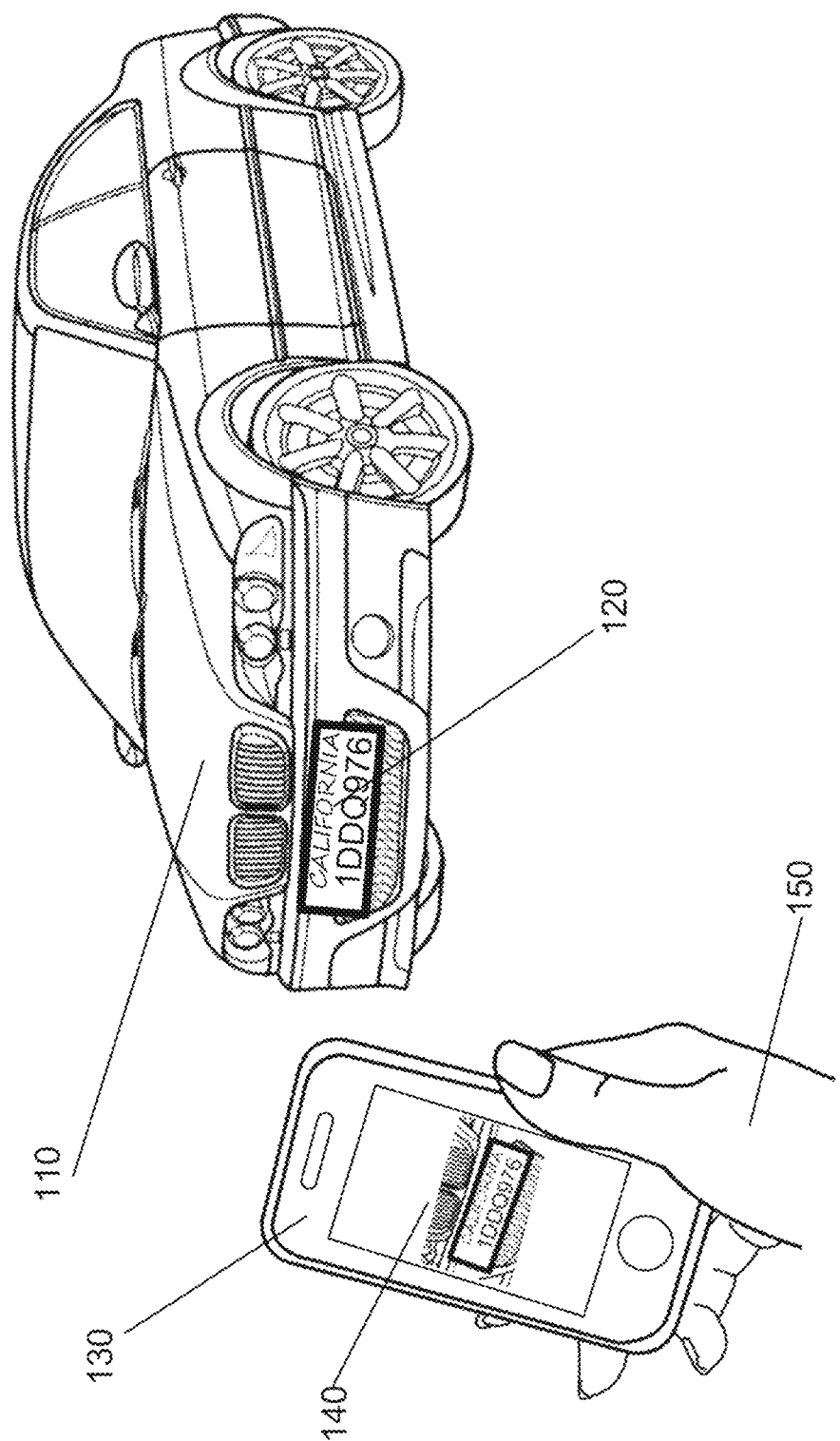
FIG. 1 conceptually illustrates an exemplary embodiment of an apparatus that is capable of capturing an optical image and detecting a license plate image from the optical image.

FIG. 1 conceptually illustrates an exemplary embodiment of an apparatus 130 that is capable of capturing an optical image and detecting a license plate 120 from the optical image. The apparatus 130 may be a mobile phone, personal digital assistants (PDA), smart phone, laptop computer, palm-sized computer, tablet computer, game console, media player, digital camera, or any other suitable apparatus. FIG. 1 includes a vehicle 110, the license plate 120 registered to the vehicle 110, the apparatus 130, touch screen 140, and a user 150. The apparatus 130, of some embodiments, may be a wireless handheld device with built in image capture capabilities such as the smart phone, tablet or personal data assistant (PDA) described above. However, in some aspects of the service, the apparatus 130 may be a digital camera capable of processing or transferring data derived from the captured image to a personal computer. The information may then be uploaded from the personal computer to the license plate detection apparatus discussed in the foregoing.

In an exemplary embodiment of the apparatus, a customized application is installed on the apparatus 130. The customized application may interface with the apparatus' image capture device to capture an optical image, convert the optical image to an electrical signal, process the electrical signal to detect the presence of a license plate image, and derive license plate information from a portion of the electrical signal that is associated with the license plate image. The license plate information may be transmitted wirelessly to a server for further processing or decoding such as optical character recognition (OCR) of the license plate image. Alternatively, the OCR process may be carried out on the mobile apparatus 130.

It should be appreciated that the customized software application can downloaded from a remote server (e.g., server 230 discussed below) and/or from an "Apps Store" that has been provided with a license to download the software application to mobile device users. Moreover, the customized software application enables each mobile device (of the seller and buyer, for example) to communicate required information to the server 230 to facilitate the transaction of the vehicle, including loan information and the like. Thus, the server is capable of receiving such information from each mobile device and performing the processes described herein.

As shown in FIG. 1, the apparatus 130 may receive an interaction from the user 150 to capture an optical image that includes an object image of the license plate 120. The interaction may occur at the touch screen 140. The touch screen 140 shows an exemplary rendering of the optical image, including a rendering of the license plate image that may be captured by the apparatus 130. As illustrated on the touch screen 140, the image of the license plate 120 may include a number and a state. OCR software may be used to convert the state and number portions of the license plate image to text, which may be stored as strings to be used later for various functions. Once, a suitable image including a license plate image is captured by the apparatus 130, the license plate data may be recovered and transmitted to a server for further processing. Additionally, the server and/or the apparatus application may provide error checking capability to ensure that the captured image is clear enough to accurately detect and decode a license plate image. When the server or apparatus determines that a suitable image has not been captured, the apparatus 130 may display an alert in the display area 140, which may guide the user to acquiring a suitable image.

Alternatively, some aspects of the apparatus may provide the capability to bypass the image capture process to instead provide a user interface with text fields. For example, the user interface may provide text fields that allow for entry of the license plate number and state. The entered information may be provided as text strings to the license plate detection apparatus without going through the detection process discussed above.

Figure 2:
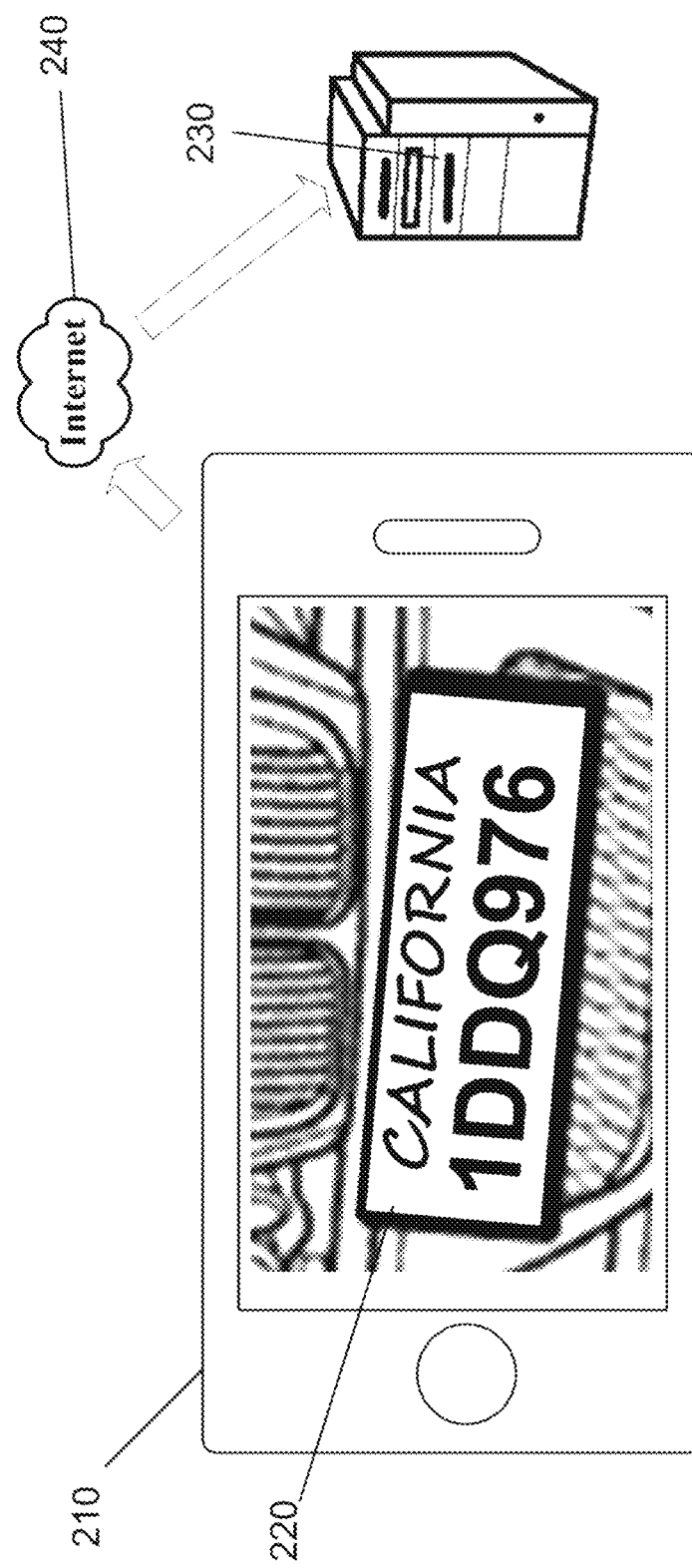
FIG. 2 illustrates an exemplary embodiment transmitting license plate information derived from an optical image to an external server.

FIG. 2 illustrates an exemplary embodiment of transmitting license plate information derived from an optical image to an external server 230. In some aspects of the apparatus, a license plate image may be transmitted after recovering the license plate information from an image 220. As shown, FIG. 2 includes an apparatus 210, the image 220, the server 230, and the Internet 240. The apparatus 210 may be a mobile or wireless apparatus. The image 220 may be the same as the image rendered on the display area 140 as illustrated in FIG. 1.

A license plate image recovered from the image 220 may be transmitted over the internet 240 to the server 230 where it is processed for the purpose of detecting whether the license plate image is suitable for deriving license plate data and/or for performing OCR on the license plate image to derive license plate information such as the state of origin and the license plate number. It should be appreciated that while the exemplary embodiment transmits a full image 220 of a license plate, in some aspects server 230 can be configured to identity the vehicle using a partial plate. For example, if only a portion of the alphanumeric characters can be identified, but the state of the license plate is identifiable, the server 230 may be configured to identify the vehicle based on this partial match.

Once the license plate image (or image file) is transmitted to the server 230, the apparatus 210 may receive and display a confirmation message for confirming that the derived license plate information (e.g., state and license plate number) is correct. In some aspects of the apparatus, the apparatus 210 may also display information about the vehicle to help the user determine whether the derived license plate information is correct. This may be useful in cases such as when the apparatus 210 captures a license plate image of a moving vehicle. The vehicle license plate may no longer be in eyesight. However, it may be possible to determine with some degree of accuracy whether the derived license plate information is correct based on the vehicle information that is displayed on the mobile apparatus.

Figure 3A:
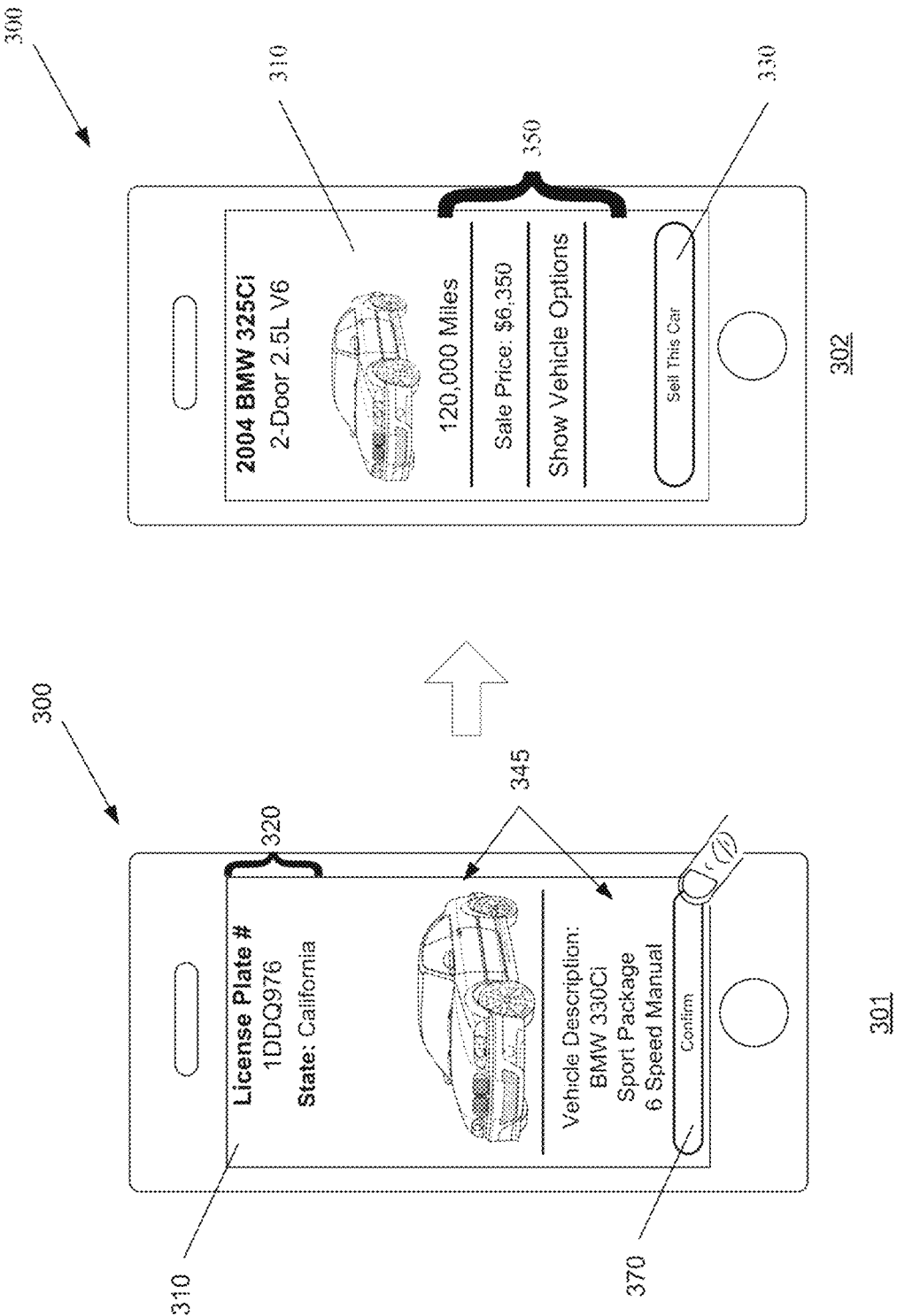
FIG. 3A illustrates an exemplary embodiment of an apparatus for displaying vehicle configuration information and posting a vehicle for sale from a license plate image.

FIG. 3A illustrates an exemplary embodiment of an apparatus for displaying vehicle configuration information and posting a vehicle for sale from a license plate image. The apparatus 300 may be a handheld wireless device. The apparatus 300 includes a display area 310. The display area 310 includes license plate information 320, selectable user interface (UI) objects 370 and 330, vehicle configuration information 345, and vehicle data 350. FIG. 3A illustrates two stages 301 and 302 of a user's interaction with the apparatus 300.

In the first stage 301, the apparatus 300 may have transmitted a license plate image to the server 230 for further processing. Such processing will be described in the foregoing figures. The apparatus 300 may display the license plate information 320. Additionally, the display area 310 may provide the configuration information 345 about the vehicle to assist the user in further identifying that the recovered license plate information is accurate. Moreover, the configuration information may be used later if the user wishes to post the vehicle for sale at an external website. Once the user has verified that the information in the display area 310 matches up with the vehicle associated with the license plate image and driver's license information, the apparatus 300 may receive a selection of the selectable UI object 370 to confirm the information.

In the second stage 302, the apparatus 300 may have received a selection of the selectable UI object 370. In response, the display area 310 may present the vehicle data 350. The vehicle data 350 may be pre-populated based on the known configuration information or the vehicle data 350 may be received by input from a user. Alternatively or in addition to, the vehicle data 350 may be editable by user input. The user may wish to adjust some of the configuration information because, for instance, the vehicle may have some aftermarket parts installed that were not part of the vehicle configuration information 345. The information may be edited by selecting the "show vehicle options" object of the vehicle data 350. Additionally, if the user wishes to post the vehicle information to a website, which may list the vehicle for sale, the apparatus may receive user input of the vehicle mileage, a price, and condition (not shown). Once all of the information has been received at the apparatus, the apparatus may receive a user interaction with the selectable UI object 330 to post the vehicle for sale.

Providing the interface described in FIGS. 1-3B provides an easy and efficient way for sellers of vehicles to make informed decisions. The interface provides sellers with accurate information so the seller can feel comfortable with determining a fair cost for selling a particular vehicle. Additionally, the information is gathered by simply capturing an image of a vehicle license plate and providing no, or minimal, further interaction.

Figure 3B:
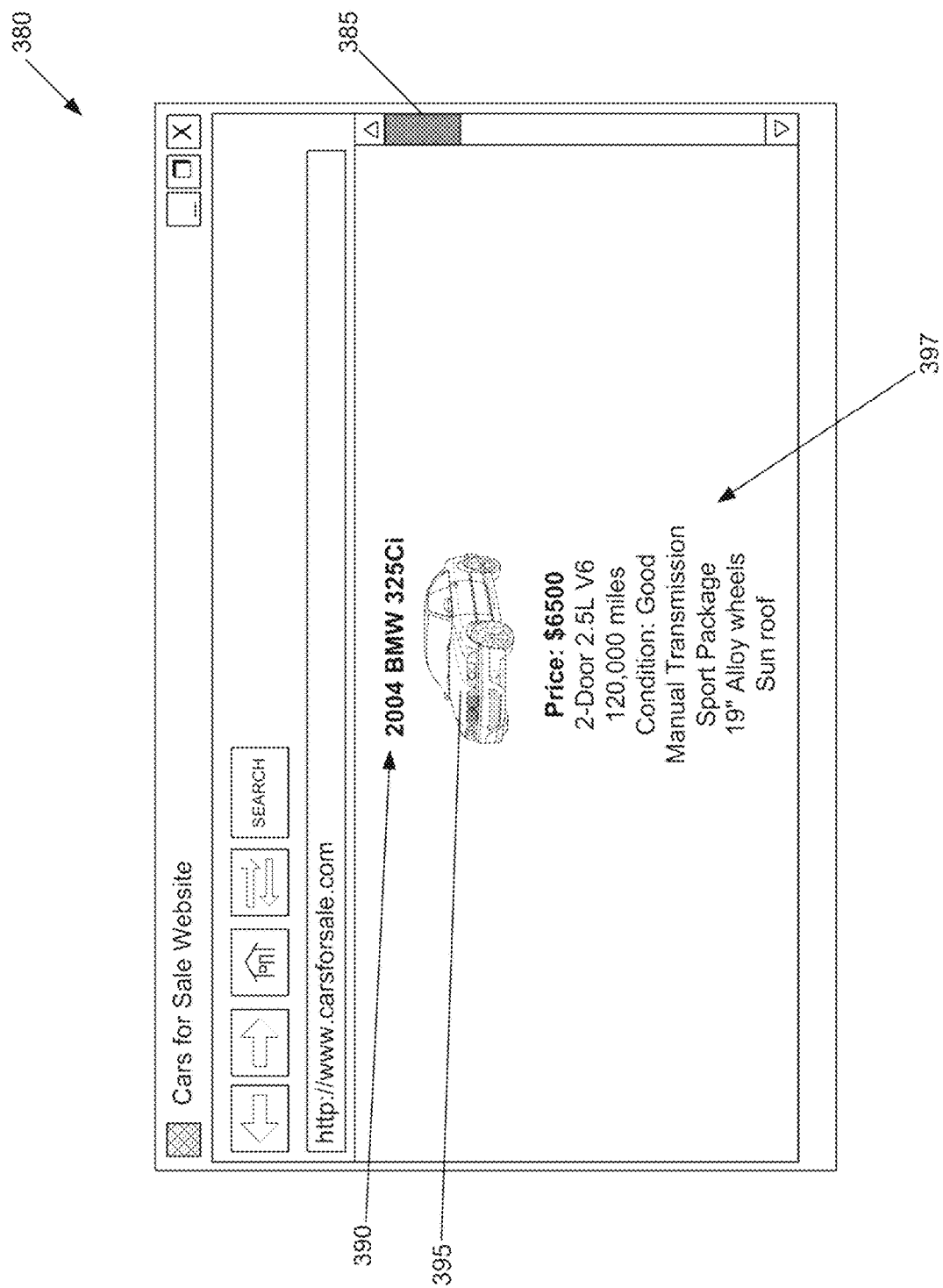
FIG. 3B illustrates an exemplary embodiment of vehicle information that has been posted to a website.

FIG. 3B illustrates an exemplary embodiment of vehicle information that has been posted to a website. As shown, FIG. 3B includes a web browser 380, vehicle information 390, vehicle image 395, vehicle configuration information and data 397, and scrollable object 385. The web browser 380 may be displayed on a mobile apparatus or a personal computer. As shown, the web browser 380 includes many of the features commonly found on traditional web browsers such as buttons and a text box for entering a URL.

The web browser 380 in this exemplary illustration is displaying the vehicle described in FIG. 3A after the apparatus 300 received a selection to post the vehicle configuration information to a website. In this exemplary illustration the website may be a website typically used for listing vehicles that are for sale. Thus, information such as the vehicle information 390, vehicle image 395, and vehicle configuration and data 397 may be pertinent to a buyer looking to purchase a vehicle. The vehicle image 395 may be a representative image of the vehicle for sale, or it may be an actual image of the vehicle for sale as captured by the apparatus 300. Such images may be included when the apparatus 300 receives the selection to post the vehicle configuration to the website. Moreover, the apparatus is not limited to only one photo. As most car listing services provide the option to upload several photos, the apparatus 300 may provide several images of the vehicle to use when posting the vehicle configuration to the website.

As shown, the web browser 380 also includes price information, mileage, and options/features that are included in the vehicle as vehicle configuration information and data 397. Additional information about the vehicle may be displayed lower in the web browser 380 window. In such instances, the scrollable object 385 may be used to scroll up and down based on received user input to view all of the vehicle features. Thus the interface discussed in FIGS. 1-3B provide a seamless mechanism for posting a vehicle for sale without having to manually enter all of the vehicle configuration information.

Figure 4:
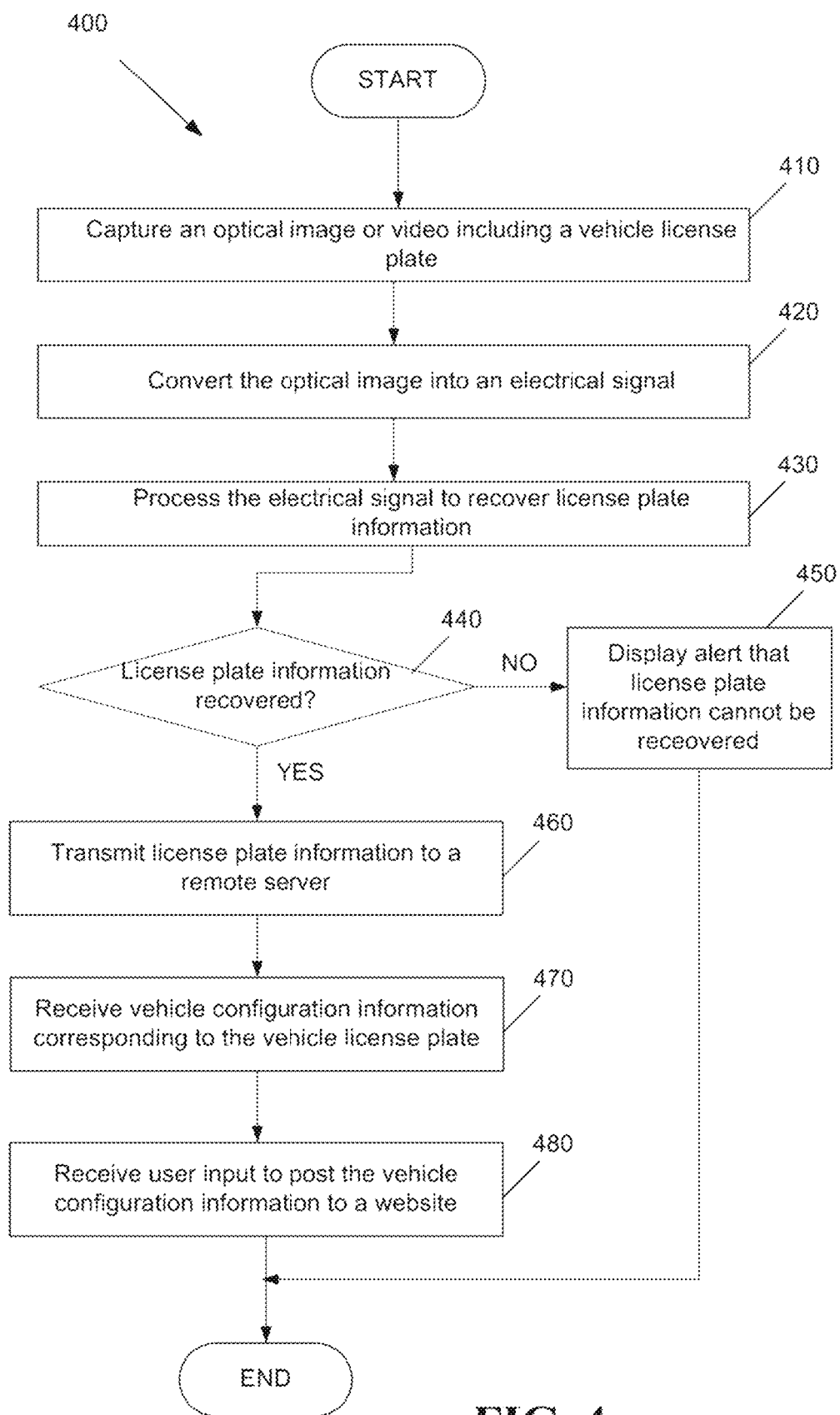
FIG. 4 conceptually illustrates an exemplary embodiment of a process of receiving vehicle configuration information and posting a vehicle for sale from an optical image.

FIG. 4 conceptually illustrates an exemplary embodiment of a process 400 of receiving vehicle configuration information and posting a vehicle for sale from an optical image. The process 400 may be performed by a mobile apparatus such as the apparatus 130 described with respect to FIG. 1. The process 400 may begin after an image capture capability or an application is initiated on the mobile apparatus. In some aspects of the process, the application may enable the image capture feature on the mobile apparatus.

As shown, the process 400 captures (at 410) an optical image that includes a vehicle license plate image. As will be discussing in the following figure, some aspects of the apparatus may process a video. A frame may then be extracted and converted to an image file.

At 420, the process 400 converts the optical image into an electrical signal. The process 400 then processes (at 430) the electrical signal to recover license plate information. The process 400 determines (at 440) whether the license plate information was successfully recovered. When the license plate information was successfully recovered, the process 400 transmits (at 460) the license plate information to a remote server. The process 400 then receives (at 470) vehicle configuration information corresponding to the vehicle license plate. The process 400 then receives (at 480) user input to post the vehicle configuration information to a website. The process 400 then ends.

Returning to 440, when the process 400 determines that the license plate information was not successfully recovered, the process 400 displays (at 450) an alert that the license plate information was not recovered. In some aspects of the process, a message guiding the user to position the mobile apparatus to achieve greater chances of recovering the license plate information may be provided with the displayed alert. The process then ends. However, in some aspects of the process, rather than end, the process may optionally return to capture (at 410) another optical image and repeat the entire process 400.

Figure 5A:
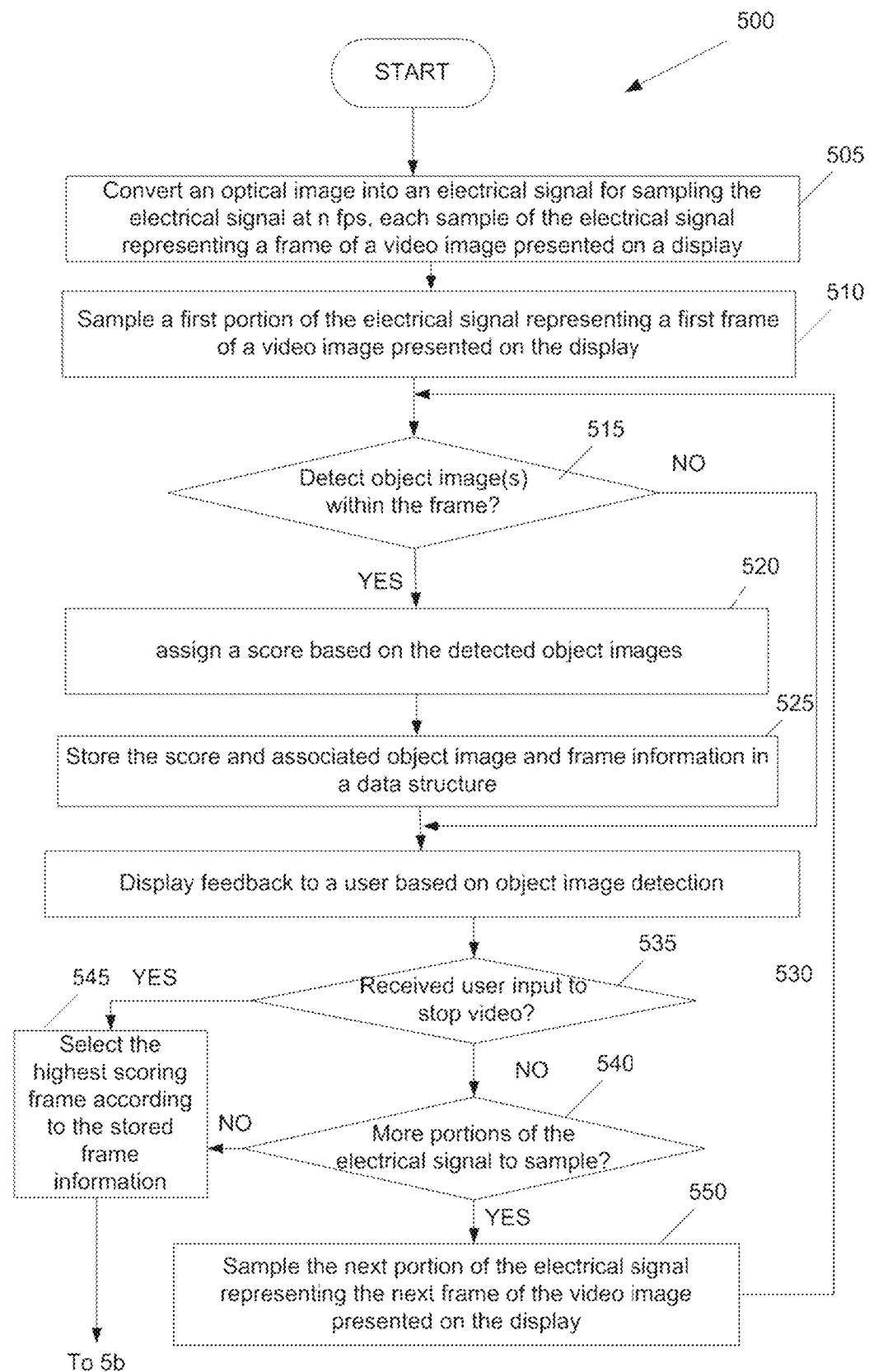
FIGS. 5A and 5B conceptually illustrate an exemplary embodiment of receiving vehicle configuration information and posting a vehicle for sale from a video.
Figure 5B:
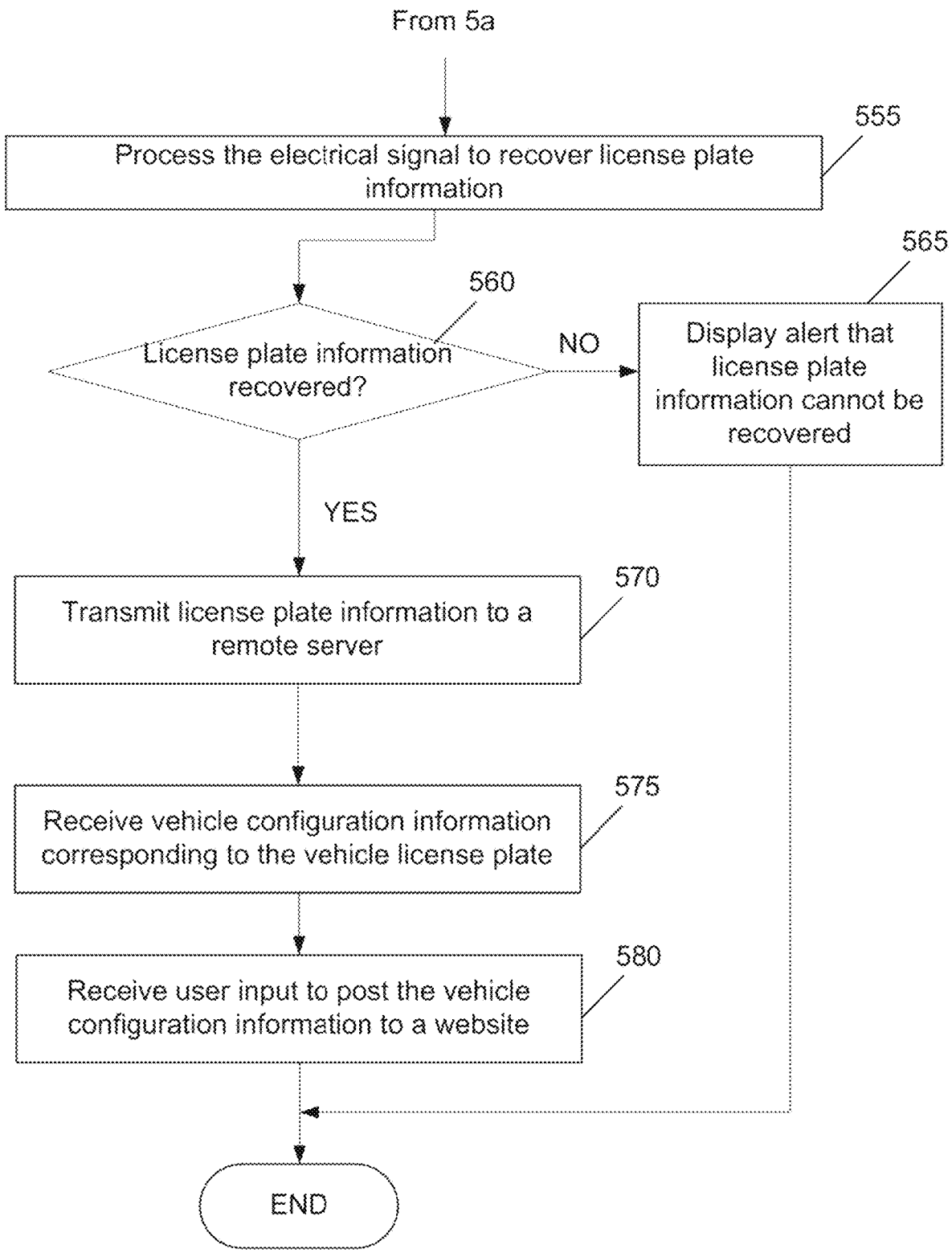

FIGS. 5a and 5b conceptually illustrate an exemplary embodiment of a process 500 of receiving vehicle configuration information and posting a vehicle for sale from a video. The process 500 may be performed by a mobile apparatus such as the apparatus 130 described with respect to FIG. 1. The process 500 may begin after an image and/or video capture capability or an application is initiated on the mobile apparatus. The application may enable the image and/or video capture feature on the mobile apparatus.

As shown, the process 500 converts (at 505) an optical image into an electrical signal for sampling the electrical signal at n frames/second (fps). In some aspects of the process, the process may sample the electrical signal at intervals such as 24 fps or any other suitable interval for capturing video according to the apparatus' capabilities. Each sample of the electrical signal represents a frame of a video image presented on a display. The process 500 samples (at 510) a first portion of the electrical signal representing a first frame of the video image presented on the display. The process then determines (at 515) whether any object image(s) are detected within the frame. At least one of the detected object image(s) may comprise a license plate image. When the process 500 determines that at least object image exists within the frame, the process 500 assigns (at 520) a score based on the detected object image. The score may be based on the likelihood that at least one of the object images is a license plate image and is discussed in greater detail below with respect to FIGS. 21 and 22. The score may be applied to each object image and/or aggregated for each object image detected in the frame. The process may then store (at 525) the score and associated object image and frame information in a data structure. In some aspects of the process, the process 500 may store the aggregated object image score and/or the process 500 may store the highest scoring object image in the frame.

When the process 500 determines (at 515) that no object image exists within the frame or after the process 500 stores the score (at 525), the process 500 displays feedback to a user based on the object image detected (or not detected). For instance, when no object image is detected in the frame, the process 500 may display a message guiding the user on how to collect a better optical image. However, when at least one object image is detected in the frame, the process 500 may provide feedback by overlaying rectangles around the detected object image(s). Alternatively or conjunctively, the process 500 may overlay a rectangle that provides a visual cue such as a distinct color, indicating which object image is determined to most likely be a license plate image or has a higher score than other object images within the frame. In some aspects, the visual cue may be provided when a particular object image receives a score above a threshold value.

The process 500 optionally determines (at 535) whether user input has been received to stop the video. Such user input may include a gestural interaction with the mobile apparatus, which deactivates the camera shutter on the mobile apparatus. When the process 500 determines (at 535) that user input to stop the video capture is received, the process 500 selects (at 545) the highest scoring frame according to the stored frame information. When the process 500 determines (at 535) that user input to stop the video capture has not been received, the process 500 determines (at 540) whether to sample additional portions of the electrical signal. In some aspects of the process, such a determination may be based on a predetermined number of samples. For instance, the mobile apparatus may have a built in and/or configurable setting for the number of samples to process before a best frame is selected. In other aspects of the process, such a determination may be based on achieving a score for a frame or object image in a frame that is above a predetermined threshold value. In such aspects, the frame or frame comprising the object image that is above the threshold score will be selected (at 545). When process 500 determines that there are more portions of the electrical signal to be sampled, the process 500 samples (at 550) the next portion of the electrical signal representing the next frame of the video image presented on the display. The process 500 then returns to detect (at 515) object image(s) within the next frame. In some aspects of the process, the process may receive user input to stop the video capture at any point while process 500 is running. Specifically, the process is not confined to receiving user input to halt video capture after the feedback is displayed (at 530); the user input may be received at anytime while the process 500 is running. In such aspects, if at least one object image has been scored, then the process 500 will still select (at 545) the highest scoring object image. However, if no object images were scored, then the process will simply end.

In some aspects of the process, the process 500 may optionally use the object image(s) detected in the previous sample to estimate the locations of the object images in the sample. Using this approach optimizes processing time when the process can determine that the mobile apparatus is relatively stable. For instance, the mobile apparatus may concurrently store gyro accelerometer data. The process 500 may then use gyro accelerometer data retrieved from the mobile apparatus to determine whether the mobile apparatus has remained stable and there is a greater likelihood that the object image(s) will be in similar locations. Thus, when the process 500 can determine that the mobile apparatus is relatively stable, the processing time for license plate detection may be increased because less of the portion of the electrical signal that represents the video image would need to be searched for the license plate image.

Alternatively or conjunctively, the process 500 may not use information about object image(s) from the previous frame as a predictor. Instead, the process 500 may undergo the same detection and scoring process discussed above. Then, for each object image that overlaps an object image detected in a previous frame (e.g., the object images share similar pixels either by space and/or location in the frames), the previous frame receives a higher score. Information about the overlapping object image(s) may be maintained for optimized processing later on. Additionally, in some aspects of the apparatus, the license plate detection apparatus may maintain a table of matching object image(s) for the sampled portions of the electrical signal representing frames of video images over time. In such aspects, some object image(s) may exist in one or a few of the frames or some may exist in many or all frames and accordingly with higher scores. In such instances, all of the overlapping object images may be processed as discussed in greater detail in the foregoing sections and provided to the server for OCR or identification. This would lead to greater accuracy in actual license plate detection and OCR results.

Returning now to FIGS. 5a and 5b, after selecting (at 545) the highest scoring frame, the process 500 processes (at 555) the electrical signal based on the information associated with the selected frame to recover license plate information. The process 500 then determines (at 560) whether license plate information was recovered from the electrical signal. When the process 500 determines (at 560) that license plate information has been recovered, the process 500 transmits (at 570) the license plate information to a remote server. The process 500 then receives (at 575) vehicle configuration information corresponding to the vehicle license plate. The process 500 then receives (at 580) user input to post the vehicle configuration information to a website. The process 500 then ends.

Returning to 560, when the process 500 determines that license plate information was not detected, the process 500 displays (at 565) an alert that license plate information cannot be recovered. Such an alert may guide the user to acquiring better video that is more likely to produce a readable license plate image. For instance, the alert may guide the user's mobile device position or angle. The process 500 may then return to collect additional video.

Figure 6:
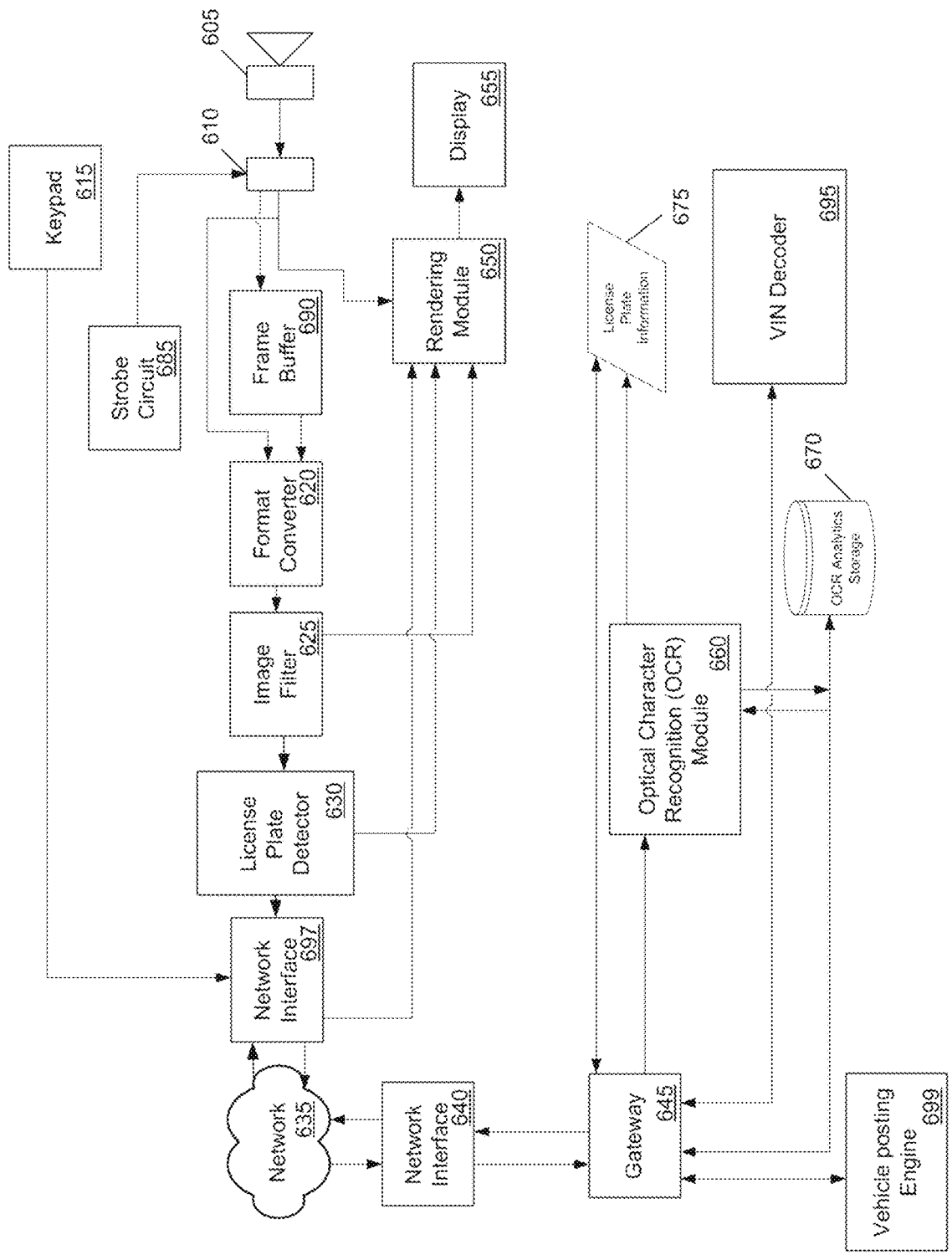
FIG. 6 illustrates an exemplary embodiment of a system architecture of a license plate detection apparatus.

FIG. 6 illustrates an exemplary embodiment of a system architecture of a license plate detection apparatus. The plate detection apparatus may be a mobile apparatus such as the apparatus 130 described with respect to FIG. 1 or any other suitable mobile apparatus that has image capture and processing capabilities.

The license plate detection apparatus includes an image capture apparatus 605, an imager 610, a keypad 615, a strobe circuit 685, a frame buffer 690, a format converter 620, an image filter 625, a license plate detector 630, a network 635, network interfaces 640 and 697, a gateway 645, a rendering module 650, and a display 655. The license plate detection apparatus may communicate with a server having OCR Module 660, and an OCR analytics storage 670. However, in some aspects of the apparatus, the OCR module and/or OCR analytics storage may be part of the mobile apparatus. The license plate detection apparatus illustrated in FIG. 6 generates license plate information 675, which may be routed through the gateway 645 processed for delivering the processed information VIN decoder 695. The vehicle posting engine 699 may use information from the VIN decoder 695. The VIN decoder 695 may be used to obtain a vehicle configuration from a license plate image. The vehicle posting engine 699 may be used to post the obtained vehicle configuration information. In some aspects of the apparatus, the VIN decoder 695 may be tied to service that provides vehicle configuration information, which is accessible via an API. The vehicle posting engine 699 may also communicate with external web hosts via an API.

As shown, the image capture apparatus 605 communicates an optical image to the imager 610. The image capture apparatus 605 may comprise a camera lens and/or a camera that is built into a mobile apparatus. The imager 610 may comprise a CMOS array, NMOS, CCD, or any other suitable image sensor that converts an optical image into an electrical signal (e.g., raw image data). The electrical signal comprises pixel data associated with the captured image. The amount of pixel data is dependent on the resolution of the captured image. The pixel data is stored as numerical values associated with each pixel and the numerical values indicate characteristics of the pixel such as color and brightness. Thus, the electrical signal comprises a stream of raw data describing the exact details of each pixel derived from the optical image. During the image capture process, the imager 610 may produce a digital view as seen through the image capture apparatus for rendering at the display 655.

In some aspects of the apparatus, the image capture apparatus 605 may be configured to capture video. In such aspects, a timing circuit, such as the strobe circuit 685, may communicate with the imager 610. The strobe circuit 685 may sample (or clock) the imager 610 to produce a sampled electrical signal at some periodicity such as 24-30 fps. The sampled electrical signal may be representative of a frame of video presented on the display 655. The electrical signal may be provided to the frame buffer 690. However, the imager 610 may communicate the electrical signal directly to the format converter 620 when a single optical image is captured. When video is captured, the frame buffer may communicate the sample of the electrical signal representative of the frame of video from the frame buffer to the format converter 620. However, in some aspects of the apparatus, the frame buffer 690 may be bypassed such that the sampled electrical signal is communicated directly to the format converter 620.

The format converter 620 generates or compresses the raw image pixel data provided in the electrical signal to a standard, space efficient image format. However, in some aspects of the apparatus, the frame buffer 690 and format converter 620 may be reversed such that the sampled electrical signals are converted to a compressed standard video format before buffering. The standard image and/or video format can be read by the following modules of the license plate detection apparatus. However, the following description will assume that the sampled electrical signals are buffered before any such format conversion. The format converter 620 will be described in greater detail in FIG. 7.

The format converter 620 communicates the standard image file (or image) to the image filter 625. The image filter 625 performs a variety of operations on the image to provide the optimal conditions to detect a license plate image within the image. Such operations will be described in greater detail in FIG. 8. However, if the image filter 625 determines that the image is too distorted, noisy, or otherwise in a condition that is unreadable to the point that any filtering of the image will not result in a viable image for plate detection, the image filter 625 will signal to the rendering module 650 to display an alert on the display 655 that the image is not readable. Alternatively, once the image is filtered, ideally the image should be in a state that is optimal for accurate license plate detection. Therefore, the image filter 625 will then communicate the filtered image to the license plate detector 630.

The license plate detector 630 is an integral module of license plate detection apparatus. The plate detector 630 will process the image to detect the presence of a license plate image by implementing several processes which will be described in greater detail in FIG. 9. In general, the license plate detector 630 provides for optical character recognition of the license plate image. In one aspect, the license plate detector may generate overlays such as rectangular boxes around object images it detects as potential or candidate license plate images. The overlays may be transmitted as signals from the license plate detector 630 to the rendering module 650. The rendering module may instruct the display 655 to display the overlays over the image received from the imager 610 so that the user of the mobile apparatus can receive visual guidance relating to what object images the license plate detection apparatus detects as candidate license plate images. Such information is useful in guiding the user to capture optical images that include the license plate image and provide a higher likelihood of accurate license plate information recovery.

The license plate detector 630 will determine which portion of the image (or electrical signal) is most likely a license plate image. The license plate detector 630 will then transmit only the license plate image portion of the image to the network 635 by way of the network interface 697. Alternatively, a user may skip the entire image conversion process and using the keypad 615, key in the license plate information, which is then transmitted over the network 635 by way of the network interface 697. The network 635 then transmits the license plate image information (or image file) or keyed information to the network interface 640, which transmits signals to the gateway 645.

The gateway 645 may transmit the license plate image data to the OCR module 660. The OCR module 660 derives the license plate information such as state and number information from the license plate image. The OCR module 660 may use several different third party and/or proprietary OCR applications to derive the license plate information. The OCR module 660 may use information retrieved from the OCR analytics storage 670 to determine which OCR application has the greatest likelihood of accuracy in the event that different OCR applications detected different characters. For instance, the OCR analytics storage 670 may maintain statistics collected from the user input received at the apparatus 300 described with respect to FIG. 3A. The OCR module 660 may then select the license plate information that is statistically most likely to be accurate using information retrieved from the analytics storage 670. The OCR module 660 may then transmit the license plate information 675 as a text string or strings to the gateway 645, which provides the license plate information 675 to the rendering module 650 through the network 635. The rendering module 650 may then instruct the display 655 to display the license plate information 675. The display 655 may then display a message similar to the one described with respect to FIG. 3A.

Additionally, the license plate information 675 may be transmitted through the gateway 645 and processed by various modules communicatively coupled to the gateway 645. The gateway 645 may then transmit the processed information to the VIN Decoder 695. The VIN decoder 695 may communicate with at one least third party service by way of an API to receive vehicle configuration information and to post the configuration information. The configuration information may be transmitted back to the gateway 645 for further processing, which may include transmitting the vehicle configuration to the vehicle posting engine 699 to post the vehicle configuration information to a website. Alternatively, or in addition to, the gateway 645 may transmit the vehicle configuration information to the rendering module 650 through the network 635. The rendering module 650 may then instruct the display 655 to display the vehicle configuration information along with any other information to assist the user of the mobile apparatus. Additionally, the vehicle posting engine 699 may communicate with various internet services that specialize in used car sales.

In the event that the OCR module 660 or the license plate detector 630 is unable to detect a license plate image or identify any license plate information, the OCR module 660 and/or the license plate detector 630 will signal an alert to the rendering module 650, which will be rendered on the display 655.

In some aspects of the apparatus, the OCR module 660 may be located on an apparatus separate from an external server. For instance, the OCR module 660 may be located on the mobile apparatus 130 similar to the license plate detection apparatus. Additionally, in some aspects of the apparatus, the format converter 620, image filter 625, and license plate detector 630 may be located on an external server and the electrical signal recovered from the optical image may be transmitted directly to the network 635 for processing by the modules on the external server.

The license plate detection apparatus provide several advantages in that it is not confined to still images. As discussed above, buffered or unbuffered video may be used by the license plate detection apparatus to determine the frame with the highest likelihood of having a license plate image. It also enables optical images to be taken while a mobile apparatus is moving and accounts for object images recovered from any angle and/or distance. Additionally, the license plate detection apparatus also provides the added benefit of alerting the user when a license plate image cannot be accurately detected in addition to guidance relating to how to get a better image that is more likely to produce license plate information. Such guidance may include directional guidance such as adjusting the viewing angle or distance as well as guidance to adjust lighting conditions, if possible. Thus, the license plate detection apparatus provides a solution to the complicated problem of how to derive license plate information captured from moving object images and from virtually any viewing angle. The license plate information may then be used to derive different information associated with the license plate information such an estimated value for a vehicle.

Figure 7:
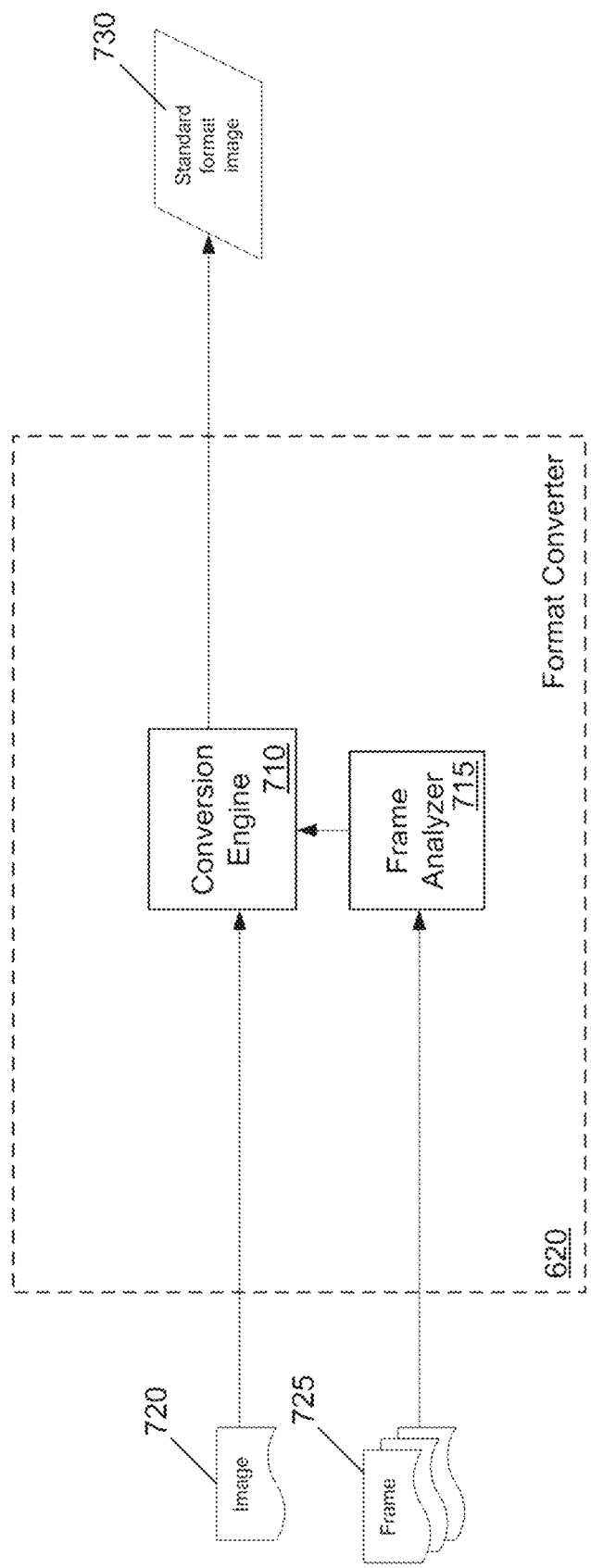
FIG. 7 illustrates an exemplary embodiment of a diagram of the format converter.

FIG. 7 illustrates an exemplary embodiment of a diagram of the format converter 620. The format converter 620 receives the input of an electrical signal that defines an image 720 or an electrical signal that defines a sequence of sampled images such as video frames 725. The format converter 620 outputs an image file 730 in a standard format such as the formats discussed above with respect to FIG. 1. The format converter 620 includes a frame analyzer 715 and a conversion engine 710. When an electrical signal defining an image 720 is received at the format converter 620, the electrical signal will be read by the conversion engine 710. The conversion engine 710 translates the pixel data from the electrical signal into a standard, compressed image format file 730. Such standard formats may include .jpeg, .png, .gif, .tiff or any other suitable image format similar to those discussed with respect to FIG. 1. In the exemplary instance where the format converter 620 converts video to a standard format, the standard format may include .mpeg, .mp4, .avi, or any other suitable standard video format. Since the electrical signal received at the format converter 620 is raw data which can make for a very large file, the conversion engine may compress the raw data into a format that requires less space and is more efficient for information recovery.

The format converter 620 may also receive a several sampled electrical signals, each representing frames of video images, such as frame data 725. The video data frames may be received at the frame analyzer 715 in the format converter

620. The frame analyzer 715 may perform a number of different functions. For instance, the frame analyzer 715 may perform a function of analyzing each frame and discarding any frames that are blurry, noisy, or generally bad candidates for license plate detection based on some detection process such as the process 500 described in FIG. 5. Those frames that are suitable candidates for license plate detection may be transmitted to the conversion engine 710 and converted to the standard format image 730 similar to how the image 720 was converted.

Figure 8:
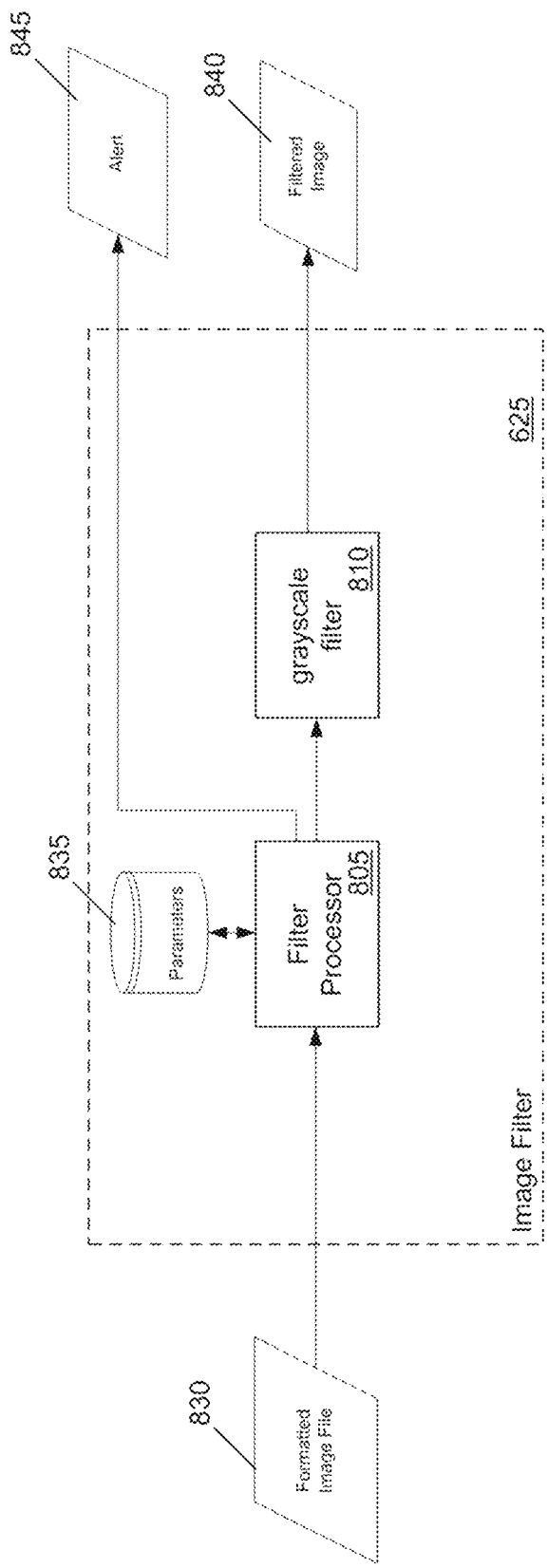
FIG. 8 illustrates an exemplary embodiment of a diagram of the image filter.

FIG. 8 illustrates an exemplary embodiment of a diagram of the image filter 625. The image filter 625 receives a formatted image file that the image filter 625 is configured to read. The image filter 625 outputs a filtered image 840 which may be optimized for more reliable license plate recognition. Alternatively, if the image filter 625 determines that the image is unreadable, the image filter 625 may signal an alert 845, indicating to the user that the image is unreadable and/or guide the user to capture a better image.

The image filter 625 includes a filter processor 805, a grayscale filter 810, and a parameters storage 835. When the image filter 625 receives the formatted image file 830, the filter processor 805 will retrieve parameters from the parameters storage 835, which will assist the filter processor 805 in how to optimally filter the image. For instance, if the received image was taken in cloudy conditions, the filter processor 805 may adjust the white balance of the image based on the parameters retrieved from the parameters storage 835. If the image was taken in the dark, the filter processor 805 may use a de-noise function based on the parameters retrieved from the parameters storage 835 to remove excess noise from the image. In some aspects of the apparatus, the filter processor 805 also has the ability to learn based on the success of previously derived license plate images what parameters work best or better in different conditions such as those conditions described above. In such aspects, the filter processor 805 may take the learned data and update the parameters in the parameters storage 835 for future use.

The filter processor 805 also has logic to determine if an image will be readable by the license plate detector 630. When the filter processor 805 determines that the image will not be readable by the license plate detector 630, the filter processor 805 may signal an alert 845 to the rendering module 650. However, when the filter processor 805 determines that sufficient filtering will generate a readable image for reliable license plate detection, the filter processor 805 communicates the image, post filtering, to the grayscale filter 810.

Additionally, in some aspects of the apparatus, the image filter 625 may receive several images in rapid succession. Such instances may be frames of a video that may be captured while a mobile apparatus is moving. In such instances, the filter processor 805 may continuously adjust the filter parameters to account for each video frame, it receives. The same alerts may be signaled in real-time in the event that a video frame is deemed unreadable by the filter processor 805.

The grayscale filter 810 will convert the received image file to grayscale. More specifically, the grayscale filter will convert the pixel values for each pixel in the received image file 830 to new values that correspond to appropriate grayscale levels. In some aspects of the filter, the pixel values may be between 0 and 255 (e.g., 256 values or $2^8$ values). In other aspects of the filter, the pixel values may be between 0 and any other value that is a power of 2 minus 1, such as 1023, etc. The image is converted to grayscale, to simplify and/or speed up the license plate detection process. For instance, by reducing the number of colors in the image, which could be in the millions, to shades of gray, the license plate image search time may be reduced.

In the grayscale image, regions with higher intensity values (e.g., brighter regions) of the image will appear brighter than regions of the image with lower intensity values. The grayscale filter 810 ultimately produces the filtered image 840. However, one skilled in the art should recognize that the ordering of the modules is not confined to the order illustrated in FIG. 8. Rather, the image filter may first convert the image to grayscale using the grayscale filter 810 and then filter the grayscale image at the filter processor 805. The filter processor 805 then outputs the filtered image 840. Additionally, it should be noted that the image filter 625 and the format converter 620 may be interchangeable. Specifically, the order in which this image is processed by these two modules may be swapped in some aspects of the apparatus.

Figure 9:
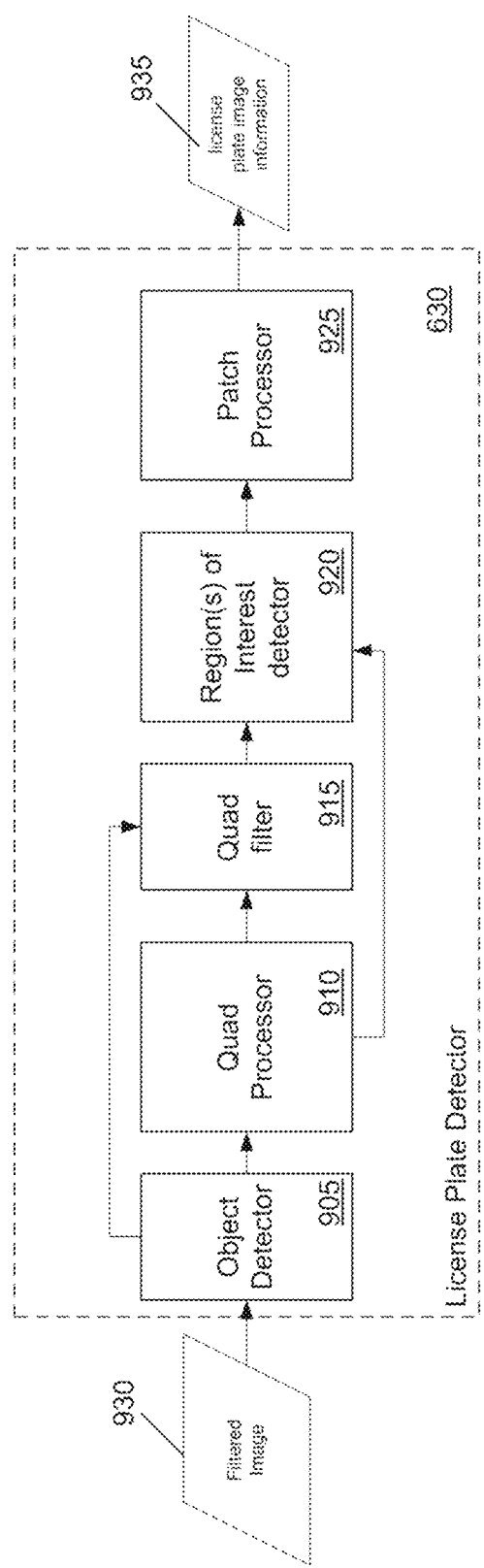
FIG. 9 illustrates an exemplary embodiment of a diagram of a license plate detector.

FIG. 9 illustrates an exemplary embodiment of a diagram of the license plate detector 630. The license plate detector 630 receives a filtered image 930 and processes the image to determine license plate information 935, which is may be a cropped image of at least one license plate image. The license plate detector 630 comprises an object detector 905, a quad processor 910, a quad filter 915, a region(s) of interest detector 920, and a patch processor 925. The license plate detector 630 provides the integral function of detecting a license plate image from an image at virtually any viewing angle and under a multitude of conditions, and converting it to an image that can be accurately read by at least one OCR application.

The license plate detector 630 receives the filtered image 930 at the object detector 905. As discussed above, the filtered image 930 has been converted to a grayscale image. The object detector 905 may use a mathematical method, such as a Maximal Stable Extremal Regions (MSER) method, for detecting regions in a digital image that differ in properties, such as brightness or color, compared to areas surrounding those regions. Simply stated, the detected regions of the digital image have some properties that are constant or vary within a pre-described range of values; all the points (or pixels) in the region can be considered in some sense to be similar to each other. This method of object detection may provide greater accuracy in the license plate detection process than other processes such as edge and/or corner detection. However, in some instances, the object detector 905 may use edge and/or corner detection methods to detect object images in an image that could be candidate license plate images.

Typically, the object images detected by the object detector 905 will have a uniform intensity throughout each adjacent pixel. Those adjacent pixels with a different intensity would be considered background rather than part of the object image. In order to determine the object images and background regions of the filtered image 930, the object detector 905 will construct a process of applying several thresholds to the image. Grayscale images may have intensity values between 0 and 255, 0 being black and 255 being white. However, in some aspects of the apparatus, these values may be reversed with 0 being white and 255 being black. An initial threshold is set to be somewhere between 0 and 255. Variations in the object images are measured over a pre-determined range of threshold values. A delta parameter indicates through how many different gray levels a region needs to be stable to be considered a potential detected object image. The object images within the image that remain unchanged, or have little variation, over the applied delta thresholds are selected as likely candidate license plate images. In some aspects of the detector, small variations in the object image may be acceptable. The acceptable level of variations in an object image may be programmatically set for successful object image detection. Conversely or conjunctively, the number of pixels (or area of the image) that must be stable for object image detection may also be defined. For instance, a stable region that has less than a threshold number of pixels would not be selected as an object image, while a stable region with at least the threshold number of pixels would be selected as an object image. The number of pixels may be determined based on known values relating to the expected pixel size of a license plate image or any other suitable calculation such as a height to width ratio.

In addition, the object detector 905 may recognize certain pre-determined textures in an image as well as the presence of informative features that provide a greater likelihood that the detected object image may be a license plate image. Such textures may be recognized by using local binary patterns (LBP) cascade classifiers. LBP is especially useful in real-time image processing settings such as when images are being captured as a mobile apparatus moves around an area. Although commonly used in the art for image facial recognition, LBP cascade classifiers may be modified such that the method is optimized for the detection of candidate license plate images.

In an LBP cascade classification, positive samples of an object image are created and stored on the license plate detection apparatus. For instance, a sample of a license plate image may be used. In some instances multiple samples may be needed for more accurate object image detection considering that license plates may vary from state to state or country to country. The apparatus will then use the sample object images to train the object detector 905 to recognize license plate images based on the features and textures found in the sample object images. LBP cascade classifiers may be used in addition to the operations discussed above to provide improved detection of candidate license plate images.

Once the object detector 905 has detected at least one object as a candidate license plate image, the object detector 905 will pass information relating to the detected object images to the quad processor 910 and/or the quad filter 915. In some aspects of the detector, the object images may not be of a uniform shape such as a rectangle or oval. The quad processor 910 will then fit a rectangle around each detected object image based on the object image information provided by the object detector 905. Rectangles are ideal due to the rectangular nature of license plates. As will be described in the foregoing, information about the rectangles may be used to overlay rectangles on object images that are displayed for the user's view on a mobile apparatus.

The rectangle will be sized such that it fits minimally around each object image and all areas of the object image are within the rectangle without more additional background space than is necessary to fit the object image. However, due to various factors such as the angle at which the optical image was taken, the license plate image may not be perfectly rectangular. Therefore, the quad processor 910 will perform a process on each object image using the rectangle to form a quadrilateral from a convex hull formed around each object image.

The quad processor 910 will use an process that fits a quadrilateral as closely as possible to the detected object images in the image. For instance, the quad processor 910 will form a convex hull around the object image. A convex hull is a polygon that fits around the detected object image as closely as possible. The convex hull comprises edges and vertices. The convex hull may have several vertices. The quad processor 910 will take the convex hull and break it down to exactly four vertices (or points) that fit closely to the object image.

FIGS. 10-12 illustrate the functionality of the quad processor 910. As shown, FIG. 10 illustrates an exemplary embodiment of an object image 1005 with a convex hull 1010 fit around the object image 1005, and a blown up region 1015. The convex hull 1010 comprises several edges and vertices including vertices A-D. In order to fit the object image 1005 into a quadrilateral, the convex hull 1010 may be modified such that only 4 vertices are used. For instance, as illustrated in FIG. 11, for each adjacent pair of points A-D in the convex hull 1010, the quad processor 910 will find a new point Z that maintains convexity and enclosure of the object image when B and C are removed. Point Z is chosen as a point that provides a minimal increase to the hull area and does not go outside of the originally drawn rectangle (not shown). Thus, FIG. 11 illustrates an exemplary embodiment of a method for forming a quadrilateral (shown in FIG. 12) from the convex hull 1010. The process repeats for each set of 4 points until the convex hull 1010 is compressed to only four vertices as illustrated in FIG. 12.

FIG. 12 illustrates an exemplary embodiment of the object image 1005 enclosed in a quadrilateral 1210. As shown in FIG. 12, Quadrilateral 1210 fits as closely to the object image 1005 as possible without any edge overlapping the object image 1005. Fitting a quadrilateral closely to an object image as illustrated by the FIGS. 10-12 provides the benefit of greater efficiency in the license plate detection process. As will be described below, the license plate detection apparatus will only search the portions of the image within the quadrilaterals for the presence of a license plate image.

Referring back to FIG. 9, now that the quad processor 910 has drawn efficient quadrilaterals around each of the detected object images, the coordinates of the quadrilaterals are passed to the quad filter 915 and/or the region(s) of interest detector 920. As discussed above, the license plate detection apparatus first overlays rectangles around each detected object image. The quad filter 915 may use the rectangle information (rather than the quadrilateral information) received from the object detector 905, such as the pixel coordinates of the rectangles in the image, and look for rectangles similar in size and that overlap. The quad filter 915 will then discard the smaller rectangle(s), while maintaining the biggest. If at least two rectangles are of an identical size and overlap, the quad filter 915 will use a mechanism to determine which rectangle is more likely to be a full license plate image and discard the less likely image within the other rectangle(s). Such mechanisms may involve textures and intensity values as determined by the object detector 905. In some aspects of the filter, rather than searching only rectangles, the quad filter 915 may alternatively or additionally search the quadrilateral generated by the quad processor 910 for duplicates and perform a similar discarding process. By filtering out the duplicates, only unique object images within the rectangles will remain, with the likelihood that at least one of those object images is a license plate image. Thus, at this point, the license plate detection apparatus will only need to search the areas within the rectangles or quadrilaterals for the license plate image.

The region(s) of interest detector 920 will then determine which of the object images are actually object images that that have similar proportions (e.g., height and width) to the proportions that would be expected for a license plate image. For instance, typically a license plate is rectangular in shape. However, depending on several factors such as the angle that the license plate image was captured, the object image may appear more like a parallelogram or trapezoid. However, there is a limit to how much skew or keystone (trapezoidal shape) a license plate image undergoes before it becomes unreadable. Therefore, it is necessary to compute a skew factor and/or keystone to determine whether the object image may be a readable license plate image. Specifically, object images that have a skew factor and/or keystone below and/or above a threshold value are likely object images that do not have the proportions expected for a license plate image or would likely be unreadable. Since a license plate has an expected proportion a threshold skew factor and/or keystone may be set and any detected object image that has a skew factor and/or keystone indicating that the object image is not a readable license plate image will be discarded. For instance, license plate images with a high skew and/or high keystone may be discarded.

In some aspects of the apparatus, the skew and keystone thresholds may be determined by digitally distorting known license plate images with varying amounts of pitch and yaw to see where the identification process and/or OCR fails. The threshold may also be dependent on the size of the object image or quadrilateral/trapezoid. Thus, quadrilaterals or trapezoids must cover enough pixel space to be identified and read by the OCR software. Those that do not have a large enough pixel space, skew factors that are too high, and/or keystones that are too high would then be discarded as either being unlikely candidates for license plate images or unreadable license plate images.

The skew factor is computed by finding the distance between opposing vertices of the quadrilateral and taking the ratio of the shorter distance to the longer distance so that the skew factor is less than or equal to 1. Rectangles and certain parallelograms that are likely candidate license plate images will have a skew factor that is close to 0, while skewed parallelograms will have a high skew factor. Additionally, trapezoids that are likely candidate license plate images will have a keystone that is close to 0, while trapezoids that are unlikely candidate license plate images will have a high keystone. Therefore, object images with a high skew factor are discarded, while the parallelograms with a lower skew factor and trapezoids with a lower keystone are maintained. In some aspects of the apparatus, a threshold skew and a threshold keystone may be defined. In such aspects, parallelograms having a skew factor below the threshold are maintained while those above the threshold are discarded. Similarly, in such aspects, trapezoids having a keystone below the threshold are maintained while those above the threshold are discarded. When the value is equal to the threshold, the parallelogram or trapezoid may be maintained or discarded depending on the design of the apparatus.

The remaining parallelograms and trapezoids are then dewarped. The dewarping process is particularly important for the trapezoids because it is used to convert the trapezoid into a rectangular image. The dewarping process uses the four vertices of the quadrilateral and the 4 vertices of an un-rotated rectangle with an aspect ratio of 2:1 (width: height), or any other suitable license plate aspect ratio, to computer a perspective transform. The aspect ratio may be pixel width:pixel height of the image. The perspective transform is applied on the region around the quadrilateral and the 2:1 aspect ratio object image is cropped out. The cropped object image, or patch, is an object image comprising a candidate license plate image.

The patch is then provided to the patch processor 925, which will search for alpha numeric characters in the patch, find new object images within the patch, fit rectangles around those object images, and compute a score from the fit rectangles. The score may be based on a virtual line that is drawn across the detected object images. If a line exists that has a minimal slope, the object images on that line may receive a score that indicates the object image is highly likely to be a license plate image. If no line with a minimal slope is detected, then an alert may be returned to the rendering module that a license plate image was not detected in the image. Scores may be calculated for several different patches from the same image and it follows that more than one license plate image may be detected in the same image. Once, the presence of a license plate image is detected, the license plate information 935 may be transmitted to a server for OCR and further processing. In some aspects of the apparatus, the license plate information is an image file comprising the license plate image. Additionally, the process for scoring the patch will be described in more detail with respect to FIG. 21.

Figure 13:
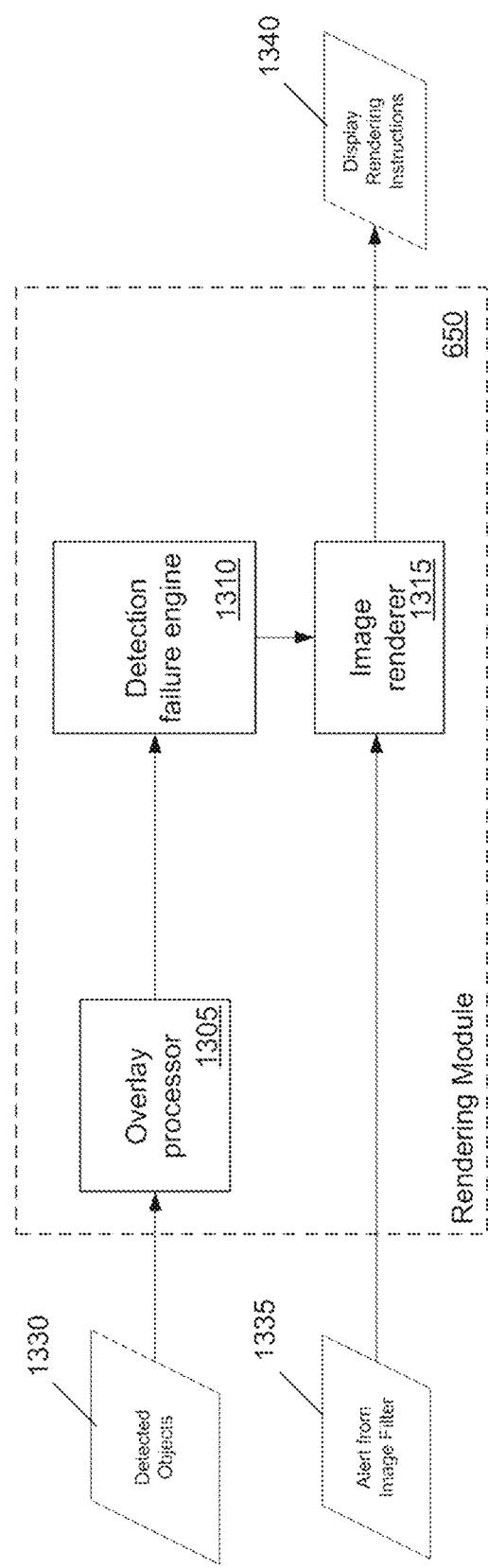
FIG. 13 illustrates an exemplary embodiment of a diagram of the rendering module.

FIG. 13 illustrates an exemplary embodiment of a diagram of the rendering module 650. The rendering module 650 may receive as input alert information from the image filter 1335, or information about detected object images from the license plate detector 1330. The rendering module will then communicate rendering instructions 1340 to the display 655. The rendering module 650 includes an overlay processor 1305, a detection failure engine 1310, and an image renderer 1315.

The overlay processor 1305 receives information about the detected object images 1330 from the license plate detector 630. As discussed above, such information may include coordinates of detected object images and rectangles determined to fit around those object images. The rectangle information is then provided to the detection failure engine 1310, which will determine that object images have been detected by the license plate detector 630. The detection failure engine 1310 may then forward the information about the rectangles to the image renderer 1315, which will provide rendering instructions 1340 to the display for how and where to display the rectangles around the image received from the imager 610. Such information my include pixel coordinates associated with the size and location of the rectangle and color information. For instance, if the license plate detector 630 determines that a detected object image is more likely to be an actual license plate image than the other detected object images, the rendering module 650 may instruct the display 655 to display the rectangle around the more likely object image in a way that is visually distinct from other rectangles. For instance, the rectangle around the object image more likely to be a license plate image may be displayed in a different color than the other rectangles in the display.

However, in some instances, the license plate detector 630 may not detect any object images. In such instances, the overlay processor will not forward any rectangle information to the detection failure engine 1310. The detection failure engine 1310 will then determine there has been an object image detection failure and signal an alert to the image renderer 1315. The image renderer 1315 will then communicate the display rendering instructions 1340 for the alert to the display 655. The license plate detection alerts have been described in greater detail above.

Additionally, the image filter 625 may provide information to the image renderer 1315 indicating an alert that the captured image cannot be processed for some reason such as darkness, noise, blur, or any other reason that may cause the image to be otherwise unreadable. The alert information from the image filter 625 is provided to the image renderer 1315, which then provides the rendering display instructions 1340 to the display 655 indicating how the alert will be displayed. The image filter alerts have been discussed in detail above.

The following FIGS. 14-22 provide exemplary illustrations and processes detailing the functionality of the license plate detection module 630. FIGS. 14-22 are devised to illustrate how the license plate detection apparatus goes from an optical image comprising many object images to detecting a license plate image among the object images.

Figure 14:
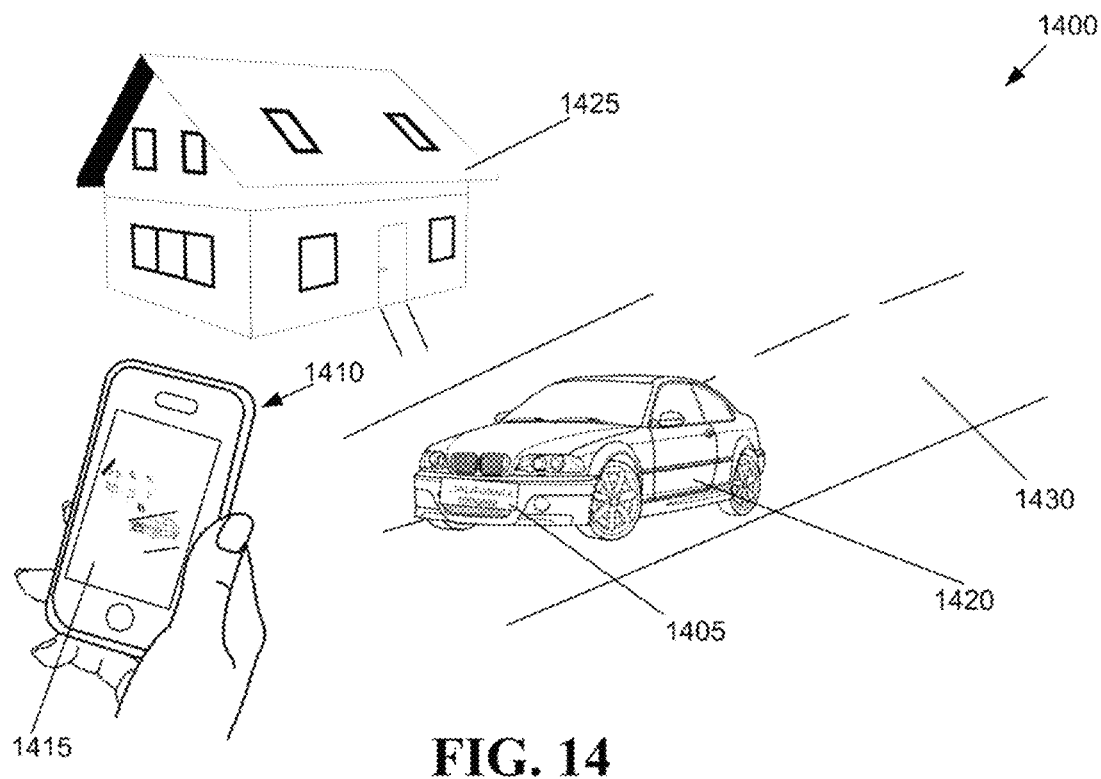
FIG. 14 illustrates an exemplary embodiment of a scene that may be captured by a license plate detection apparatus.

FIG. 14 illustrates an exemplary embodiment of a scene 1400 that may be captured by a mobile apparatus 1410. The mobile apparatus 1410 may be similar to the mobile apparatus 130 described with respect to FIG. 1. The scene 1400 includes a structure 1425, a road 1430, a vehicle 1420, and a license plate 1405. The mobile apparatus 1410 includes a display area 1415.

As illustrated, the mobile apparatus 1410 has activated the image capture functionality of the mobile apparatus 1410. The image capture functionality may be an application that controls a camera lens and imager built into the apparatus 1410 that is capable of taking digital images. In some aspects of the apparatus, the image capture functionality may be activated by enabling an application which activates the license plate detection apparatus capabilities described in FIG. 6. In this example, the mobile apparatus 1410 may be capturing a still image, several images in burst mode, or video, in real-time for processing by the license plate detection apparatus. For instance, the vehicle 1420 may be moving while the image capture process occurs, and/or the mobile apparatus may not be in a stationary position. In such instances, the license plate detection apparatus may determine the best video frame taken from the video.

Figure 15:
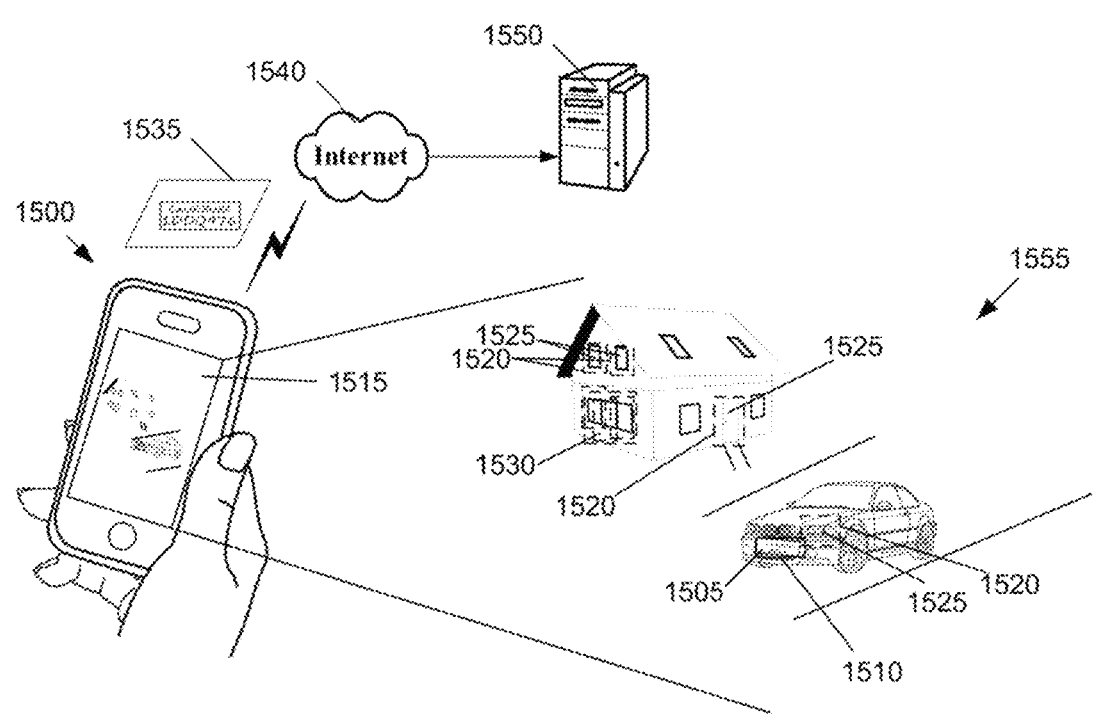
FIG. 15 provides a high level illustration of an exemplary embodiment of how an image may be rendered on a mobile apparatus by the license plate detection apparatus and transmission of a detected license plate image to a server.

FIG. 15 provides a high level illustration of an exemplary embodiment of how an image may be rendered on an apparatus 1500 by the license plate detection apparatus and transmission of a detected license plate image to a server 1550. As shown, the apparatus 1500 includes a display area 1515 and an exploded view 1555 of the image that is rendered in display area 1515. The exploded view 1555 includes object images 1525, rectangles 1520 that surround the object images, overlapping rectangles 1530, candidate license plate image 1505, and a rectangle 1510 that surrounds the candidate license plate image 1505. In the event that a license plate image is detected and captured in the display area 1515, the apparatus 1500 may wirelessly transmit license plate image data 1535 over the Internet 1540 to a server 1550 for further processing. In some aspects of the apparatus, the license plate image data may be an image file comprising a license plate image.

As shown in exploded view 1555, the object detector 905 of the license plate detection apparatus has detected several object images 1525, as well as a candidate license plate image 1505. As shown, the rendering module 650 has used information communicated from the license plate detector 630 to overlay rectangles around detected object images 1525 including the candidate license plate image 1505. The rendering module 650 has also overlaid rectangles that differ in appearance around object images that are less likely to be license plate images. For instance, rectangles 1520 appear as dashed lines, while rectangle 1510 appears as a solid line. However, as those skilled in the art will appreciate, the visual appearance of the rectangles is not limited to only those illustrated in exploded view 1555. In fact, the visual appearance of the rectangles may differ by color, texture, thickness, or any other suitable way of indicating to a user that at least one rectangle is overlaid around an object image that is more likely to be a license plate image than the other object images in which rectangles are overlaid.

Exploded view 1555 also illustrates overlapping rectangles 1530. As discussed above, the quad filter 915 of the license plate detector 630 may recognize the overlapping rectangles 1530 and discard some of the rectangles, and detected object images within those discarded rectangles, as appropriate.

As is also illustrated by FIG. 15, the license plate detection apparatus has detected the presence of a candidate license plate image 1505 in the image. As a result, the mobile apparatus 1500 will transmit the license plate image data 1535 associated with the license plate image over the internet 1540 to the server 1550 for further processing. Such further processing may include OCR and using the license plate information derived from the OCR process to perform a number of different tasks that may be transmitted back to the mobile apparatus 1500 for rendering on the display area 1515. Alternatively, in some aspects of the apparatus, the OCR capability may be located on the mobile apparatus 1500 itself. In such aspects, the mobile apparatus may wirelessly transmit the license plate information such as state and number data rather than information about the license plate image itself.

Figure 16:
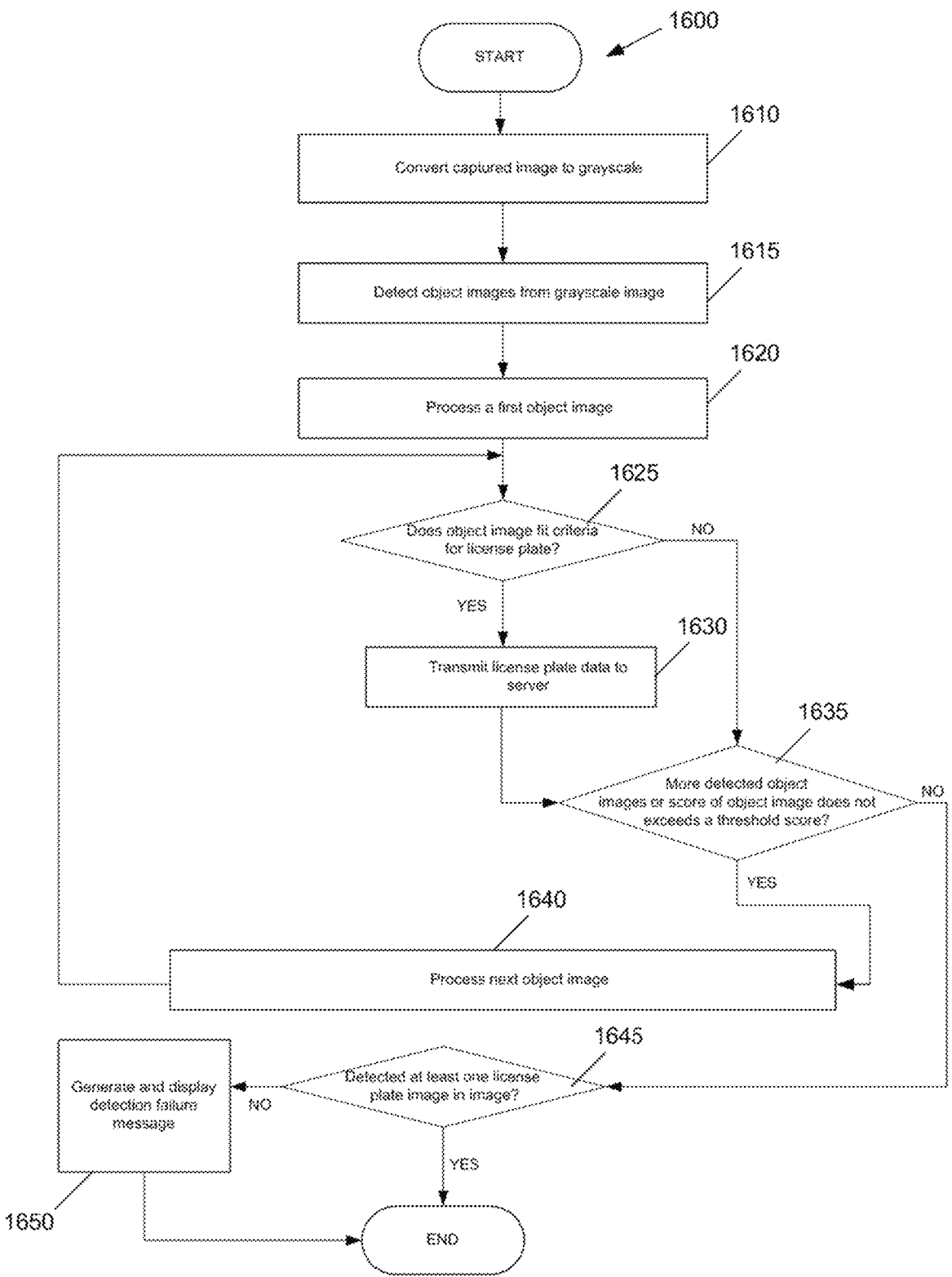
FIG. 16 conceptually illustrates an exemplary embodiment of a more detailed process for processing an electrical signal to recover license plate information.

FIG. 16 conceptually illustrates an exemplary embodiment of a more detailed process 1600 for processing an electrical signal to recover license plate information as discussed at a high level in process 400. The process may also be applied to detecting license plate information in a sample of an electrical signal representing a frame of a video image presented on a display as described in process 500 of FIG. 5. The process 1600 may be performed by the license plate detection apparatus. The process 1600 may begin after the mobile apparatus has activated an application, which enables the image capture feature of a mobile apparatus.

As shown, the process 1600 converts (at 1610) the captured image to grayscale. As discussed above, converting the image to grayscale makes for greater efficiency in distinguishing object images from background according to the level of contrast between adjacent pixels. Several filtering processes may also be performed on the image during the grayscale conversion process. The process 1600 then detects (at 1615) object image(s) from the grayscale image. Such object images may be the object images 1505 and 1525 as illustrated in FIG. 15. The process 1600 processes (at 1620) a first object image. The processing of object images will be described in greater detail in the foregoing description.

At 1625, the process 1600 determines whether an object image fits the criteria for a license plate image. When the object image fits the criteria for a license plate image, the process 1600 transmits (at 1630) the license plate image (or image data) to a server such as the server 1550. In some aspects of the process, an object image fits the criteria for a license plate when a score of the object image is above a threshold value. Such a score may be determined by a process which will be discussed in the foregoing description. The process 1600 then determines (at 1635) whether there are more object images detected in the image and/or whether the object image being processed does not exceed a threshold score.

When the process 1600 determines (at 1625) that an object image does not fit the criteria for a license plate image, the process 1600 does not transmit any data and determines (at 1635) whether more object images were detected in the image and/or whether the object image being processed did not exceed a threshold score. When the process 1600 determines that more object images were detected in the image and/or the object image being processed did not exceed a threshold score, the process 1600 processes (at 1640) the next object image. The process then returns to 1625 to determine if the object image fits the criteria of a license plate image.

When the process 1600 determines (at 1635) that no more object images were detected in the image and/or the object image being processed exceeds a threshold score, the process 1600 determines (at 1645) whether at least one license plate image was detected in the process 1600. When a license plate image was detected, the process ends. When a license plate image was not detected, an alert is generated (at 1650) and the rendering module 650 sends instructions to display a detection failure message at the display 655. In some aspects of the process, the detection failure alert may provide guidance to the user for capturing a better image. For instance, the alert may guide the user to move the mobile apparatus in a particular direction such as up or down and/or adjust the tilt of the mobile apparatus. Other alerts may guide the user to find a location with better lighting or any other suitable message that may assist the user such that the license plate detection apparatus has a greater likelihood of detecting at least one license plate image in an image.

The process 1600 may be performed in real-time. For instance, the process 1600 may be performed successively as more images are captured either by capturing several frames of video as the mobile apparatus or object images in the scene move and/or are tracked or by using an image capture device's burst mode. The process 1600 provides the advantage of being able to detect and read a license plate image in an image at virtually any viewing angle and under a variety of ambient conditions. Additionally, the criteria for determining a license plate image is determined based on the operations performed by the license plate detector. These operations will be further illustrated in the following figures as well.

Figure 17:
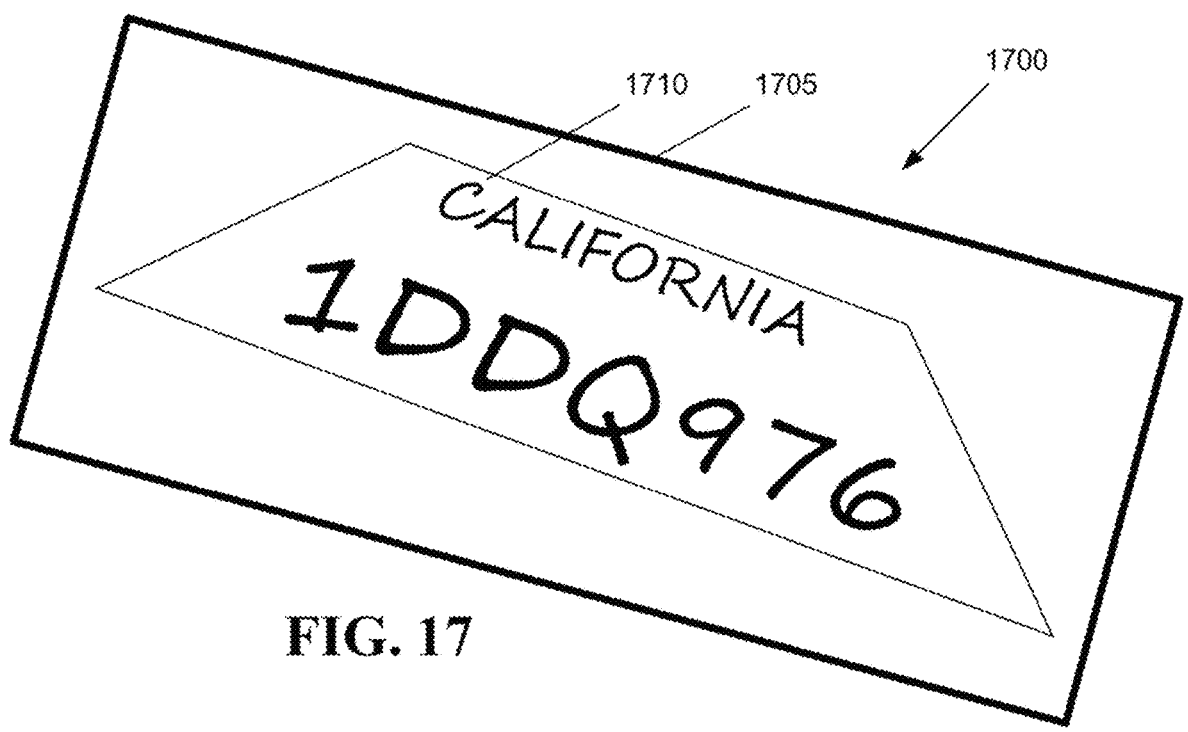
FIG. 17 illustrates an exemplary embodiment of an object image comprising a license plate image within a rectangle.
Figure 18:
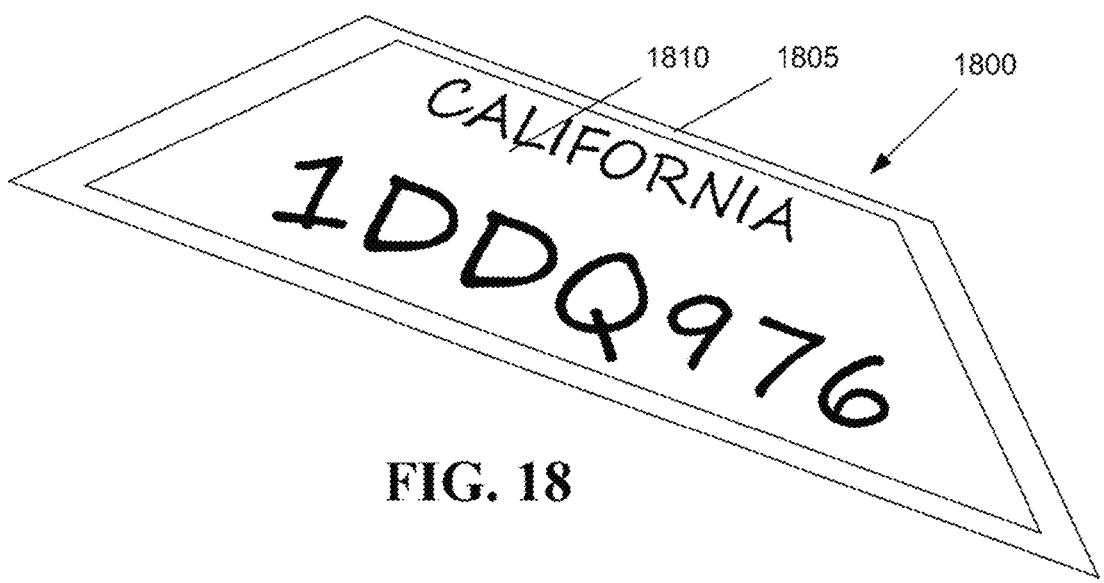
FIG. 18 illustrates an exemplary embodiment of an object image comprising a license plate image within a quadrilateral.
Figure 19:
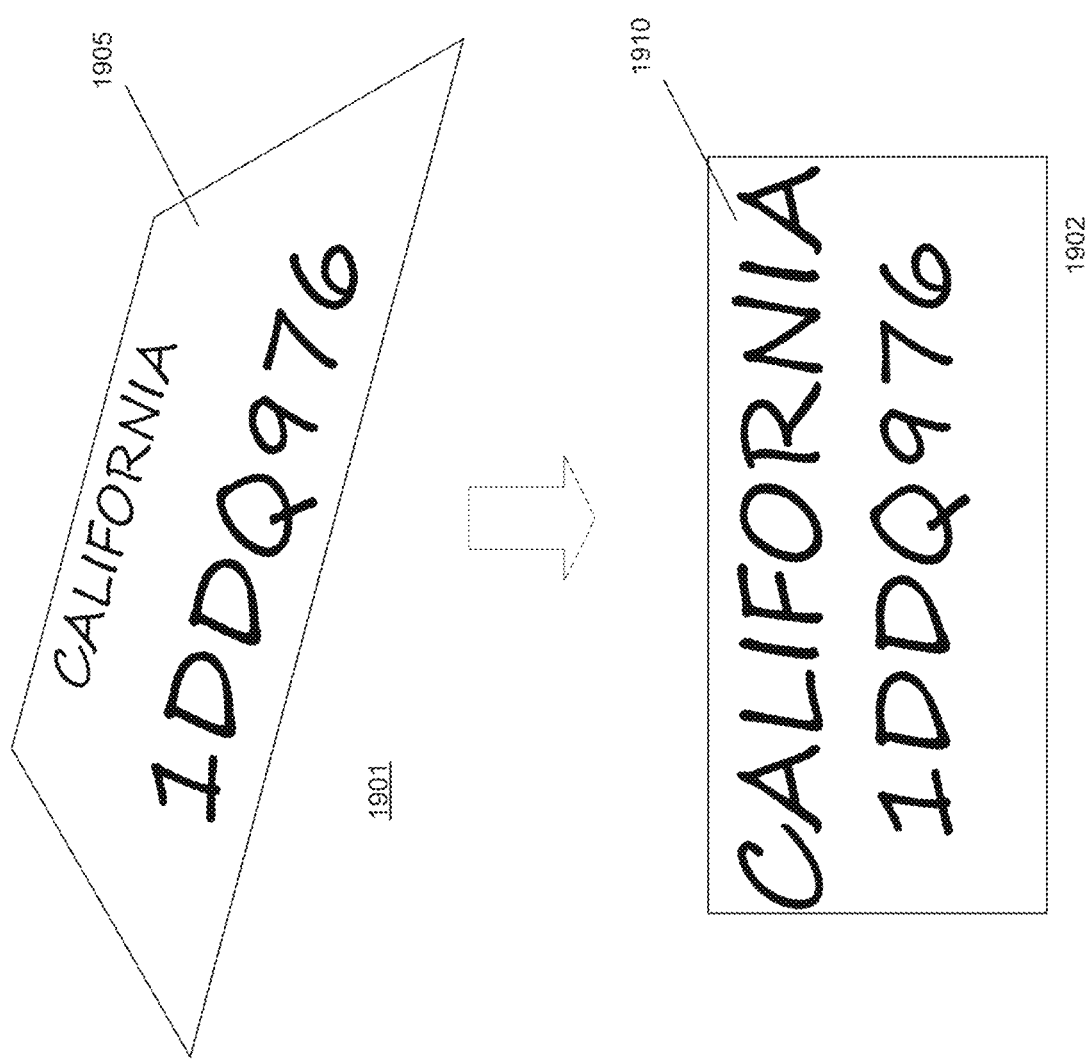
FIG. 19 is an illustration of an exemplary embodiment of the dewarping process being performed on a license plate image.

FIGS. 17-19 illustrate the operations performed by the quad processor 910. For instance, FIG. 17 illustrates an exemplary embodiment of an image 1700 comprising a license plate image 1710. Although not shown, the license plate may be affixed to a vehicle which would also be part of the image. The image 1700 includes the license plate image 1710 and a rectangle 1705. As shown in exemplary image portion 1700, an object image has been detected by the object detector 905 of the license plate detector 630. The object image in this example is the license plate image 1710. After the object image was detected, the quad processor 910 fit a rectangle 1705 around the license plate image 1710. Information associated with the rectangle may be provided to the rendering module 650 for overlaying a rectangle around the detected license plate image in the image displayed on the display 655.

FIG. 18 illustrates an exemplary embodiment of a portion of an image 1800 comprising the same license plate image 1710 illustrated in FIG. 17. Image portion 1800 includes the license plate image 1810 and a quadrilateral 1805. As discussed above with respect to FIGS. 10-12, the quad processor 910 of the license plate detector 630 performs several functions to derive a quadrilateral that closely fits the detected object image. Once the quadrilateral has been derived, the quad processor 910 then computes the skew factor and/or keystone discussed above.

Once the quadrilateral is determined to have a low skew (or a skew below a threshold value) or the trapezoid has been determined to have a low keystone (or a keystone below a threshold value), the region(s) of interest detector 920 can dewarp the image to move one step closer to confirming the presence of a license plate image in the image and to also generate patch that is easily read by OCR software. In some aspects of the apparatus, the patch is the license plate image that has been cropped out of the image.

FIG. 19 is an exemplary embodiment of the dewarping process being performed on a license plate image 1905 to arrive at license plate image 1910. FIG. 19 illustrates two stages 1901 and 1902 of the dewarping process.

As shown, the first stage 1901 illustrates the license plate image 1905 in a trapezoidal shape similar to the shape of the quadrilateral 1805 illustrated in FIG. 18. The second stage 1902 illustrates the license plate image 1910 after the dewarping process has been performed. As shown, license plate image 1910 has undergone a perspective transform and rotation. The license plate image 1910 as shown in the second stage 1902 is now in a readable rectangular shape. In some aspects of the dewarping process, the license plate image may also undergo corrections if the license plate image is skewed or may scale the license plate image to a suitable size.

The ability to accurately dewarp quadrilaterals and especially the quadrilaterals that are license plate images taken at any angle is an integral piece of the license plate detection apparatus. The dewarping capability enables a user to capture an image of a license plate at a variety of different angles and distances. For instance, the image may be taken with any mobile apparatus at virtually any height, direction, and/or distance. Additionally, it provides the added benefit of being able to capture a moving image from any position. Once the license plate image has been dewarped, the region(s) of interest detector 920 will crop the rectangular license plate image to generate a patch. The patch will be used for further confirmation that the license plate image 1910 is, in fact, an image of a license plate.

Figure 20:
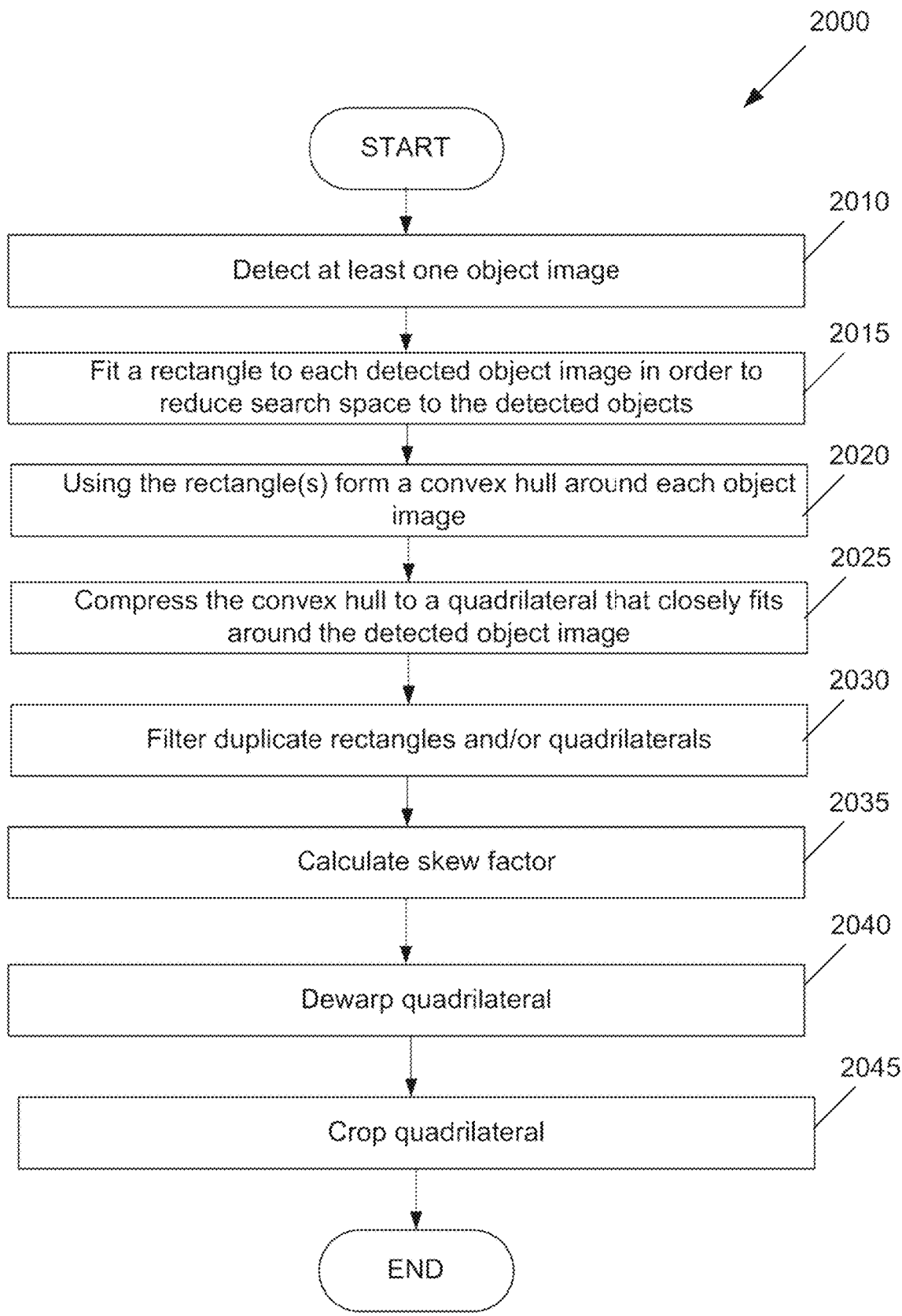
FIG. 20 conceptually illustrates an exemplary embodiment of a process for processing an optical image comprising a license plate image.

FIG. 20 conceptually illustrates an exemplary embodiment of a process 2000 for processing an image comprising a license plate image. The process 2000 may be performed by a license plate detection apparatus. The process 2000 may start after the license plate detection apparatus has instantiated an application that enables the image capture feature of a mobile apparatus.

As shown, the process 2000 detects (at 2010) at least one object image, similar to the object image detection performed by process 1600. The following describes in greater detail the process of processing (at 1620) the image.

For instance, the process 2000 then fits (at 2015) a rectangle to each detected object image in order to reduce the search space to the detected object images. The information associated with the rectangle may also be used as an overlay to indicate to users of the license plate detection apparatus the location(s) of the detected object image(s). The process then uses the rectangles to form (at 2020) a convex hull around each object image. The convex hull, as discussed above, is a polygon of several vertices and edges that fits closely around an object image without having any edges that overlap the object image.

At 2025, the process 2000 compresses the convex hull to a quadrilateral that closely fits around the detected object image. The process of compressing the convex hull into a quadrilateral was discussed in detail with respect to FIGS. 9-12. The process 2000 then filters (at 2030) duplicate rectangles and/or quadrilaterals. In some aspects of the process, rectangles or quadrilaterals that are similar in size and overlap may be discarded based on some set criteria. For example, the smaller rectangle and/or quadrilateral may be discarded.

The process 2000 calculates (at 2035) a skew factor. The process 2000 then dewarps (at 2040) the quadrilateral. The process then crops (at 2045) the object image within the quadrilateral, which becomes the patch. The patch will be used for further processing as discussed below. In some aspects of the process, the object image is cropped at a particular ratio that is common for license plates of a particular region or type. For instance, the process may crop out a 2:1 aspect ratio patch, of the image, which is likely to contain the license plate image. Once the quadrilateral is cropped, the process 2000 then ends.

Figure 21:
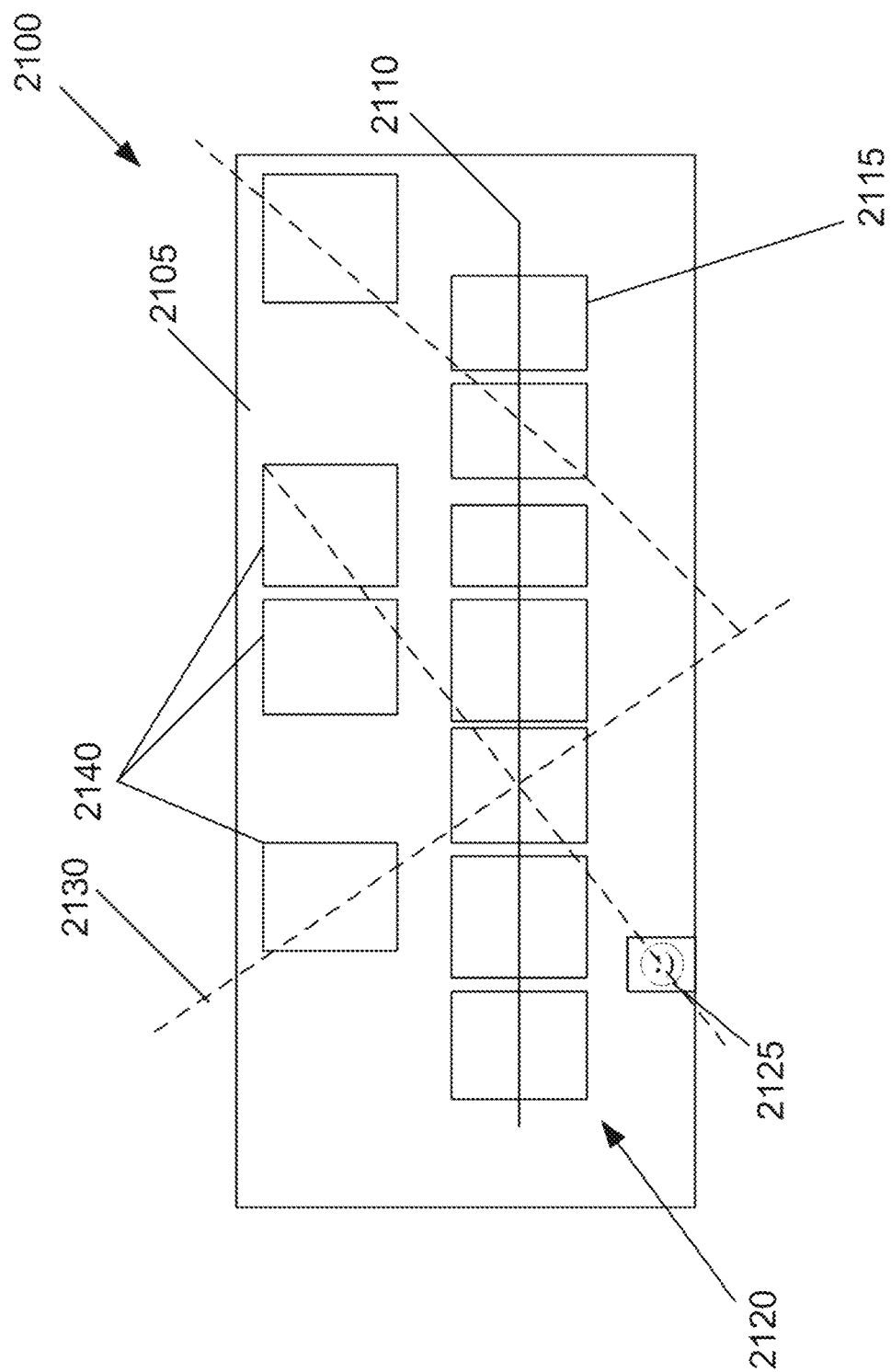
FIG. 21 illustrates an exemplary embodiment of a diagram for determining whether a patch is an actual license plate image.

FIG. 21 illustrates an exemplary embodiment of a diagram that determines whether a patch 2100 is an actual license plate image. The patch 2100 includes a candidate license plate image 2105, alpha-numeric characters 2120 and 2140, rectangles 2115, sloped lines 2130, zero-slope line 2110, and graphic 2125.

As shown in the patch 2100, rectangles are fit around detected object images within the patch. In some aspects of the apparatus, object images may be detected using the MSER object detection method. Conjunctively or conversely, some aspects of the apparatus, may use edge and or corner detection methods to detect the object images. In this case, the detected object images are alpha-numeric characters 2120 and 2140 as well as graphic 2125. After detecting the alpha-numeric characters 2120 and 2140 as well as graphic 2125, a stroke width transform (SWT) may be performed to partition the detected object images into those that are likely from an alpha-numeric character and those that are not. For instance, the SWT may try to capture the only alpha-numeric effective features and use certain geometric signatures of alpha-numeric characters to filter out non-alpha-numeric areas, resulting in more reliable text regions. In such instances, the SWT transform may partition the alphanumeric characters 2120 and 2140 from the graphic 2125. Thus, only those object images that are determined to likely be alpha-numeric characters, such as alphanumeric characters 2120 and 2140, are later used in a scoring process to be discussed below. In some aspects of the apparatus, some object images other than alpha-numeric characters may pass through the SWT partitioning. Thus, further processing may be necessary to filter out the object images that are not alpha-numeric characters and also to determine whether the alpha-numeric characters in the license plate image fit the characteristics common for a license plate images.

Following the partitioning of alpha-numeric characters from non-alpha numeric characters, a line is fit to the center of the rectangle pair for each pair of rectangles. For instance, a sloped line is shown for the D and object image 2125 pair. The distance of all other rectangles to the lines 2130 and 2110 are accumulated and the pair with the smallest summed distance is used as a text baseline. For instance, the zero-slope line 2110 has the smallest summed distance of the rectangles to the line 2110. Some aspects of the apparatus may implement a scoring process to determine the presence of a license plate image. For instance, some aspects of the scoring process may determine a score for the determined alpha-numeric characters on the zero-slope line 2110. The score may increase when the rectangle around the alpha-numeric character is not rotated beyond a threshold amount. The score may decrease if the detected alpha-numeric character is too solid. In some aspects of the scoring process, solidity may be defined as the character area/rectangle area. When the calculated area is over a threshold amount, then the detected object image may be deemed too solid and the score decreases.

In other aspects of the scoring process, for each rectangle 2115 in the patch 2100 the patch score increases by some scoring value if the center of the rectangle is within a particular distance of the baseline line where X is the shorter of the rectangle height and width. For instance, if the particular distance were to be defined as the shorter of the rectangle height and width and if the scoring value is set at 1, the patch score value of the patch 2100 would be 7 because the rectangles around the characters "1DDQ976" are within a shorter distance than the width of the rectangle. Furthermore, the zero-slope of the line 2110 between the alpha-numeric characters 2120 further confirm that this patch is likely a license plate image since typically license plates have a string of characters along a same line. Sloped lines 2130 are, therefore, unlikely to provide any indication that the patch is a license plate image because the distance between characters is too great and the slope is indicative of a low likelihood of a license plate image. Accordingly, in some aspects of the process, sloped lines 2130 are discarded in the process.

In some aspects of the process, when the patch has a score above a threshold value, the patch is determined to be a license plate image, and the license plate detection is complete. The license plate image data is then transmitted to a server for further processing and for use in other functions computed by the server, the results of which are provided to the license plate detection apparatus.

Figure 22:
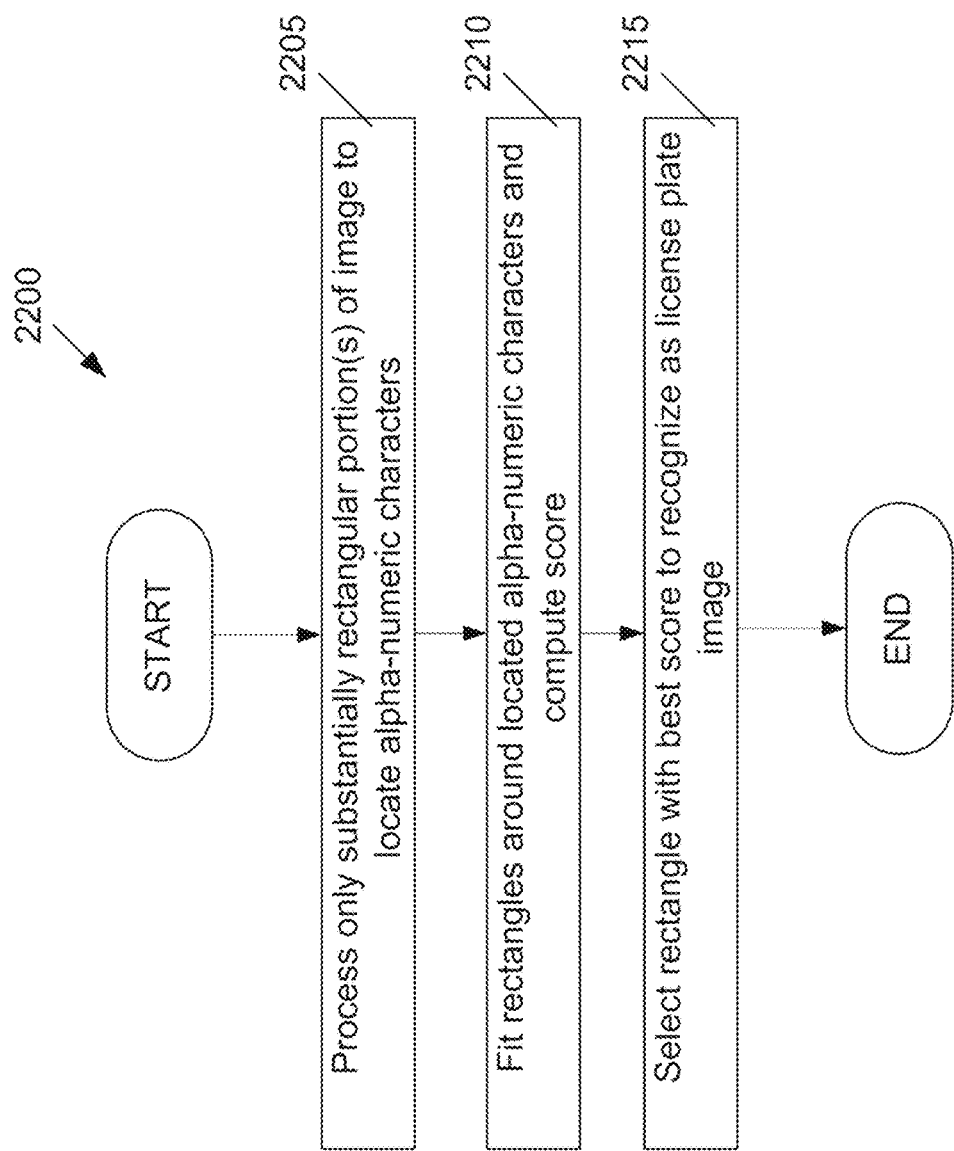
FIG. 22 conceptually illustrates an exemplary embodiment of a process for processing a patch comprising a candidate license plate image.

FIG. 22 conceptually illustrates an exemplary embodiment of a process 2200 for processing a patch comprising a candidate license plate image such as patch 2100. The process may be performed by the license plate detection apparatus. The process may begin after a patch has been cropped from an image file.

As shown, the process 2200 processes (at 2205) only substantially rectangular portion(s) of the patch to locate alpha-numeric characters. The process 2200 fits (at 2210) rectangles around the located alpha-numeric characters and computes scores based on the distances between rectangle pairs as discussed above with respect to FIG. 21. The process 2200 selects (at 2215) the patch with the best score to recognize as a license plate image. Alternatively or conjunctively, the process 2200 may select all patches that have a score above a threshold level to be deemed as license plate images. In such instances, multiple patches, or instances of license plate information, would be transmitted to the server for further processing.

Figure 23:
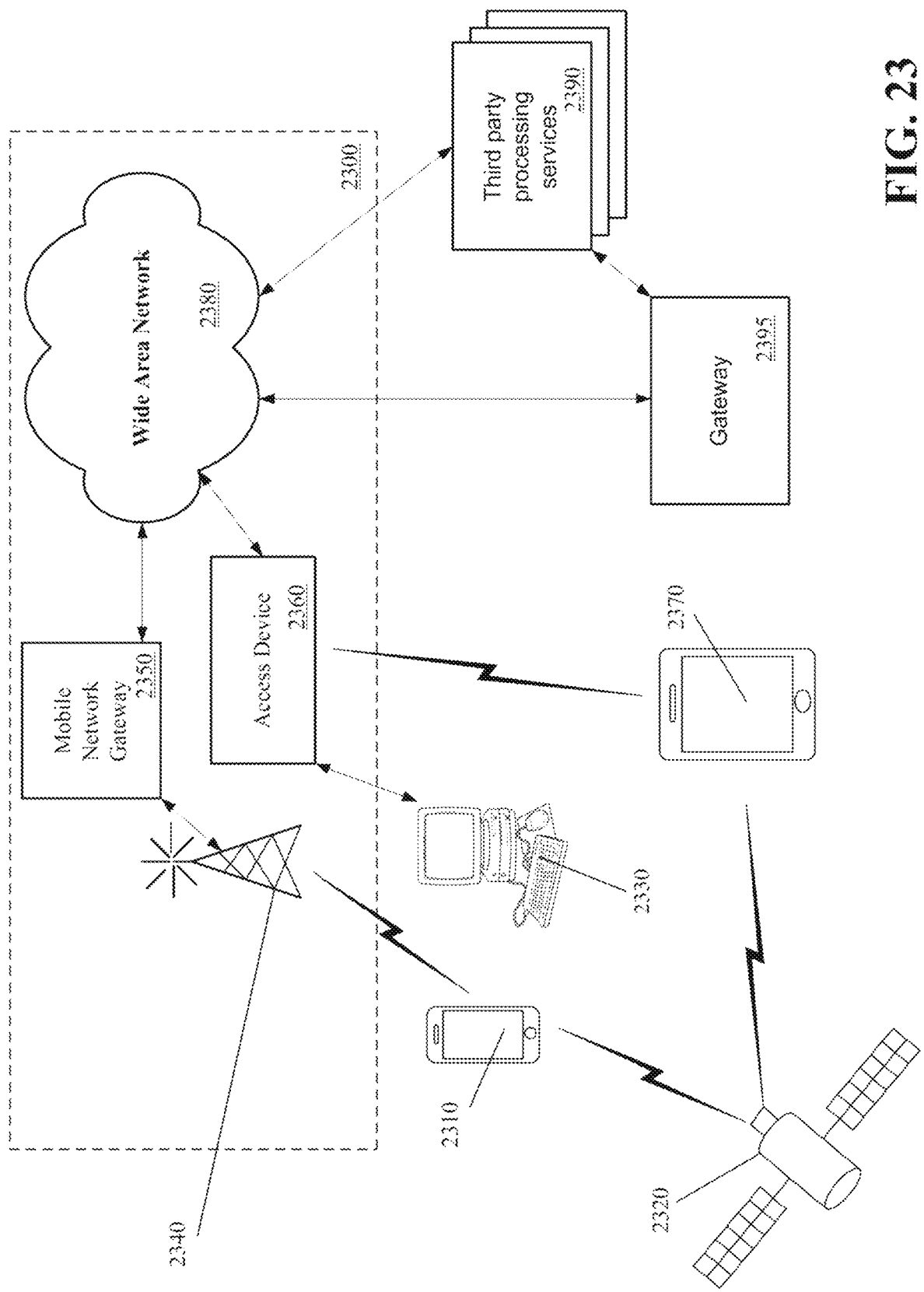
FIG. 23 illustrates an exemplary embodiment of an operating environment for communication between a gateway and client apparatuses.

FIG. 23 illustrates an exemplary embodiment of an operating environment 2300 for communication between a gateway 2395 and client apparatuses 2310, 2330, and 2370. In some aspects of the service, client apparatuses 2310, 2330, and 2370 communicate over one or more wired or wireless networks 2340 and 2360. For example, wireless network 2340, such as a cellular network, can communicate with a wide area network (WAN) 2380, such as the internet, by use of mobile network gateway 2350. A mobile network gateway in some aspects of the service provides a packet oriented mobile data service or other mobile data service allowing wireless networks to transmit data to other networks, such as the WAN 2380. Likewise, access device 2360 (e.g., IEEE 802.11b/g/n wireless access device) provides communication access to the WAN 2380. The apparatuses 2310, 2330, and 2370 can be any portable electronic computing apparatus capable of communicating with the gateway 2395. For instance, the apparatuses 2310 and 2370 may have an installed application that is configured to communicate with the gateway 2395. The apparatus 2330 may communicate with the gateway 2395 through a website having a particular URL. Alternatively, the apparatus 2330 may be a non-portable apparatus capable of accessing the internet through a web browser.

In order to process the license plate information to provide vehicle configuration information, the gateway 2395 may also communicate with third party services that provide vehicle configuration information from license plate information and/or additional vehicle related information. Such additional information may be a VIN number or vehicle configuration information. As shown, the gateway 2395 may communicate directly with at least one third party processing service 2390 if the service is located on the same network as the gateway 2395. Alternatively, the gateway 2395 may communicate with at least one of the third party processing services 2390 over the WAN 2380 (e.g., the internet). Additionally, the vehicle configuration information may be posted to a website by communicating with the WAN 2380.

In some aspects of the service, the process of posting vehicle configuration information to a website may incorporate the location with the vehicle. For instance, the vehicle configuration information may be posted to a website that is used for listing a car for sale. In such instances, having the location information may be used by the listing website in searches performed by users of the website. The apparatus may use location information acquired through a global positioning service (GPS) satellite 2320. The apparatuses 2310 and 2370 may be configured to use a GPS service and provide location information to the gateway 2395 using the connections discussed above. The provided location information may be used by the gateway 2395 and provided to additional modules, discussed in the following figure, as necessary. Thus, the service described in FIG. 23 provides greater accuracy when posting a vehicle configuration to a website because it also incorporates location information. Such location information may also be used to determine an average local value of similar vehicles listed for sale or sold in the area. Additionally, the location information is transmitted without any interaction with the user, which provides greater ease in obtaining a more accurate value.

Figure 24:
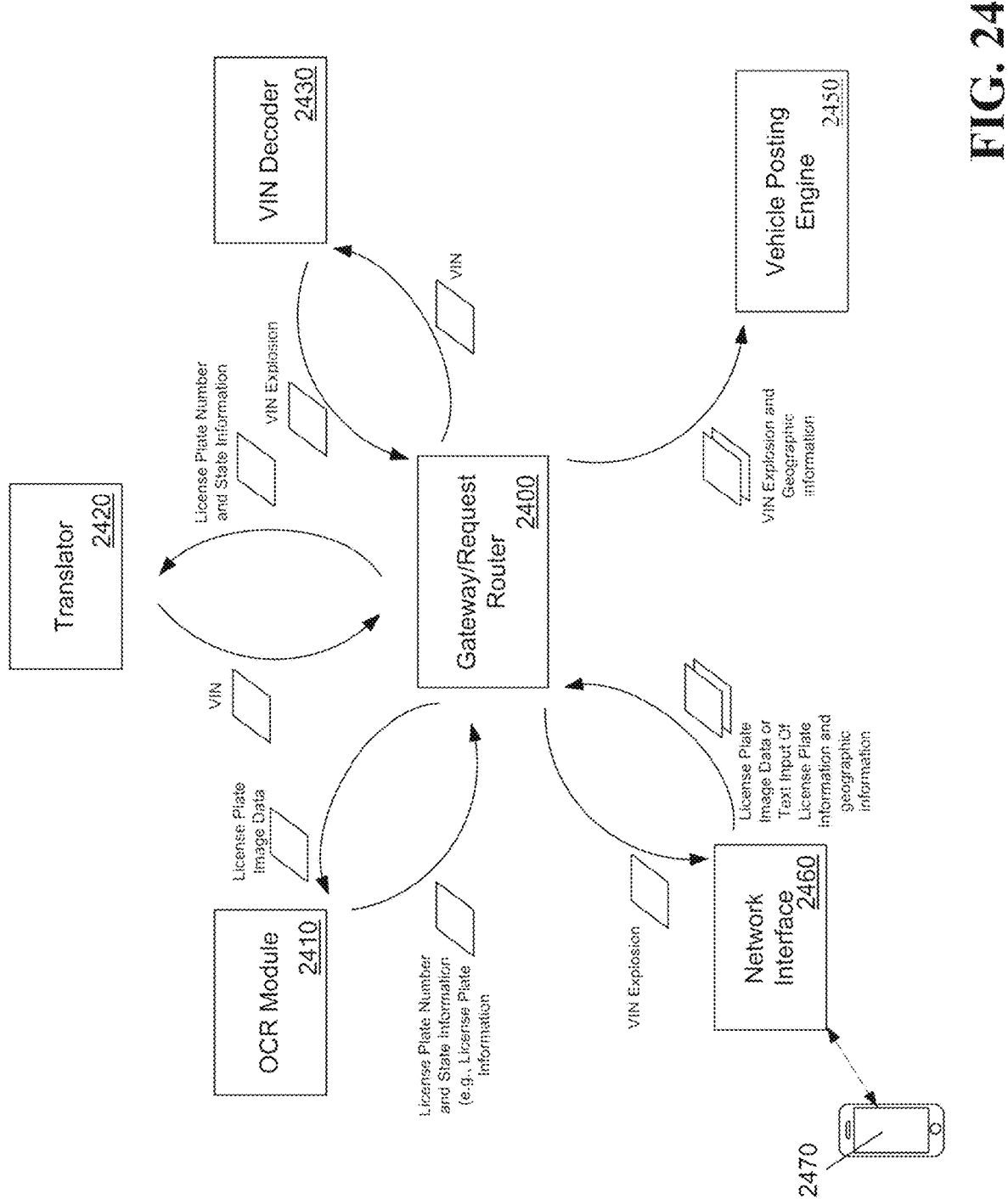
FIG. 24 illustrates an exemplary embodiment of data flow between a gateway and various other modules.

FIG. 24 illustrates an exemplary flow of data between a gateway 2400 and various other modules. The gateway 2400 and modules 2410-2460 may be located on a server such as the server 230. In some aspects of the data apparatus, the gateway 2400 may be a request router in that it receives requests from the various modules 2410-2460 and routes the requests to at least one of the appropriate module 2410-2460. The gateway 2400 communicates with various modules 2410-2460, which may communicate with various third party services to retrieve data that enables the gateway 2400 to provide an estimated value for a vehicle to a client apparatus 2470 from an image of a license plate.

As shown, the client apparatus 2470, may use a network interface 2460 to transmit at least one license plate image recovered from an optical image taken by the client apparatus 2470. The client apparatus 2470 may include an installed application providing instructions for how to communicate with the gateway 2400 through the network interface 2460. In this example, the network interface 2460 provides license plate image information or text input of a license plate to the gateway 2400. For instance, as discussed above, the network interface 2460 may transmit text strings received as user input at the client apparatus 2470 or a license plate image processed by the client apparatus 2470 to the gateway 2400. As further shown in this example, the gateway 2400 may route the license plate image data to the OCR module 2410 to perform the OCR text extraction of the license plate information. In this example, the OCR module 2410 may have specialized or a commercial OCR software application installed that enables accurate extraction of the license plate number and state. The OCR module may be similar to the OCR module discussed in FIG. 6. In one example, the OCR module 2410 may also have the capability of determining if a license plate image contains a clear enough image that will provide for accurate text extraction. In this example, if the license plate image does not contain a clear image or the image quality is too low, the OCR module may alert the gateway 2400 to transmit a warning to the client apparatus 2470. In an alternative example, a license plate image may be recovered and transmitted to the gateway 2400 for further processing.

Once the license plate number and state information is extracted and converted to text strings, the gateway 2400 will provide the extracted text to a translator 2420, which is capable of determining a VIN from the license plate information. The translator 2420 may communicate with third party services using functionality provided in an application programming interface (API) associated with the third party services. Such services may retrieve VINs from license plate information. In some aspects of the service, the various modules 2410-2450 may also be configured to communicate with the third party services or apparatuses (not shown) using APIs associated with the third party services. In such aspects of the service, each module 2410-2450 may route a request through the gateway 2400 to the network interface 2460, which will communicate with the appropriate third party service (not shown).

The gateway 2400 then routes the retrieved VIN to the VIN decoder 2430 along with a request to generate a VIN explosion. The VIN decoder 2430 is capable of using the VIN to generate a VIN explosion by requesting the VIN explosion from a third party service. The VIN explosion includes all of the features, attributes, options, and configurations of the vehicle associated with the VIN (and the license plate image). In some aspects of the apparatus, the VIN explosion may be provided as an array of data, which the gateway 2400 or VIN decoder 2430 is capable of understanding, processing, and/or routing accurately. Similar to the VIN translator 2420, the VIN decoder 2430 may communicate with a third party service by using an API associated with the service. The VIN and/or vehicle data derived from the VIN explosion may be routed back through the gateway 2400 and through the network interface 2460 to the client apparatus 2470. As discussed above, the client apparatus may display the vehicle configuration data derived from the VIN explosion.

The vehicle configuration information from the VIN explosion may also be routed from the gateway to the vehicle posting engine 2450 with a request to post the vehicle configuration information to a website. The vehicle posting engine 2450 may then communicate with at least one web host via an API to post the vehicle configuration to the website. Such websites may include services that list vehicles that are for sale. Additionally, the apparatus may provide an estimated value of the vehicle acquired from a value estimation service. The estimated value may be adjusted as additional information about the vehicle is received at the apparatus 2470 via user input. Such information may include vehicle mileage, condition, features and/or any other pertinent vehicle information. The vehicle posting engine 2450 may also use geographic location information provided by the apparatus 2470 in posting to the website. Thus, the data flow described in FIG. 24 provides a quick and efficient way to post a vehicle for sale with accurate vehicle configuration information.

Figure 25:
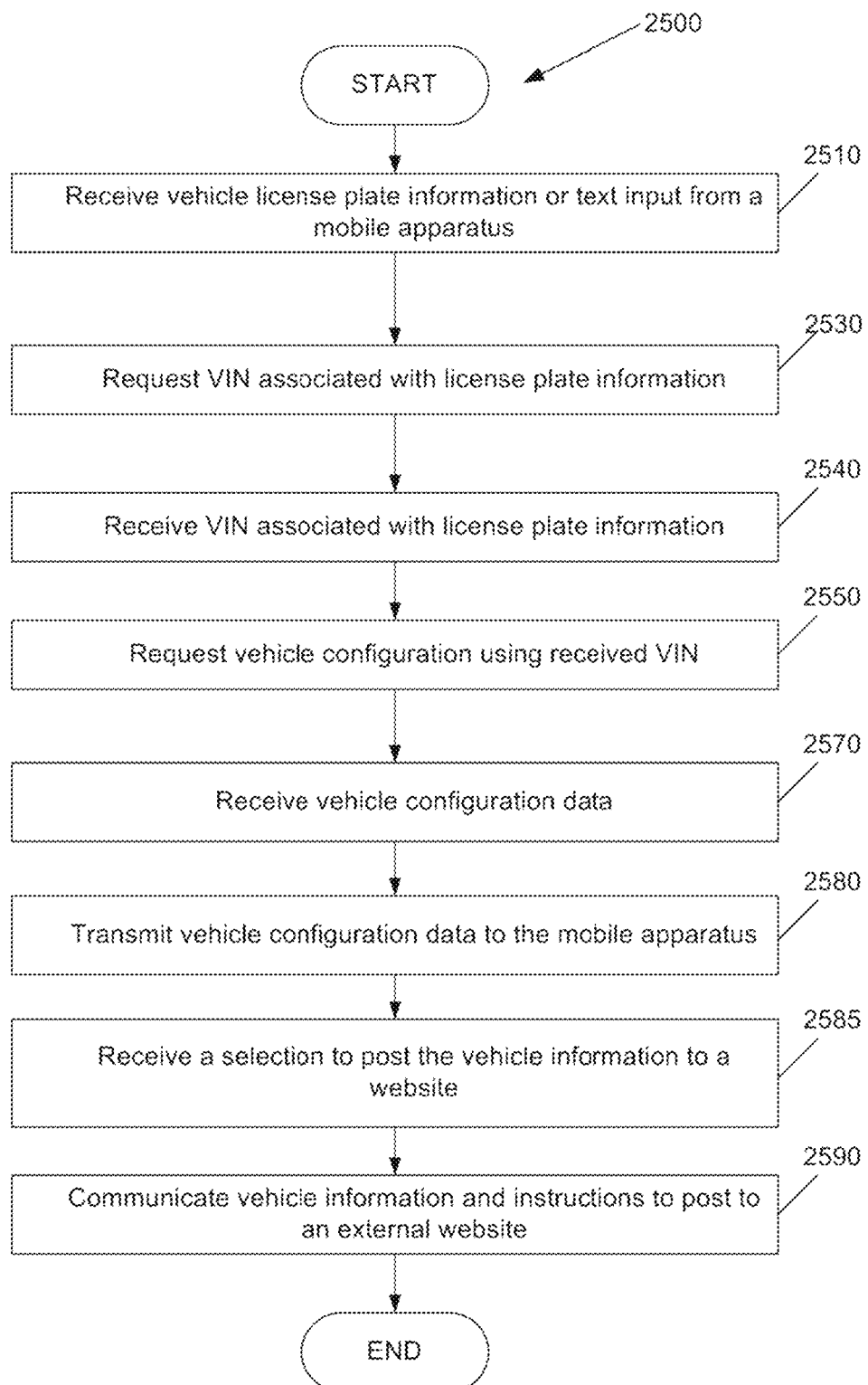
FIG. 25 conceptually illustrates an exemplary embodiment of a process for receiving vehicle configuration information and posting a vehicle for sale from a license plate image.

FIG. 25 conceptually illustrates an exemplary process 2500 for receiving vehicle configuration information and posting a vehicle for sale from a license plate image. It should be appreciated that the process 2500 may be performed by a server such as the server 230. Moreover, referring to FIG. 23, the seller's mobile apparatus (e.g., mobile apparatus 2310) can communicate with gateway 2395, which includes a number of modules, located on a server, such as the server 230. Thus, in general, the customized software application downloaded to the user's mobile device 2310 can receive user inputs (e.g., vehicle license plate image data) and transmit this information to gateway 2395, which is located on server 230 that includes the requisite hardware and software configured to perform the process illustrated in FIG. 25. In one aspect, the server 230 can include one or more of the hardware components shown in FIG. 30 and described below.

In this instance, the process may begin after the mobile apparatus 2310 has recovered a suitable license plate image for transmission to the server 230. As shown, the process 2500 receives (at 2510) license plate image information or text input from a mobile apparatus. The text input may be information associated with a vehicle license plate such as a state and alpha-numeric characters. Upon receiving identifying the vehicle license plate information (including the state), the process 2500 automatically requests (at 2530) a VIN associated with the license plate information. Specifically, server 230 is configured to automatically transmit a request for a VIN corresponding to the license plate information by sending the request to a third party processing service. In some aspects of the system, the process communicates with the third party service (e.g., service 2390) by using an API.

In one aspect, the third party service can identify the vehicle and VIN using the license plate image information and confirm whether the vehicle is in fact recognized by the service. For example, at 2540, the process 2500 receives the VIN associated with the license plate information. The process 2500 then requests (at 2550) a vehicle configuration using the received VIN. The vehicle configuration may include different features and options that are equipped on the vehicle. For instance, such features and options may include different wheel sizes, interior trim, vehicle type (e.g., coupe, sedan, sport utility vehicle, convertible, truck, etc.), sound system, suspension, and any other type of vehicle configuration or feature. In other aspects, the vehicle configuration can also include estimated pricing information from a third-party website, for example. The process 2500 receives (at 2570) the vehicle configuration data. If the service is unable to identify the vehicle, the server may transmit an error message back to the mobile device request another image of the license plate, as described above.

Otherwise, at 2580, the process 2500 transmits the vehicle configuration data to the mobile apparatus 2310. The mobile apparatus 2310 may display the configuration information for the user of the apparatus to view. As noted above, in one aspect, the vehicle configuration information can include estimated value information from a third party service that provides an estimated price of the vehicle using the VIN number and any identified vehicle history, including accidents, repairs, and the like. The price information can include a variation of prices including trade-in value, estimated sales prices (i.e., obtained from third party pricing services based on VIN number, for example), and a dealership price. Thus, according to an exemplary aspect, the server 230 is configured to automatically transmit the year, make, model and other information (e.g., mileage) to a third-party valuation service that automatically returns an estimated value of the vehicle. In an alternative aspect, the server 230 is configured to maintain its own database of vehicle says based on year, make, model, geographical region, time of year, and the like, all of which can be provided with actual historical sales prices. Server 230 is configured to automatically adjust the recommended price received from the third-party valuation service based on estimated odometer, estimated condition, estimated vehicle configuration package, and the like. Then, upon receiving the prospective seller's vehicle information, the server 230 is configured to reference this database and identify one or more closest matches to generate an estimated sales price. In either case, this information is transmitted to the seller at step 2580.

The user may then wish to post the configuration information to a website such as a sales listing website. Thus, the process 2500 receives (at 2585) a selection to post the vehicle information to the website. The vehicle information posted may include vehicle information that was included as part of the received vehicle configuration information as well as additional configuration details which may have been added or adjusted at the mobile apparatus by user input. The process 2500 then communicates (at 2590) the vehicle information and instructions to post the information to an external website. As discussed above, this may be handled by communicating using a website's API.

In one aspect, the customized software application downloaded on the mobile apparatus facilitates the posting and sale of the user's vehicle through the Internet. For example, in this aspect, the software application can include a listing of vehicles that the user is attempting to sell (i.e., a "garage" of vehicles). In order to set up a garage and post vehicle information through the software application, the user of the mobile device is required to create and/or access a user account associated with a software application running on the mobile device. To do so, the user can create a user account by verifying and accepting conventional legal terms and conditions as well as privacy policies.

Once a user account is created and the vehicle configuration data is received by the software application (at steps 2570 and 2580, for example) the user can select to post the vehicle at step 2585 and related information, such as vehicle configuration information (make, model, mileage, etc.) and requested price on the website and/or via the software application. For example, the software application can provide a website and/or marketplace that lists all vehicles that have been posted by users of the software application for sale. Preferably, gateway 2395 communicates with a plurality of third party retail sites (e.g., Craigslist®) to post the vehicle for sale. Moreover, the initial listing of the vehicle includes a total price and suggested monthly payments for a prospective buyer. In one aspect, the retail website further provides user modifiable filters that enables prospective buyers to filter by price, year, mileage, make, style, color, physical location of the vehicle, and the like. It should be appreciated that other social networks can also facilitate the posting and sale of the user's vehicles (e.g., step 2590).

Figure 26:
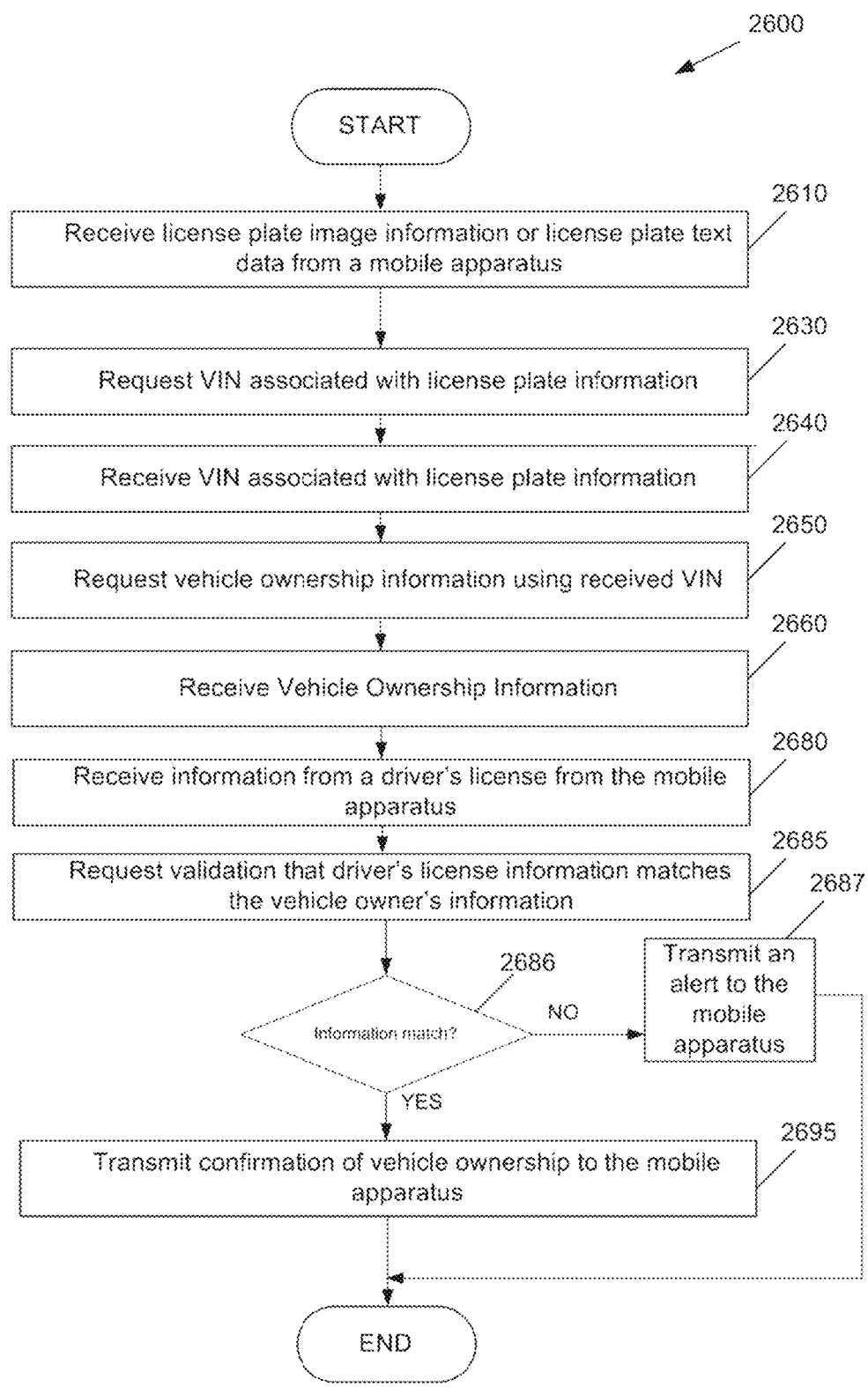
FIG. 26 conceptually illustrates a flowchart for a method for transmitting confirmation of vehicle ownership from a license plate image.

According to a further exemplary aspect, the software application can require the user to verify ownership of the vehicle before the vehicle information is posted for sale and/or before an actual sale is negotiated and consummated with a prospective buyer. FIG. 26 conceptually illustrates a flowchart for a method 2600 for transmitting confirmation of vehicle ownership from a license plate image. The process 2600 may be performed by a server such as the server 230. The described process is a refinement to the method described above. As shown, the server 230 (i.e., gateway 2395) receives (at 2610) license plate image information or text input from a mobile apparatus. The text input may be information associated with a vehicle license plate such as a state and alpha-numeric characters. The process 2600 then requests (at 2630) a VIN associated with the license plate information. The process 2600 may request the VIN by sending the request to a third party server. In some aspects of the server, the process 2600 communicates with the third party server by using an API.

At 2640, the process 2600 receives the VIN associated with the license plate information. The process 2600 then requests (at 2650) vehicle ownership information using the received VIN. As described above, this request may be prompted by the software application on the mobile device in advance of the user's request to post the vehicle configuration information to a website and/or the software application for sale. The requested vehicle ownership information can include one or more of the user's personal information, such as at least one of a first and last name, full name, address, and driver's license number. Additional information can include the vehicle's title (e.g., a PDF or JPEG image of the title), loan payment information, registration information, and the like.

As further shown, the process 2600 receives this vehicle ownership information at step 2660. At 2680, the process 2600 receives information from a driver's license image from the mobile apparatus and requests (at 2685) validation that the driver's license information matches the vehicle owner's information. At 2686, the process determines if the information matches. When the information does not match, the process 2600 transmits (at 2687) an alert to the mobile apparatus indicating that the registration information does not match the driver's license information. In this case, the process ends and the user can repeat the vehicle ownership process. Alternatively, when the vehicle ownership information does match, the process 2600 transmits (at 2695) confirmation of vehicle ownership to the apparatus. At this stage, the software application enables the user to post the vehicle for sale as described above according to the exemplary aspect.

Figure 27A:
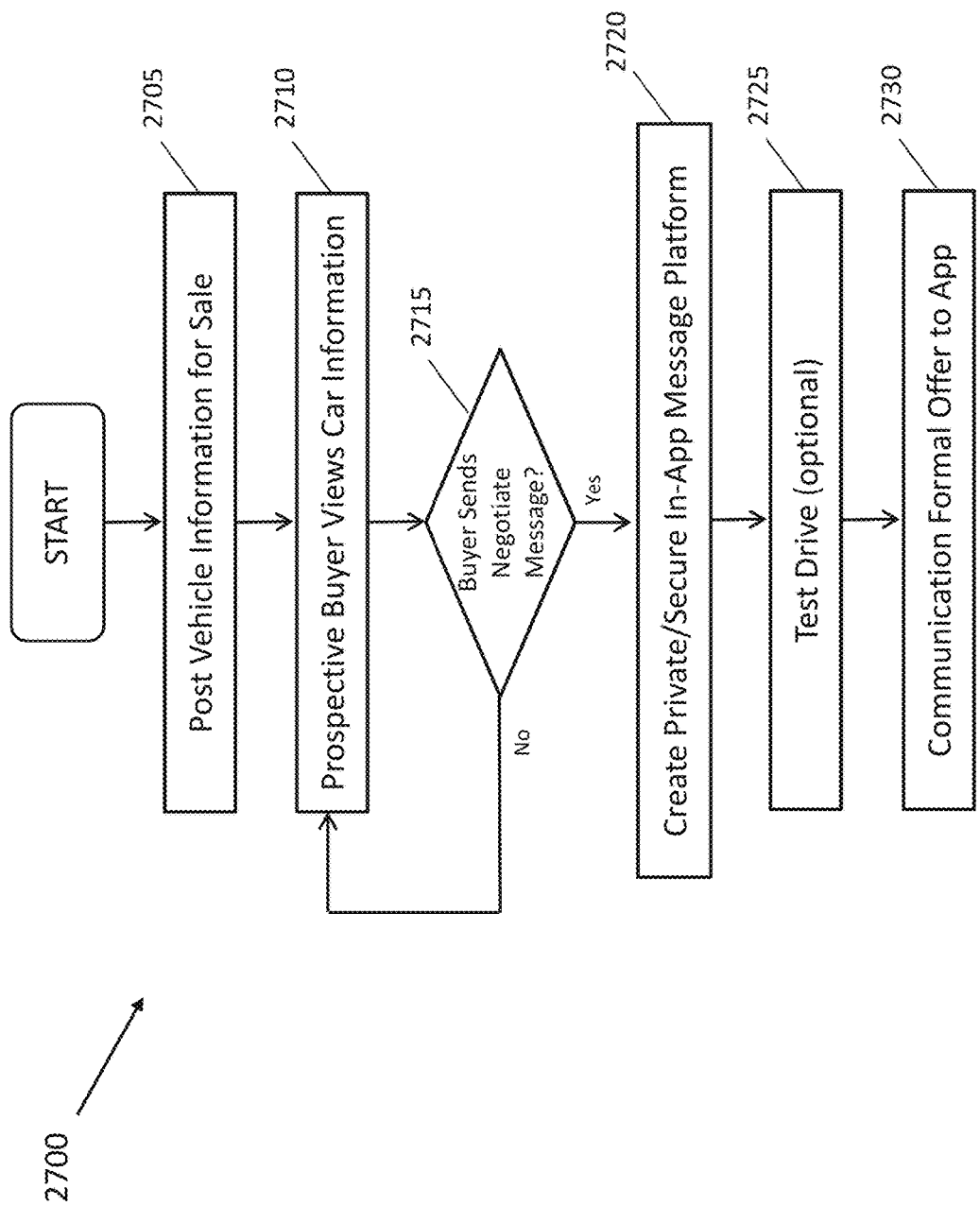
FIG. 27A conceptually illustrates a flowchart for a method for a prospective buyer to view the vehicle information and electronically transmit a purchase offer.

FIG. 27A conceptually illustrates a flowchart for a method 2700 for a prospective buyer to view the vehicle information and electronically transmit a purchase offer according to an exemplary aspect. It should be appreciated that the prospective buyer can execute the transaction entirely using his or her mobile apparatus, which can be mobile apparatus 2370, for example. Thus, the seller (via mobile apparatus 2310) and buyer (via mobile apparatus 2370) can each quickly and easily communicate requisite information to and from gateway 2395, which can be located on server 230, as described above, and configured to execute the process shown in FIG. 27A.

Initially, at step 2705, the seller can post the vehicle and related information to a website or the like using the software application on the seller's mobile device, for example, to formally present the vehicle for sale. This process is described above with respect to steps 2580-2590 of FIG. 25. In one aspect, this posting includes a number of photographs captured by the seller of the vehicle at different angles. Moreover, according to this aspect, the display on the screen of the seller's mobile device may present a number of exemplary photograph angles for the seller to mimic when capture images of the vehicle. These multiple vehicle images can then be uploaded to server 230 for presentation when the vehicle and related information are posted to the website.

Next, at step 2710, the prospective buyer can visit the website and/or a "marketplace" provided on the downloadable software application to view from a number of available vehicles for sale. For example, if the prospective buyer is browsing vehicles on a third party service, such as Craigslist, and identifies the seller's vehicle, the listing my include a prompt for the buyer to download the customized software application on his or her mobile device 2370. The additional vehicle information will also be available to the buyer, including car history, location, etc., as described above. As an example of a user interface of the presentation is discussed below with respect to FIG. 27B.

According to the exemplary aspect, each presented vehicle includes a button, link or the like (e.g., "Message Seller") that enables the prospective buyer to initiate a confidential and private communication with the seller. Thus, if the buyer identifies a car that he or she is interested in purchasing, the buyer can select the user input entry at step 2715 to initiate the private communication. At step 2720 a private messaging platform is created by the software application installed on both the seller's mobile device and the buyer's mobile device to facilitate a sales negotiation between the two parties. It should be appreciated that this message center enables the buyer to ask any questions relating to the vehicle, the vehicle's condition and location, and the like, as well as an ability to negotiate the purchase price.

An optional step is then provided at step 2725 in which the seller and buyer can agree on a time and place for the user to perform a test drive. For example, in this aspect, each mobile apparatus of the seller and buyer can transmit GPS or other device location information to the server 230. In turn, the server 230 can access a map database to identify one or a few meeting locations (e.g., local coffee shop, school parking lot, etc.) that are mutually convenient for each of the buyer and seller. For example, the identified location can be at a distance approximately equal length of travel from each of the buyer and seller. In another aspect, the test drive location can predefined. In either instant, the server 230 can then transmit the suggested test drive location as well as more or more times to the mobile apparatuses of each of the buyer and seller to facilitate the scheduling of a test.

In either case, at step 2730, if the buyer and seller agree to the vehicle's sale, using the software application, either or both parties can transmit a signal to the gateway 2395 and/or server 230 that indicates that the parties have agreed on a sale and that the purchasing steps should now be initiated on the buyer's side. In one aspect, this communication can further prompt the seller to indicate whether the vehicle should be removed from the website and/or marketplace of the software application. Alternatively, the step of removing the vehicle from these one or more platforms performed automatically.

Figure 27B:
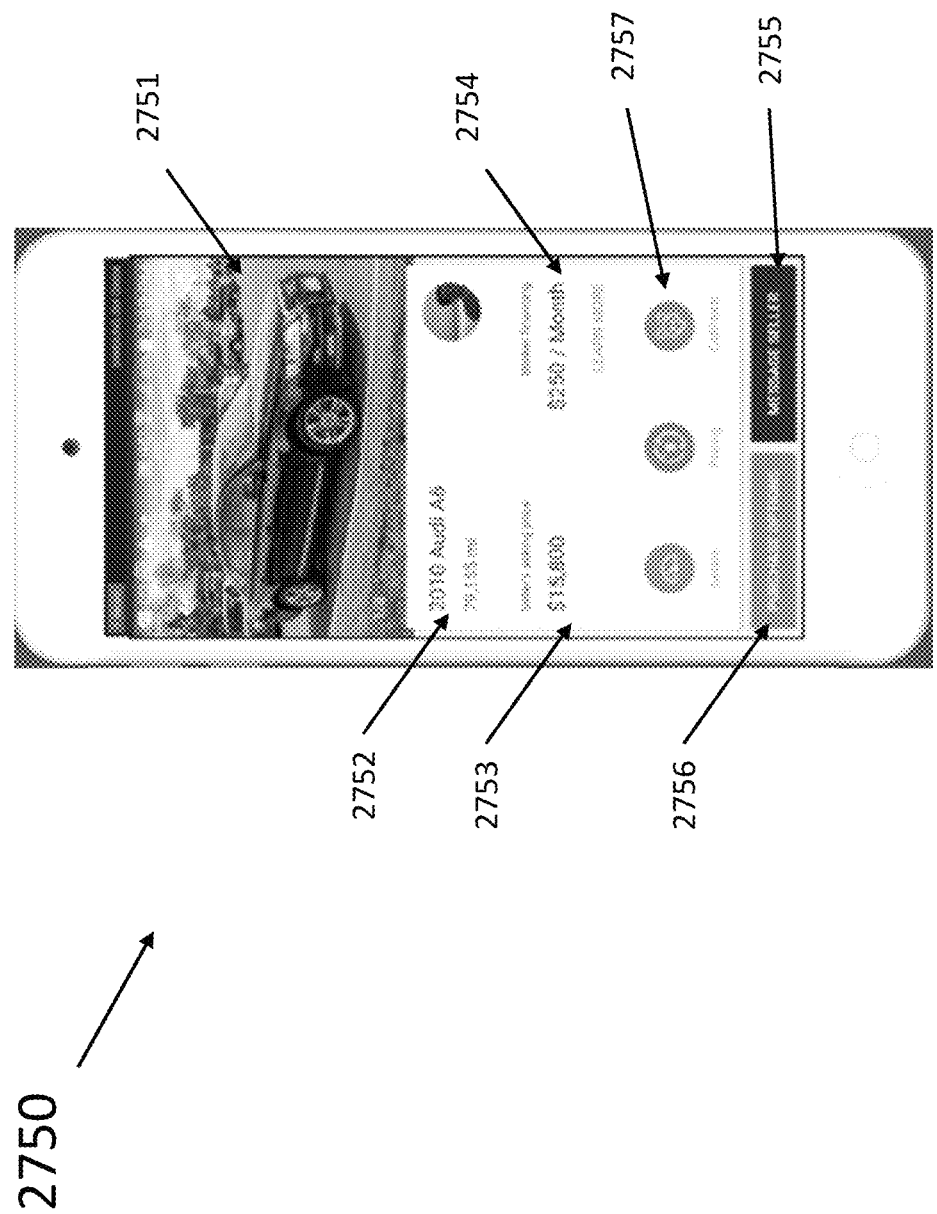
FIG. 27B illustrates a user interface of a buyer's mobile apparatus for viewing the vehicle information and electronically transmitting a purchase offer.

FIG. 27B illustrates a user interface of a buyer's mobile device for viewing the vehicle information and electronically transmitting a purchase offer according to an exemplary aspect. The user interface may be provided by the customized software application that can be downloaded from server 230, as described herein. As shown, the user interface 2750 can include one or a plurality of digital images 2751 of the vehicle uploaded by the seller's mobile apparatus to server 230. Moreover, the user interface 2750 includes general vehicle information 2752, including make, model and total mileage of the vehicle. Moreover, the buyer is presented with both a total asking prices 2753 and suggested monthly payment prices 2754 if the buyer were to finance the purchase of the vehicle. For more detailed purchase options as discussed below, the buyer can select a "purchase options" input. Furthermore, as noted above, the buyer can initiate a private communication with the seller (step 2720) using the "message seller" button 2755. In one aspect, the buyer can also request the presentation of additional vehicle information 2757, including "Details", "Pricing" and the like, for example.

Figure 28A:
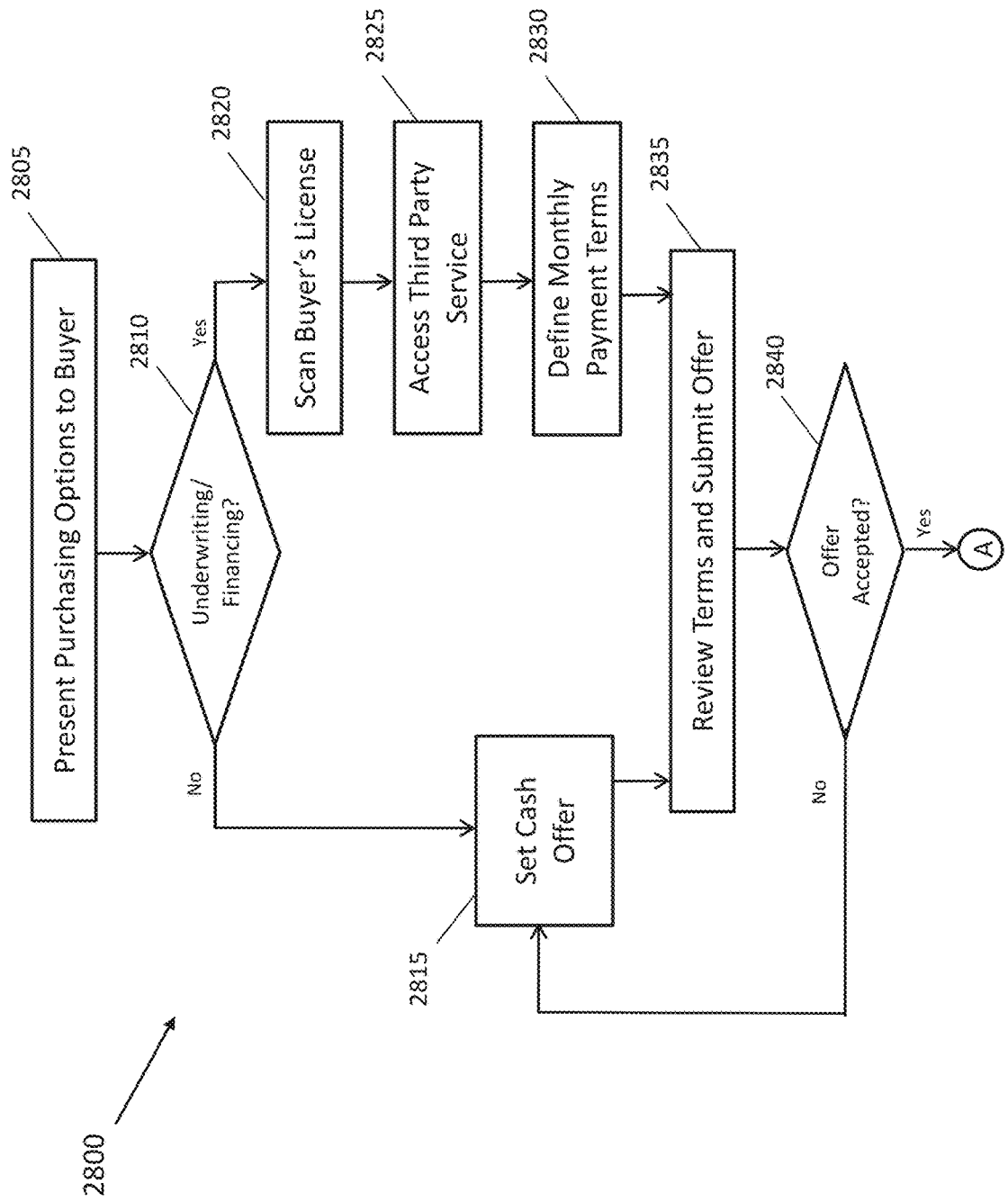
FIGS. 28A and 28B conceptually illustrate a flowchart for a method for finalizing and executing a vehicle transaction.
Figure 28B:
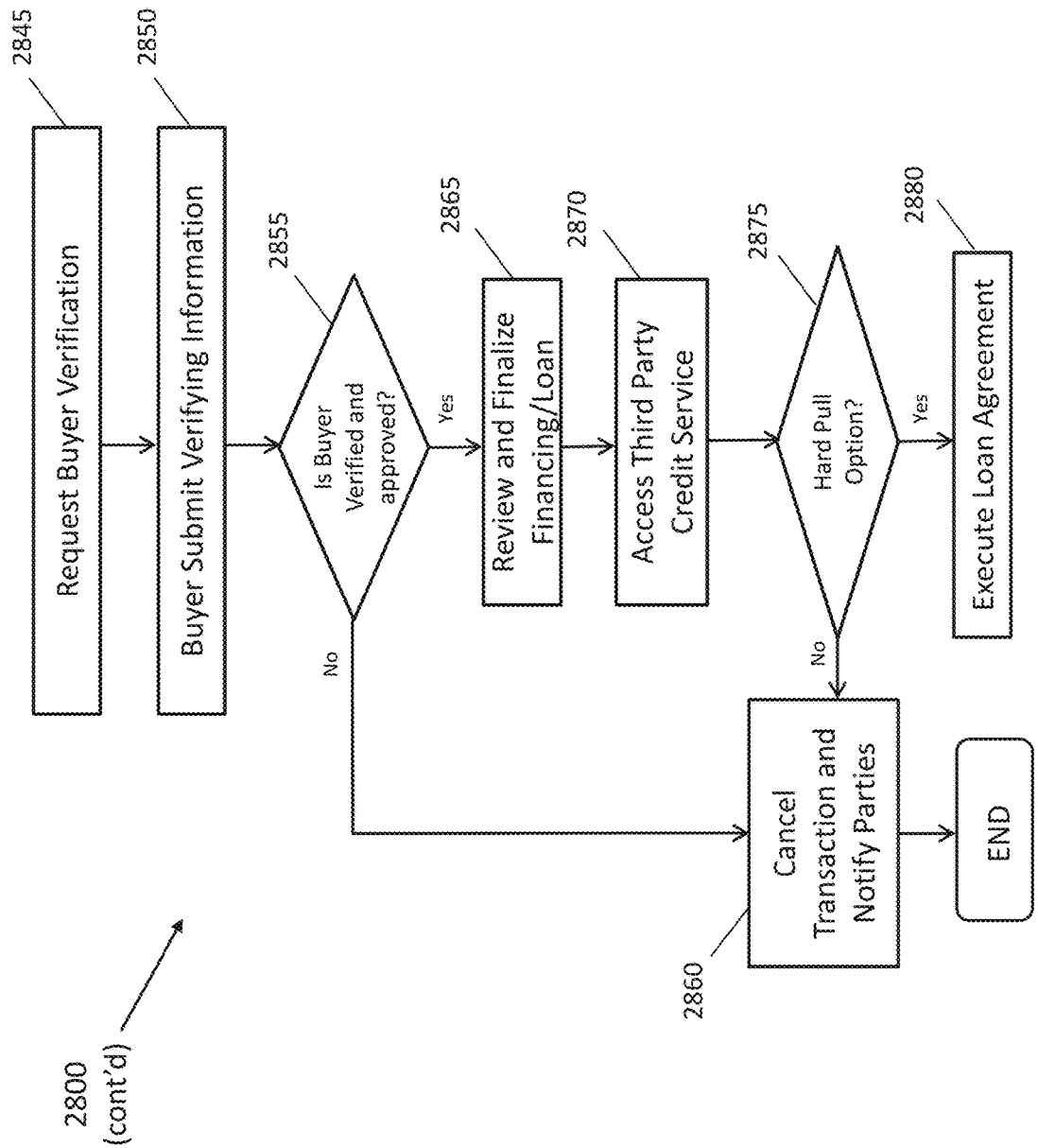

FIGS. 28A and 28B conceptually illustrate a flowchart for a method 2800 for finalizing and executing a vehicle sale according to an exemplary aspect. As previously described, it is assumed that the seller and buyer have previously agreed upon a sales price and have communicated this agreement to the server 230, for example, by the software application downloaded on one of the buyer's and/or seller's respective mobile apparatuses (or alternatively, by a website, for example). At this stage, as shown in FIG. 28A, purchasing options can be presented to the buyer of the vehicle at step 2805. More particularly, the buyer is presented with an option to selected a financing plan and, therefore, undergo an underwriting at step 2810. If the buyer declines this option, the software application determines that the agreement is based on a cash offer and requests the buyer to enter a value of the cash offer at step 2815. Otherwise, if the buyer selects financing, the buyer is prompted with a request for minimal information to facilitate the underwriting.

Conventional vehicle loans require significant paperwork and place undue burden on the individuals and computers necessary to process the application. For example, the loan application is required to enter data in numerous fields and/or fill out paper work that must be scanned in a computer and transmitted to a remote loan processing facility. Moreover, in some case, the receiving facilities are required to perform an object character recognition of such paperwork in order to identify relevant applicant information. Moreover, there is often numerous communication steps between the loan applicant and finance institution to ensure all required information has been submitted.

Accordingly, to the exemplary embodiment, the prospective buyer is prompted to scan an image of his or her license (or other user identification), including the barcode of the identification and to also indicate a current annual income. Thus, as shown in FIG. 28A, the buyer can take a picture (using the mobile apparatus, for example) of the driver's license at step 2820 and send this scan to a server (e.g., server 230) via gateway 2395 for processing.

In turn, the server 230 can then access one or more third-party credit evaluation services to execute a credit report on the buyer. Based on the credit report, the server 230 can automatically define financing terms for the buyer, which may include, for example, monthly payment, interest rates of the loan, down payment (if any) and the like. These payment terms are defined by server 230 at step 2830 and then presented to the user for review at step 2835. For example, the defined financing terms can be displayed to the user at step 2835 using the software application on the buyer's mobile device.

In one aspect, the buyer is presented with a number of customizable loan options. For example, if the user elects to pay a larger down payment, the interest rate of the load may decrease. Moreover, the buyer can easily define the term of the loan, and the like. It should be appreciated that the variation of these options will be dependent on the user's credit, annual income, and the like, and preferably set by the server 230, automatically. In one aspect, the dynamic rate pricing can be adjusted by the buyer using one or more slides presented on the user interface of the mobile apparatus. Thus, in one example, as the buyer increase the down payment using an interface slide, the interest rate may decrease proportionately.

Once the buyer accepts the finance terms, the buyer selects such acceptance on the software application, which, in turn, communicates the acceptance to server 230. In response thereto, server 230 automatically, sends a formal offer to the seller, such that the seller is presented with this offer on the seller's mobile apparatus by the software application.

The software application on the seller's mobile apparatus 2310 requests acceptance of the buyer's offer at step 2840. If the seller rejects the buyer's offer, the process will either end or return to step 2815. In one aspect, the seller can then be provided with an option to define a new cash offer, defining a new/increased sales price, for example. This process can be continually repeated where the buyer can then accept and submit a new offer (again at step 2835) for the seller's acceptance. Once the seller accepts the buyer's offer at step 2840 or vice versa, the server 230 creates, approves, and executes a loan agreement (if required) for the buyer.

More particularly, FIG. 28B further conceptually illustrates a flowchart for a method 2800 for a finalizing and executing a vehicle sale according to an exemplary aspect. Thus, once a purchase price is agreed upon, the buyer must complete the loan application process, which can be provided by server 230. In this aspect, the software application on the buyer's mobile apparatus (e.g., mobile device 2370) prompts the buyer to submit buyer verification information at step 2845. This information can include one or more of proof of car insurance, bank account information, proof of employment and/or pay stub, power of attorney (if required), and other personal information. This information can then be transmitted using the buyer's mobile apparatus to server 230. Using the buyer's information, as well as the amount and duration of the loan requested by the buyer (previously), the server 230 uses credit analysis methods (which can be flexible based on the amount of risk the financing company is willing to accept) to determine whether the buyer is approved at step 2855. Preferably, this analysis is performed automatically by server 230, for example, but can also be performed by a system administrator, loan underwriter, or the like.

If the buyer is not approved, the method proceeds to step 2860 where the transaction is canceled and both the buyer and the seller are notified of the canceled transaction by an alert sent to each user respective mobile apparatus, where the software application displays the cancellation notifications. In a further aspect, the software application includes an indication explaining the reasoning for the transaction cancellation (e.g., buyer loan failed). If the buyer is approved, the method proceeds to step 2865 where the loan is presented to the buyer. In one optional aspect, the method can also proceed to step 2870, where the server 230 can again access third party services, such as credit services to confirm the buyer's credit. In either case, at step 2875, the system (i.e., at server 230) is presented with an option of a "hard pull" meaning the system can automatically, or at the instruction of a system administrator, pull the financing offer. If this option is executed, the method again proceeds to step 2860 where each party is notified of the canceled transaction as described above. Alternatively, the method proceeds to step 2880 where the system confirms to both the seller and buyer on the respective mobile software applications that the loan has been approved and proceeds with the steps need to execute the loan agreement at step 2880. It should be appreciated that such steps mainly include presenting a formal loan offer to the buyer that includes the financial terms of the load, all relevant conditions, and request the user to confirm acceptance of the loan agreement. If the user accepts the loan, of which acceptance can be electronic signature, the method proceeds to finalize the transaction and transfer title, as will be discussed as follows.

Figure 29A:
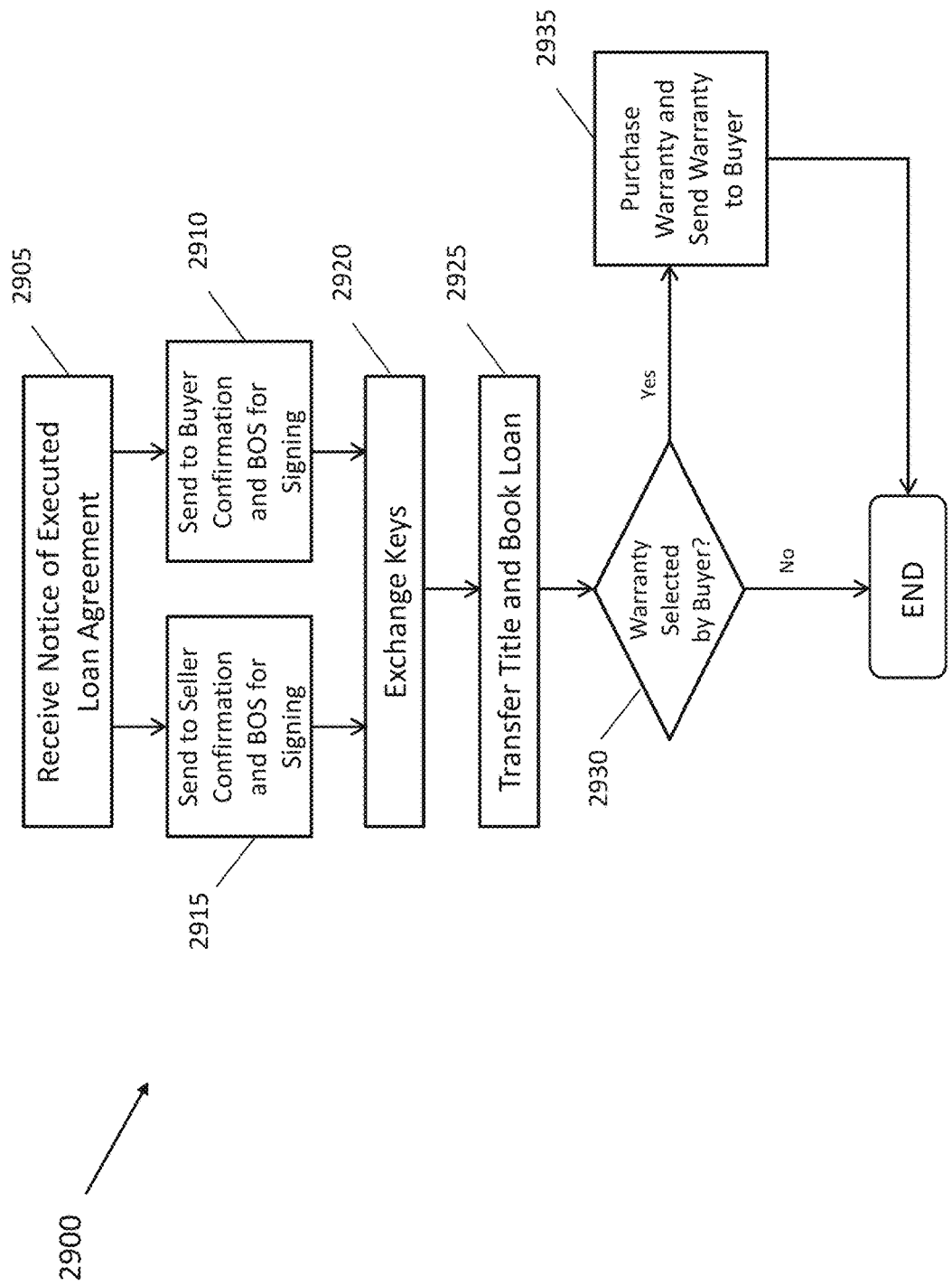
FIG. 29A conceptually illustrates a flowchart for a method for finalizing a vehicle transaction.

FIG. 29A conceptually illustrates a flowchart for a method 2900 for finalizing a vehicle transaction according to an exemplary aspect. As shown, at step 2905, the server 230 receives notification from the buyer that the loan agreement has been executed/accepted by the buyer. In other words, the buyer, using the software application on his or her mobile device 2370, has agreed to all terms and conditions offered by the server 230. Using gateway 2395, for example, server 230 creates a bill of sale to be signed by each of the buyer and seller and sends confirmation, including the bill of sale, to the seller at step 2915 and buyer at step 2910. It should be understood that these steps can be performed in series or parallel. At this stage, the seller is prompted to transfer keys to the buyer at step 2920. Then, the server 230 transfers title and executes the loan at step 2925. In this case, the server can perform a transfer of the total sales amount to the seller's requested bank account. Moreover, the server can withdraw the agreed down payment from the buyer's bank account. Moreover, it should be appreciated that the title transfer can be performed by a system administrator, for example. Thus, if the seller currently has a lien on the vehicle, the system administrator can schedule payment with the current lien holder and accept transfer of title. The title can then be held be the service until the buyer fully satisfies loan obligations.

Moreover, according to one further aspect, the buyer can be prompted with the option to purchase a warranty for the vehicle at step 2930. If the buyer declines the warranty, the process ends. Otherwise, the server 230 receives the request a purchases the warranty from the vehicle manufacturer, for example, on behalf of the buyer. Conventional systems require the purchaser to contact the vehicle manufacturer or dealer directly to purchase the warranty. The exemplary method performs this task on behalf of the buyer at step 2935. It should be appreciated that according to an alternative aspect, the option to purchase a warranty can be presented during the loan application process, the prices of which will be included in the proposed loan plan.

Figure 29B:
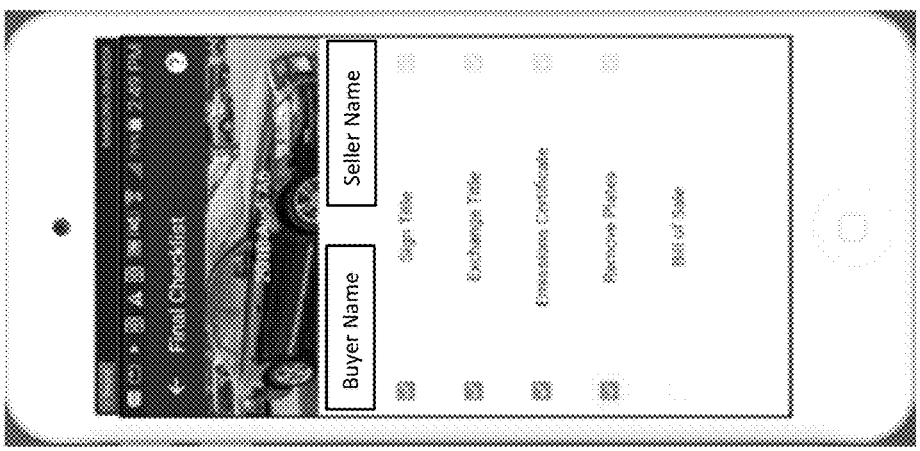
FIG. 29B illustrates user interfaces for each of the buyer and seller for finalizing a vehicle transaction.
Figure 29B:
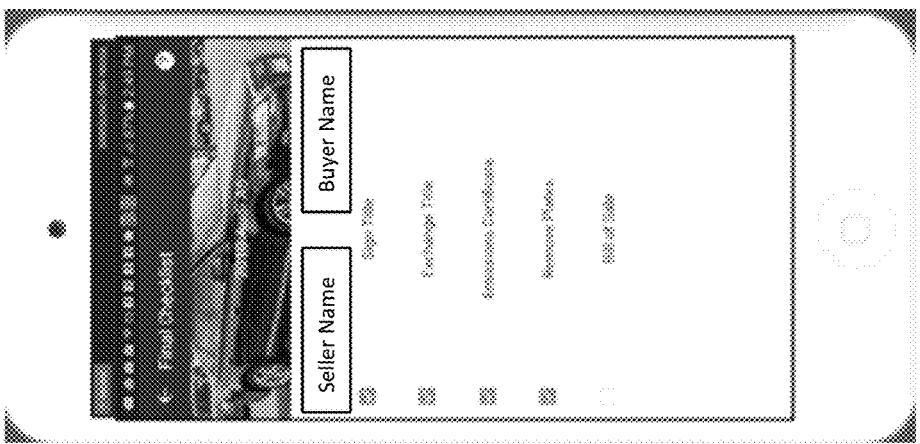

FIG. 29B illustrates user interfaces for each of the buyer and seller for finalizing a vehicle transaction according to an exemplary aspect. According to the exemplary aspect, the seller's mobile apparatus 2310 is presented with an interface 2950A that presents a "Final Checklist" of action items to complete including, for example, "Sign Title", "Exchange Title", "Emissions Certificate", "Remove Plates", and "Bill of Sale". The buyer's user interface 2950B is presented with the same actions items in this example. Once each party has completed every action item and confirms completion using the user interfaces 2950A and 2950B, each software application will send a confirmation signal back to server 230 as discussed above. At this point, the ACH transfer payment of the sales price will be initiated into the seller's account and, if applicable, the down payment will be withdrawn from the buyer's bank account.

Figure 29C:
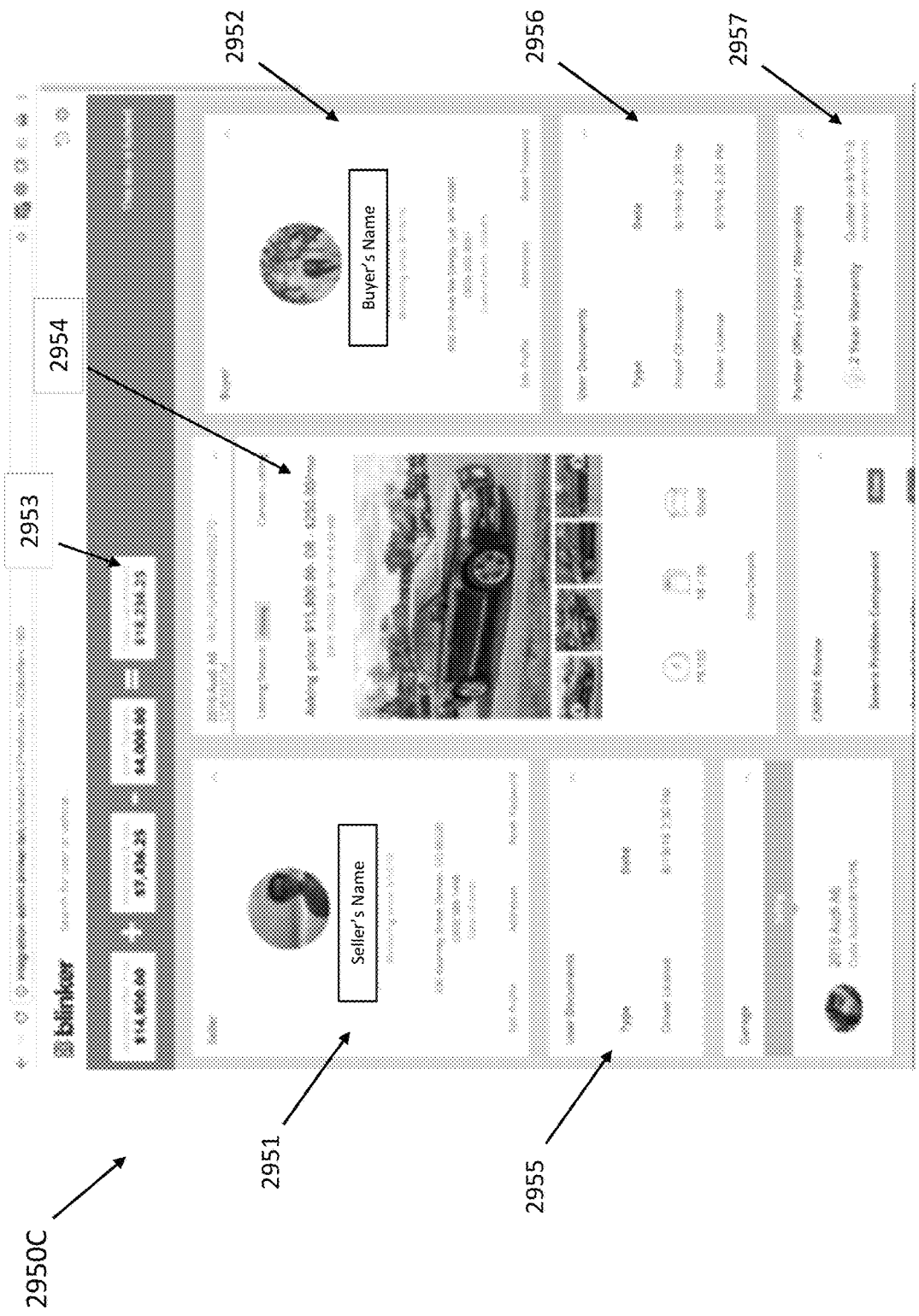
FIG. 29C illustrates a screen shot of a user interface for an administrator for finalizing a vehicle transaction.

FIG. 29C illustrates a screen shot 2950C of an administrator for finalizing a vehicle transaction according to an exemplary aspect. In particular, as described above, administrators of the service perform certain actions in order to facilitate the vehicle sale and loan agreement. In this aspect, the administrator is continuously provided with a dynamic snapshot of the developing relationship between the buyer and seller. Thus, the administrator is presented with both the seller's name 2951 and information (e.g., address, email, and the like) as well as the buyer's name 2952 and information (e.g., address, email, and the like). In addition, the total loan price 2953 is presented, which can be a derivation of the offer price, warranty and fees minus any down payment. The vehicle information 2954 including images, and car details is also presented on user interface 2950C. Furthermore, the status of all required seller documents 2955 and buyer documents 2956 is presented. Although not shown, certain action items can be presented in one aspect enabling the administrator to prompt the buyer and/or seller to submit required documentation. Furthermore, warranty information 2957 can be presented on the user interface. According to the exemplary aspect, the administrator is enabled to continuously determine the current state of the transaction, and, if necessary, perform any required actions to prompt either the buyer and/or seller to move the transaction along in the process.

Figure 30:
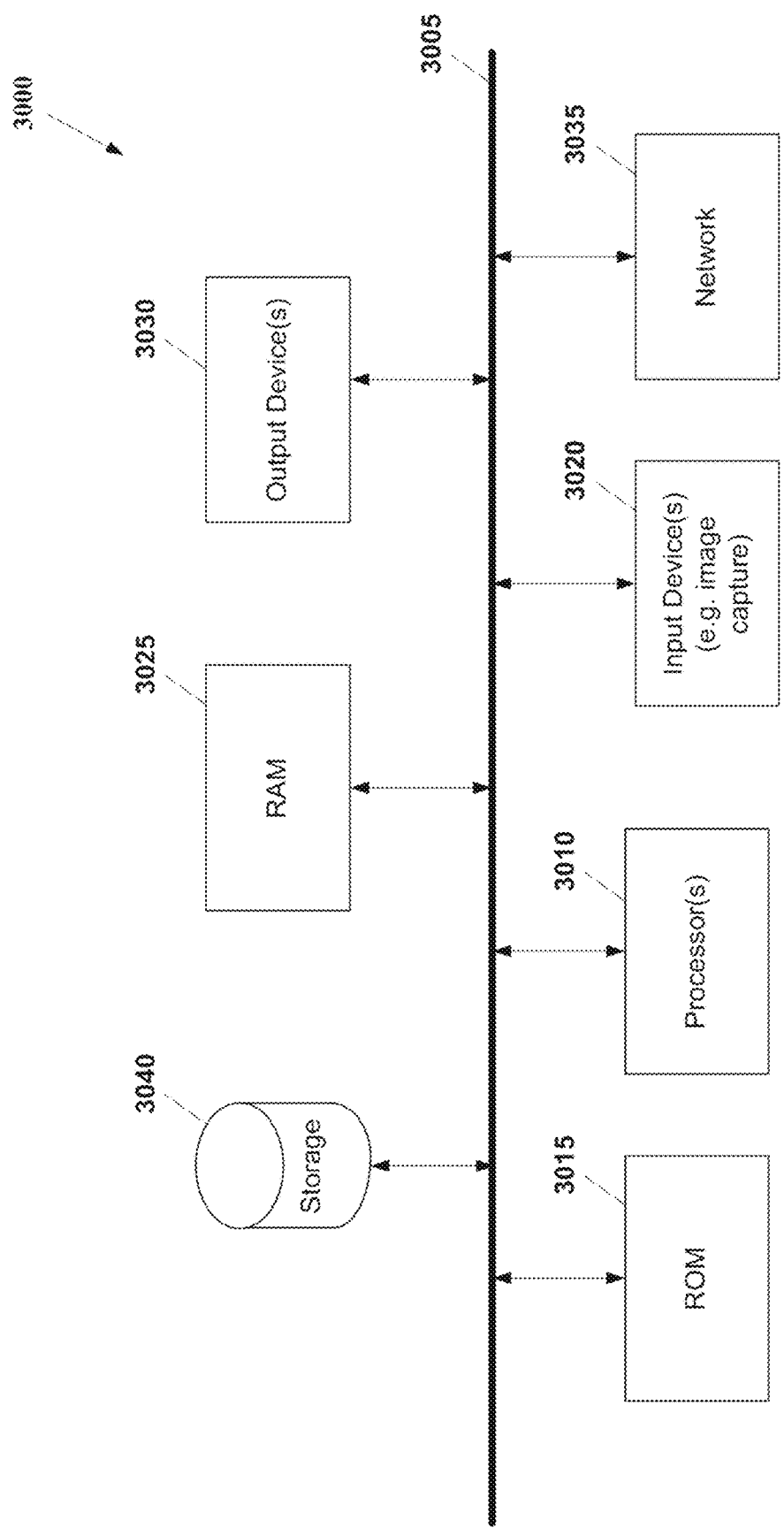
FIG. 30 illustrates an exemplary embodiment of an electronic system that may implement the license plate detection apparatus.

FIG. 30 illustrates an exemplary embodiment of a system 3000 that may implement the license plate detection apparatus and/or vehicle transaction process according to an exemplary aspect. The electronic system 3000 of some embodiments may be a mobile apparatus of the seller and/or buyer as described above. Moreover, the system 3000 (or certain components shown therein) can be used to implement the remote server 230 (and gateway 2395) configured to perform the processes described herein to electronically facilitate the vehicle transaction.

As shown, the electronic system includes various types of machine readable media and interfaces. The electronic system includes a bus 3005, processor(s) 3010, read only memory (ROM) 3015, input device(s) 3020, random access memory (RAM) 3025, output device(s) 3030, a network component 3035, and a permanent storage device 3040.

The bus 3005 communicatively connects the internal devices and/or components of the electronic system. For instance, the bus 3005 communicatively connects the processor(s) 3010 with the ROM 3015, the RAM 3025, and the permanent storage 3040. The processor(s) 3010 retrieve instructions from the memory units to execute processes of the invention.

The processor(s) 3010 may be implemented with one or more general-purpose and/or special-purpose processors. Examples include microprocessors, microcontrollers, DSP processors, and other circuitry that can execute software. Alternatively, or in addition to the one or more general-purpose and/or special-purpose processors, the processor may be implemented with dedicated hardware such as, by way of example, one or more FPGAs (Field Programmable Gate Array), PLDs (Programmable Logic Device), controllers, state machines, gated logic, discrete hardware components, or any other suitable circuitry, or any combination of circuits.

Many of the above-described features and applications are implemented as software processes of a computer programming product. The processes are specified as a set of instructions recorded on a machine readable storage medium (also referred to as machine readable medium). When these instructions are executed by one or more of the processor(s) 3010, they cause the processor(s) 3010 to perform the actions indicated in the instructions.

Furthermore, software shall be construed broadly to mean instructions, data, or any combination thereof, whether referred to as software, firmware, middleware, microcode, hardware description language, or otherwise. The software may be stored or transmitted over as one or more instructions or code on a machine-readable medium. Machine-readable media include both computer storage media and communication media including any medium that facilitates transfer of a computer program from one place to another. A storage medium may be any available medium that can be accessed by the processor(s) 3010. By way of example, and not limitation, such machine-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Also, any connection is properly termed a machine-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects machine-readable media may comprise non-transitory machine-readable media (e.g., tangible media). In addition, for other aspects machine-readable media may comprise transitory machine-readable media (e.g., a signal). Combinations of the above should also be included within the scope of machine-readable media.

Also, in some embodiments, multiple software inventions can be implemented as sub-parts of a larger program while remaining distinct software inventions. In some embodiments, multiple software inventions can also be implemented as separate programs. Any combination of separate programs that together implement a software invention described here is within the scope of the invention. In some embodiments, the software programs, when installed to operate on one or more electronic systems 3000, define one or more specific machine implementations that execute and perform the operations of the software programs.

The ROM 3015 stores static instructions needed by the processor(s) 3010 and other components of the electronic system. The ROM may store the instructions necessary for the processor(s) 3010 to execute the processes provided by the license plate detection apparatus. The permanent storage 3040 is a non-volatile memory that stores instructions and data when the electronic system 3000 is on or off. The permanent storage 3040 is a read/write memory device, such as a hard disk or a flash drive. Storage media may be any available media that can be accessed by a computer. By way of example, the ROM could also be EEPROM, CD-ROM or other optical disk storage, magnetic disk storage or other magnetic storage devices, or any other medium that can be used to carry or store desired program code in the form of instructions or data structures and that can be accessed by a computer.

The RAM 3025 is a volatile read/write memory. The RAM 3025 stores instructions needed by the processor(s) 3010 at runtime, the RAM 3025 may also store the real-time video images acquired during the license plate detection process. The bus 3005 also connects input and output devices 3020 and 3030. The input devices enable the user to communicate information and select commands to the electronic system. The input devices 3020 may be a keypad, image capture apparatus, or a touch screen display capable of receiving touch interactions. The output device(s) 3030 display images generated by the electronic system. The output devices may include printers or display devices such as monitors.

The bus 3005 also couples the electronic system to a network 3035. The electronic system may be part of a local area network (LAN), a wide area network (WAN), the Internet, or an Intranet by using a network interface. The electronic system may also be a mobile apparatus that is connected to a mobile data network supplied by a wireless carrier. Such networks may include 3G, HSPA, EVDO, and/or LTE.

Figure 31A:
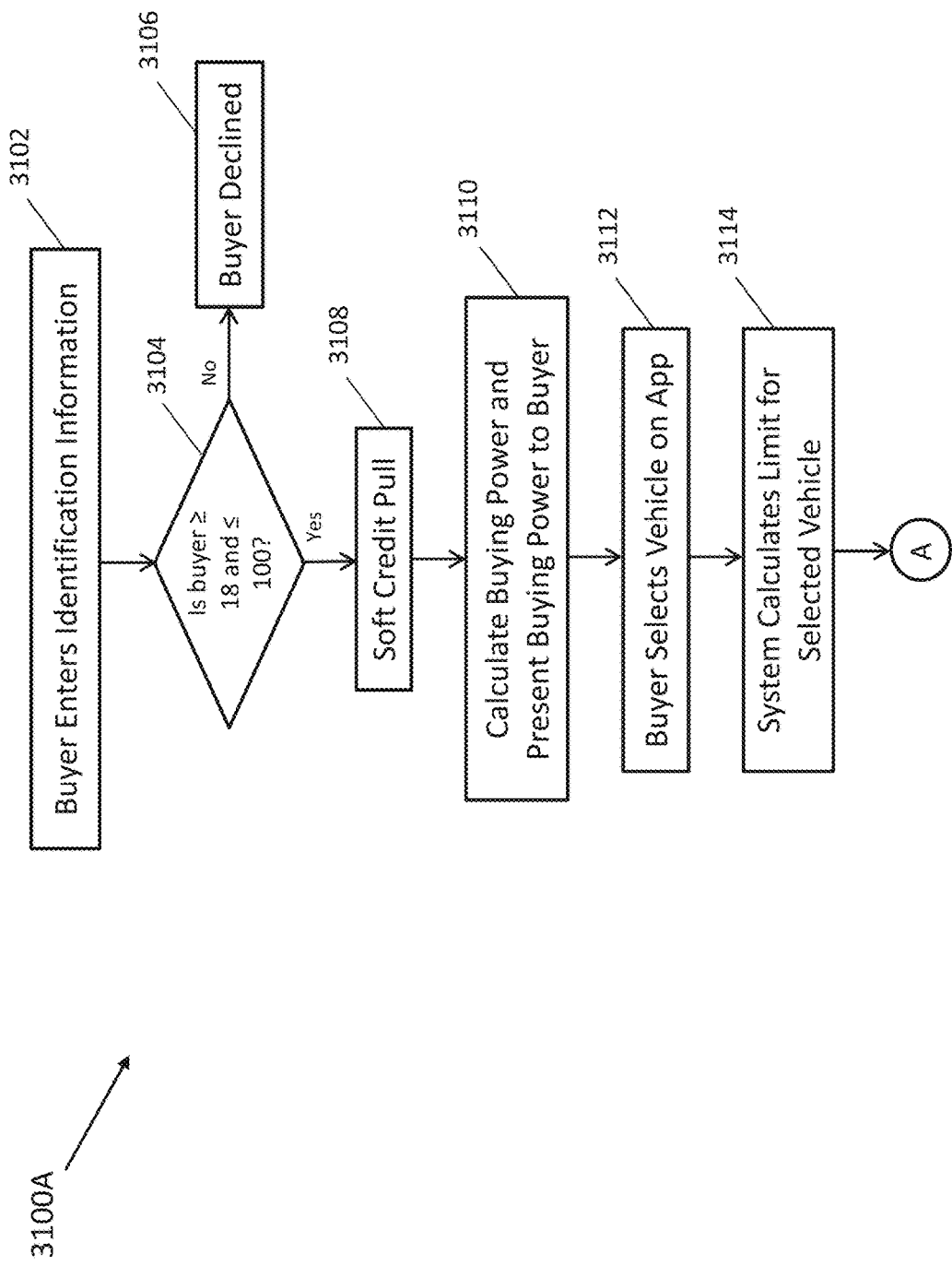
FIGS. 31A-31D illustrate detailed flowcharts for methods for processing a prospective buyer for facilitating a vehicle sale according to an exemplary aspect.
Figure 31B:
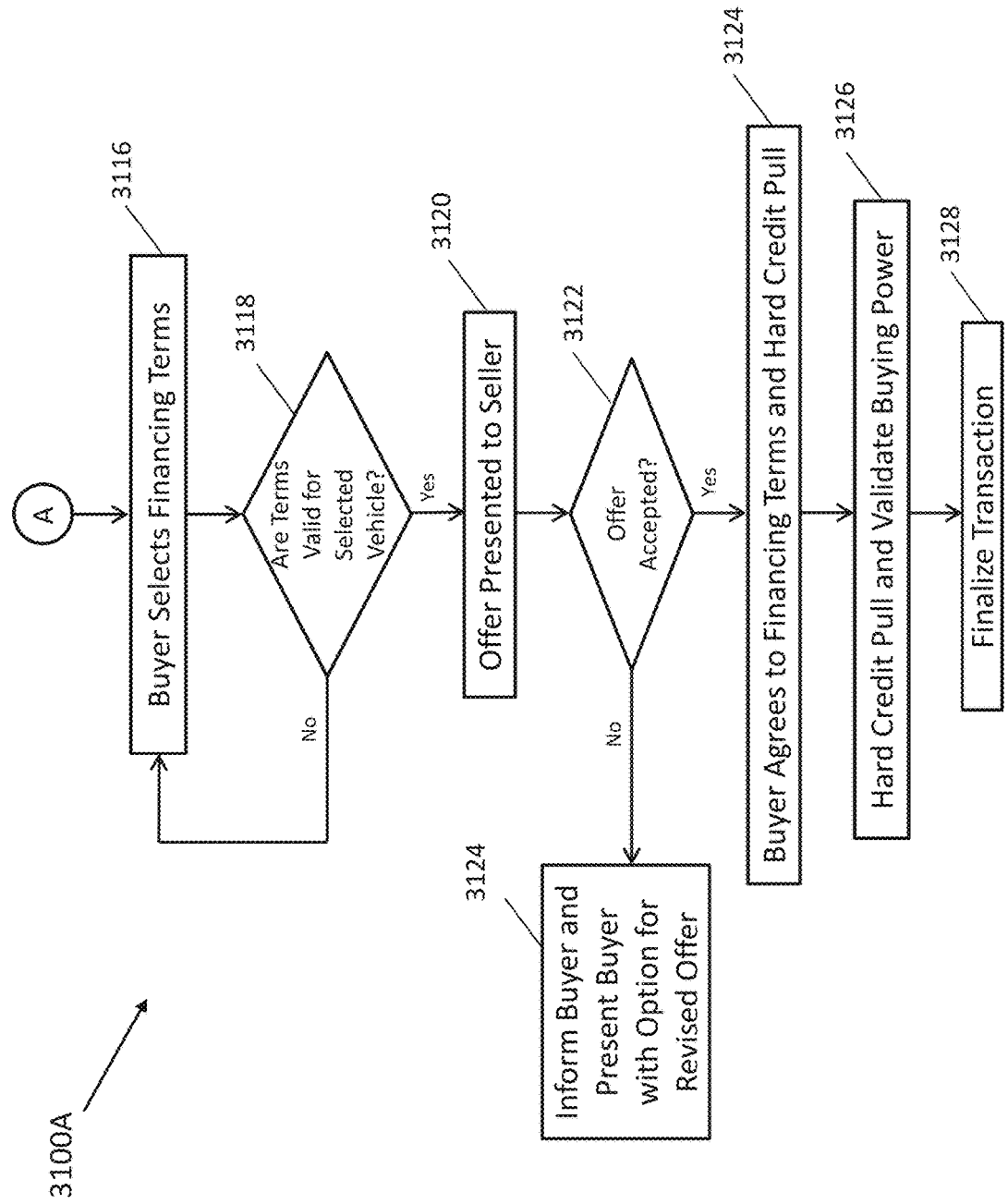

FIGS. 31A and 31B conceptually illustrate a detailed flowchart for a method 3100A for processing a prospective buyer for facilitating a vehicle sale according to an exemplary aspect. In one aspect, the method shown in these figures corresponds to one or more steps of FIGS. 28A and 28B described above. As shown, initially at step 3102, the prospective buyer is prompted to enter his or her identification information, which can include scan an image of his or her license (or other user identification), including the barcode of the identification captures by a camera of his or her electronic device, for example. In addition, the buyer is prompted to indicate a current employment status, including annual income. Thus, in one aspect, the buyer can take a picture (using the mobile apparatus, for example) of the driver's license at step 3102 and send this scanned data to a server (e.g., server 230) via gateway 2395 for processing.

In one exemplary aspect, at step 3104, the server 230 is configured to perform an automatic determination of whether the buyer is within a predetermined age range (i.e., 18 to 100). For example, based on an image capture of the buyer's driver's license (e.g., the barcode from the license as discussed above) or other identification results in the creation of data records corresponding to the buyer's identity, the server can subsequently perform automatic processing steps without manual intervention. Specifically, at step 3104, server 230 identifies the age and automatically compares it with an age range that is predetermined by an administrator, for example. In other words, the server automatically can perform a determination as to whether the buyer is within the predetermined age range by processing of the buyer's identification results in determining the age range and then applying a numerical calculation to confirm the buyer is over age 18, but under 100, for example. If the buyer is not within this range, the buyer is automatically declined at step 3106.

Otherwise, the server 230 proceeds to step 3108 and automatically performs a soft credit pull of the buyer. Specifically, in this aspect, the server 230 can access one or more third-party credit evaluation services to obtain a credit report (e.g., a credit score) of the buyer. Using this credit score, the server is configured to automatically assign the buyer with a "buying power" at step 3110, which can be communicated to the buyer in one exemplary aspect. The details of the buyer power calculation will be discussed in more detail below. However, according to the exemplary aspect, server 230 is configured to automatically generates the buying power tier by numerically manipulating the buyer's credit score and placing it within one of a number of calculated tiers (e.g., five tiers). For example, any credit score over 750, for example, can assigned to Tier 1, any score between 675 and 750, can be assigned to Tier 2, and so forth. These numbers are simply provided as an example, but can be varied according to the system administrator. Thus, in this aspect, one or more algorithms or equations may be applied to assign a unique buying power tier for the buyer, which may also take into consideration other data points which are retrieved for the buyer. For example, in addition to the credit score data, other factors may be applied within the algorithms/equations that may alter the exact tier in which the buyer is placed. These other factors could include a debt to income ratio, the geographical location where the buyer is found, the employment status of the buyer, annual income, among others. Therefore, it should be understood that the buying power tier that is assigned is not only an automatic aspect of the invention, but may take into account a number of different attributes of the buyer that go beyond the mere evaluation of the buyer's credit score.

Based on the automatically calculated buying power, the server 230 is able to use the determined buying power for the buyer to establish three limits for the buyer's financing plan: (1) maximum monthly payment; (2) maximum total loan amount; and (3) ratio of maximum loan to vehicle value. This information is stored in a database at server 230 and is associated with the prospective buyer accordingly. With respect to automatically determining acceptable ranges of finance terms for the buyer that meet the value of a selected car along with maximum monthly payments, maximum total amount, and maximum loan to vehicle value, it should also be understood that this step in the method comprises one or more algorithms which automatically determine the acceptable finance terms. Variables within the algorithms include ranges of values which enable finance terms to be determined without manual intervention or evaluation.

Next, at step 3112, the buyer uses his application to select a vehicle for potential purchase. This process is described in detail above and will not be repeated herein. At step 3114, the server 230 calculates finance plan limits for the selected vehicle. In particular, the vehicle is assigned with a selling price and/or an estimated price as described above. Based on the calculated buying power of the buyer, the server 230 is configured to automatically determine acceptable ranges of finance terms for the buyer that meet the value of the specific car with the maximum monthly payment, maximum total loan amount, and ratio of maximum loan to vehicle value identified above.

Figure 32B:
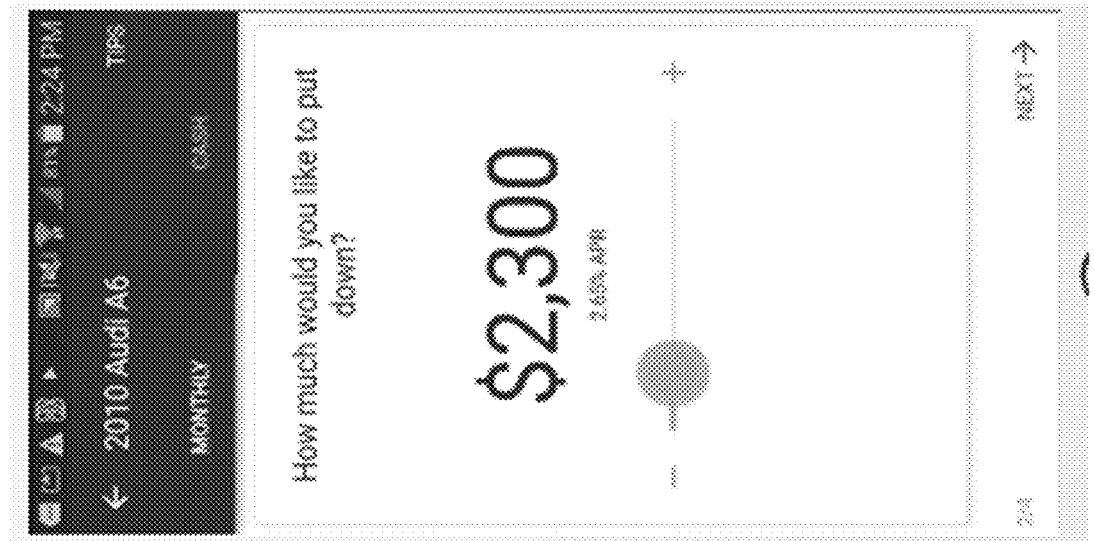
FIGS. 32A-32F illustrate screenshots of a user interface for buyer to select financing and payment terms according to an exemplary aspect.
Figure 32A:
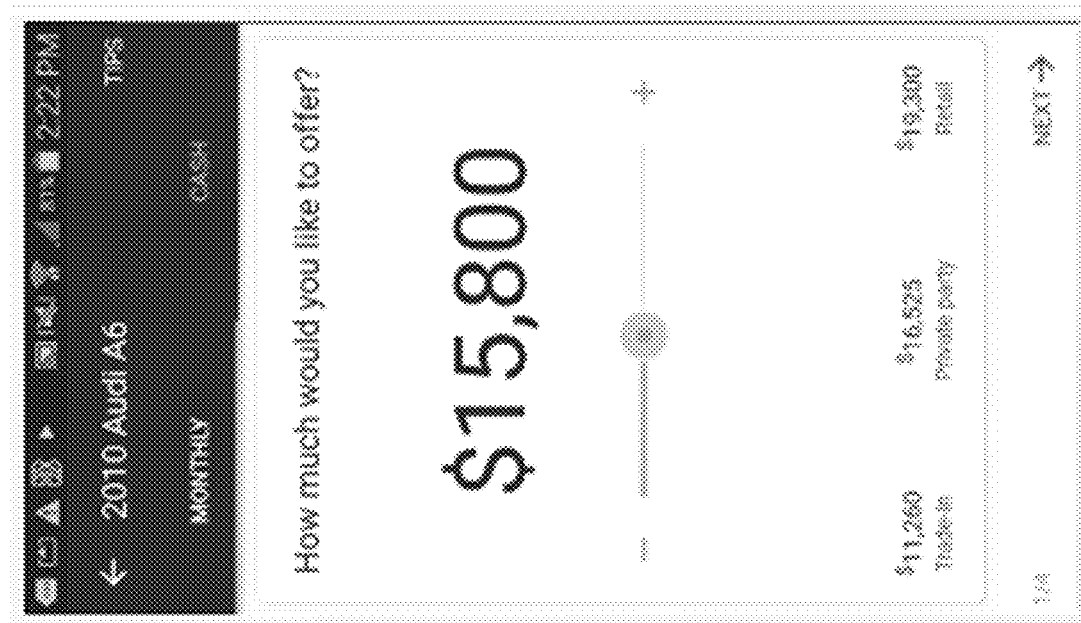
Figure 32D:
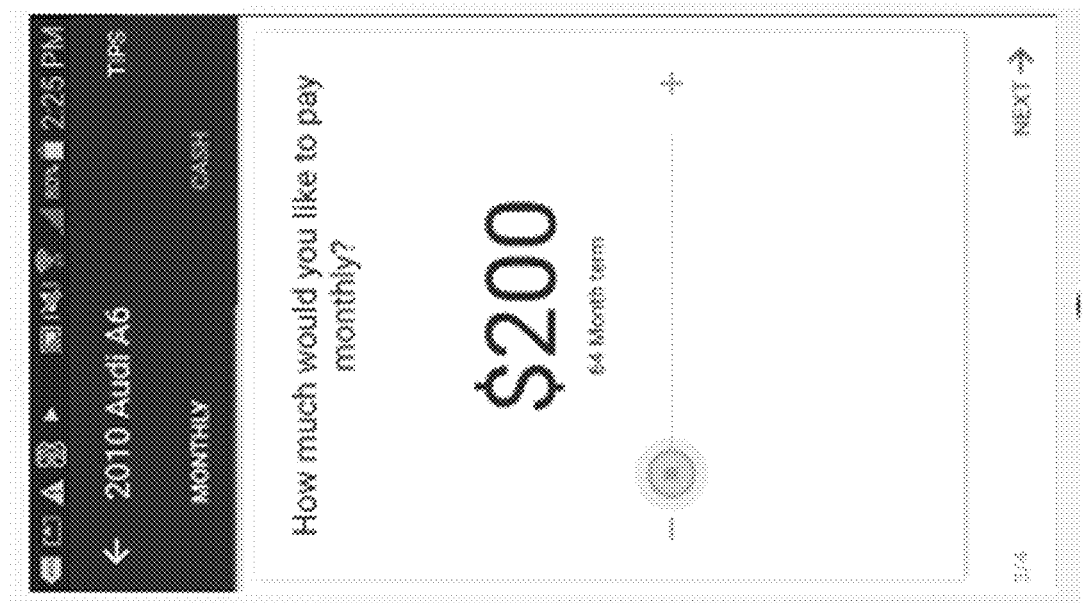
Figure 32C:
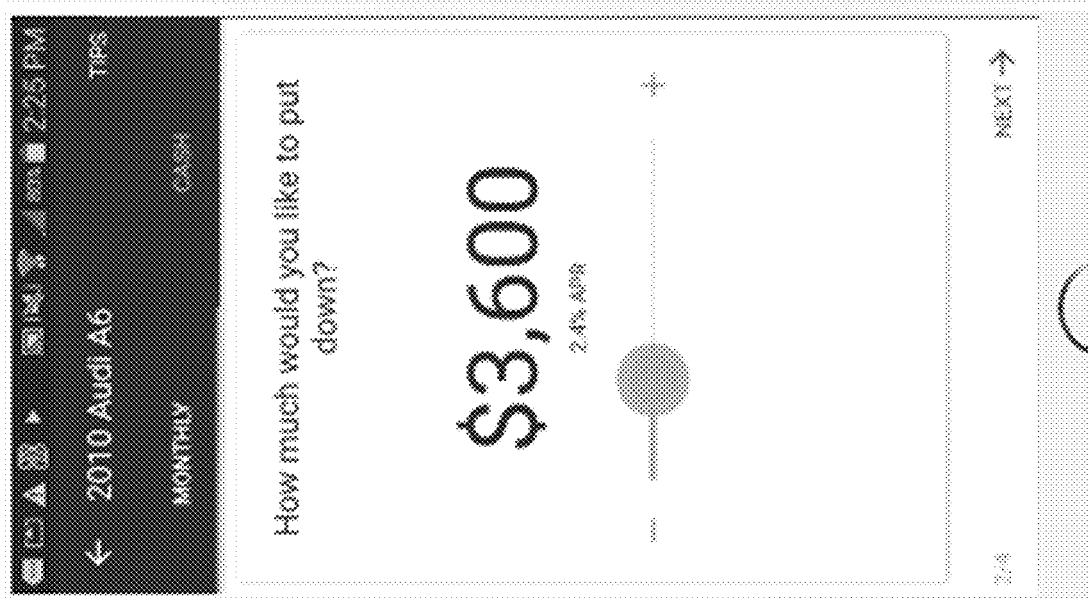
Figures 32E, 32F:
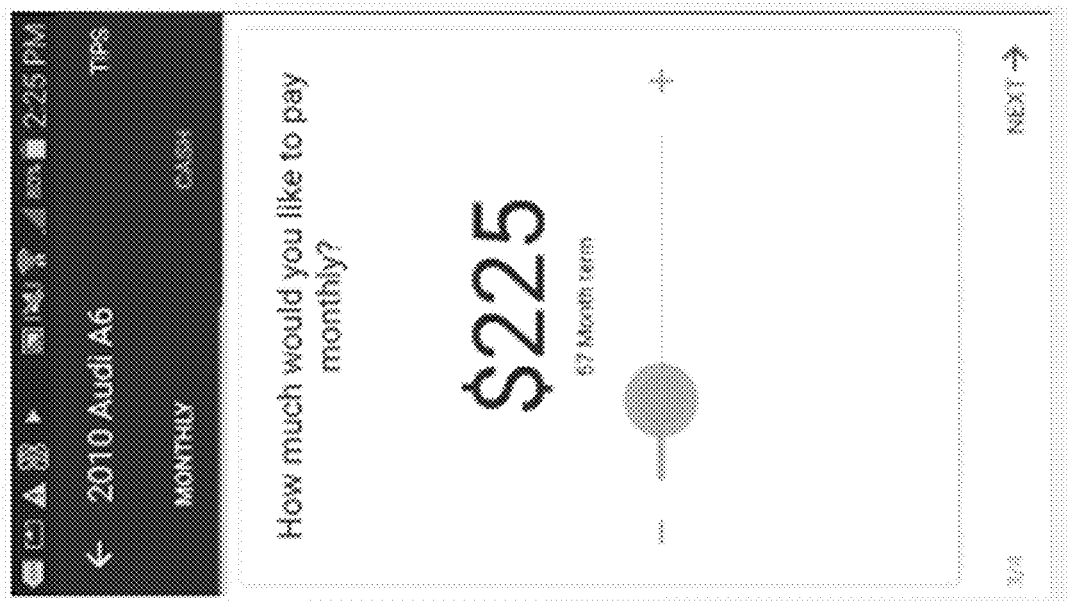

Next, at step 3116, the buyer is able to use the software application on his or her mobile device to select user configurable financing and purchase terms. FIGS. 32A-32F illustrate screenshots of a user interface for buyer to select financing and payment terms according to an exemplary aspect. As shown in FIG. 32A, the buyer is presented with estimated prices for "trade-in", "private party" and "retail". The buyer is also presented with a user controllable slider that enables the buyer to quickly and easily adjust the offered price to the seller. In one aspect, the scale of the adjustable slider will be based around the seller's asking price (e.g., the seller's asking price could be the high price of the slider). Next, in FIG. 32B, the buyer is presented with a user controllable slider that enables the user to adjust the amount he or she would like to pay as a down payment. In one aspect, the APR will adjust according to the amount of down payment. In other words, the buyer can buy down the APR by increasing the down payment. For example, as shown in FIG. 32C, the user has increased the down payment from $2,300 to $3,600 and the APR has been reduced accordingly. In a similar manner, FIGS. 32D and 32E, illustrate the buyer's ability to set the amount of monthly payment and define the total length of the term. Finally, FIG. 32F, presents an interface that is a snapshot of the buyer's financing plan. As described above, the buyer's "buying power" defines the terms of the required down payment, monthly payment, and the like. Thus, once server 230 automatically calculates the buying power, the server 230 is configured to access a predefined matrix in a database and compare the buying power with the vehicle information, including asking price, estimated price and/or the like, set forth in the matrix. This predefined matrix further provides the maximum and minimum values for each slide shown in FIGS. 32A-32E. Thus, using the predefined matrix in view of the buyer's calculated buying power with vehicle information, asking price, and estimated price, the matrix effectively provides one or more algorithms or equations that enable the minimum and maximum values for each slide to be automatically generated on the buyer's mobile device. Again, this step or aspect of the method is achieved without any manual intervention or evaluation and therefore greatly expedites the purchase transaction. According to one example, a user in a Tier 1 buying power will be required to put less money down for a specific vehicle than buyer in Tier 5, for example. All of these terms are automatically defined by server 230 and presented to the user as adjustable financing and payment options.

Referring back to FIG. 31B, once the buyer has submitted the offer via the software application, server 230 automatically performs another check at step 3118 to confirm that the buyer's selected terms are acceptable for the limits of the selected vehicle. If not, the buyer is prompted to select new terms again at step 3116. Otherwise, at step 3120, the formal offer is automatically presented on the seller's software application. If the seller rejects this offer at step 3122, the method proceeds to step 3124 where the buyer is informed that his offer has been rejected (e.g., the offered prices is too low) and the buyer is presented with the option of submitting a new offer. For example, in one aspect, the method can return to step 3116.

Figure 31C:
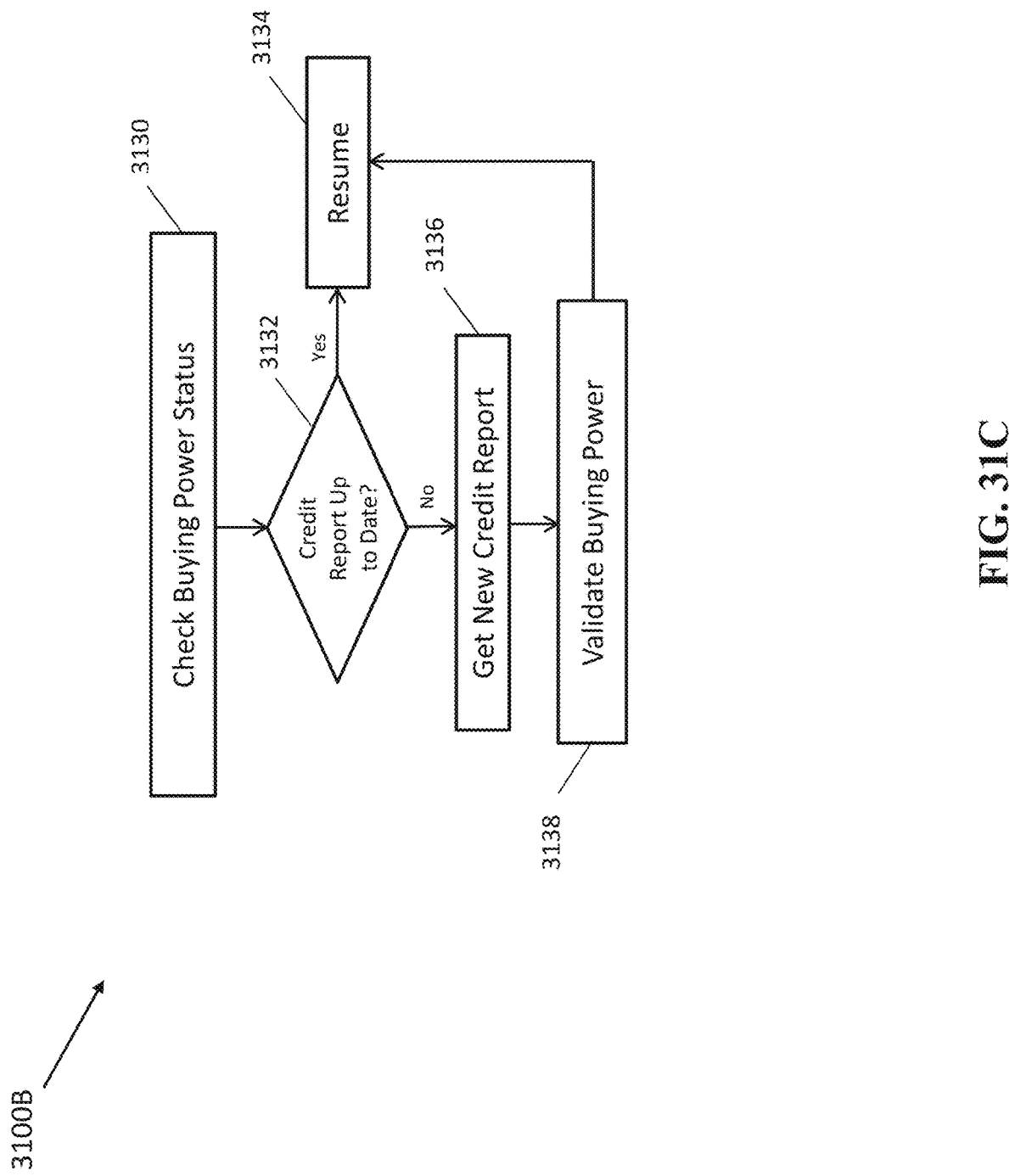

Otherwise, if the seller accepts the buyers offer at step 3122, the method proceeds to step 3124 where the buyer is prompted to agree to the offered financing terms and must also agree to a hard credit pull. Upon receiving authorization, at step 3126, the server 230 again accesses one or more third-party credit evaluation services to obtain a full credit report including a credit score of the buyer. For example, referring to FIG. 31C, the server 230 can again determine the buying power of the buyer at step 3130. As shown, the method proceeds to step 3132 to determine if the credit report in the database of server 230 is current, i.e., less than a predetermined threshold (e.g., 30 days) old. If not, the server 230 accesses one or more third-party credit evaluation services at step 3136 to obtain a full credit report including a credit score of the buyer. The buyer power of the buyer is then validated at step 3138 before the method resumes at step 3134. Finally, referring back to FIG. 31B, if the buyer's buying power and credit have been validated, the method automatically proceeds to step 3128 where the transaction between the buyer and seller is finalized. The execution of the transaction is described above with respect to FIG. 29A according to one exemplary aspect and will not be repeated herein.

Figure 31D:
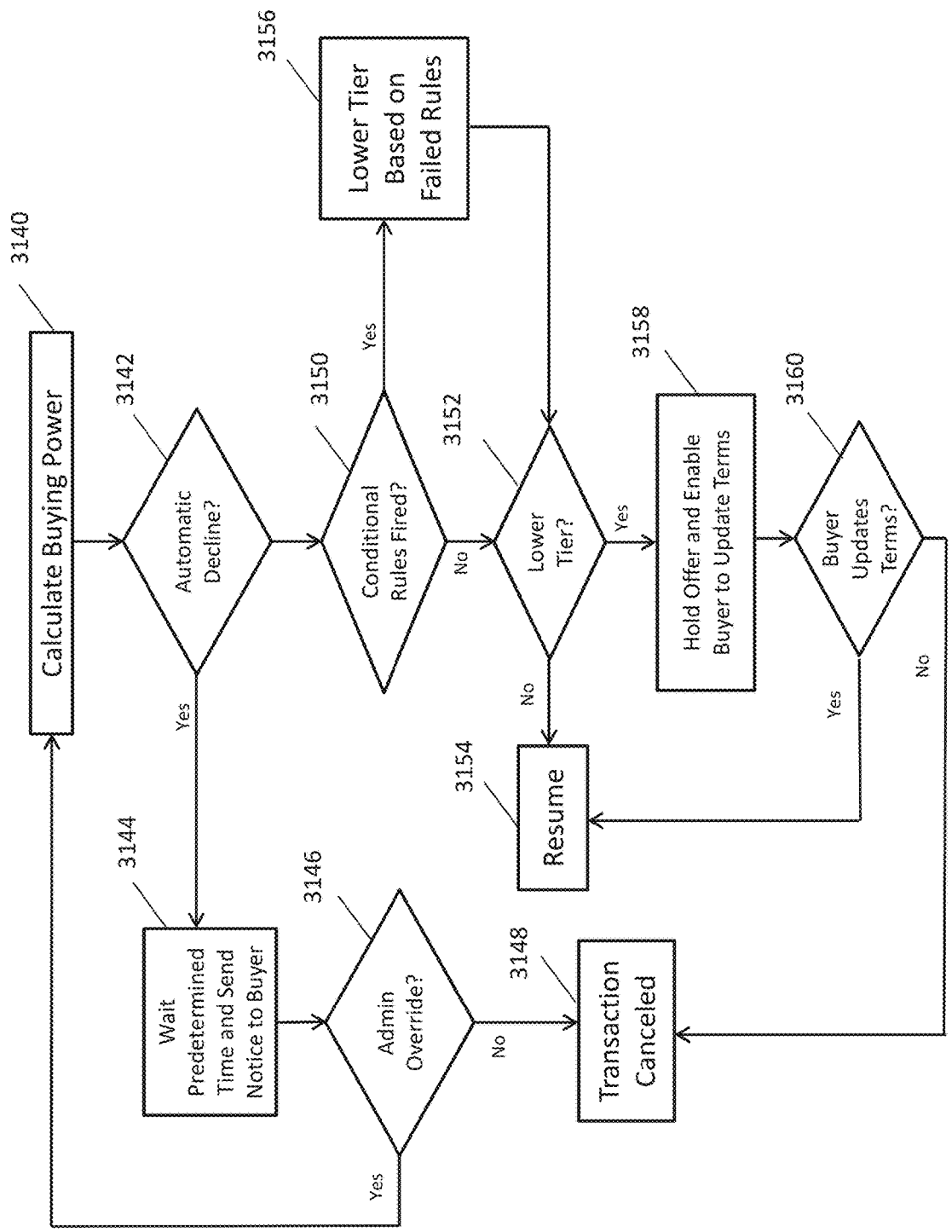

FIG. 31D illustrates a detailed flowchart of a method for calculating and updating a buyer's "buying power" according to an exemplary aspect. According to the exemplary aspects, this method can be performed to calculate the buying power during either of step 3110 and/or step 3126 as described above. Specifically, at step 3140, the server 230 is prompted to automatically calculate or update the buyer's buying power. At step 3142, the buyer may be automatically declined. For example, if based on the buyer's credit report the credit score is below a predetermined threshold, if the buyer's annual income is below a predetermined level, if the buyer is under 18 years old, or the like, the buyer can be automatically declined. In this case, the method proceeds to step 3144 where server 230 can wait a predetermined time period before notifying the buyer and providing the buyer with the option to contact an administrator at step 3146 and seek override of this decision. If the buyer does not seek such override, the method proceeds to step 3148 where all further transactions with this buyer are canceled.

Otherwise, the method proceeds to step 3150 where the server 230 is configured cross reference a number of condition rules to determine whether the buyer has correctly been assigned the current tier (e.g., Tier 1). For example, one conditional rule may be whether the buyer has defaulted on any vehicle loan payment for more than 60 days within the past year. Based on the buyer's credit report previously obtained, the server 230 is configured to automatically determine this fact and, if so, the method will proceed to step 3156 where the buyer will be reduced to a lower tier of buying power. For example, if the above noted condition is satisfied, the server 230 will include a condition that the buyer is reduced by one tier. Step 3152 then determines whether the buying power has actually been reduced by one or more tiers. If the buying power has not been reduced, the method proceeds to step 3154 where the transactional process continues at its current step as shown in FIGS. 31A and 31B. Otherwise, if the buying power has been reduced by a tier, the method proceeds to step 3158, where the server 230 automatically holds the off and provides the user with the option to reset the financing terms based on the current tier (i.e., the updated calculated buying power). Finally, at step 3160, the user is either updates the financing and payment terms (e.g., step 3116 described above) and the process continues at step 3154, or the transaction is canceled at step 3148.

According to yet another exemplary embodiment, the disclosed system and method is configured to initiate the automatic transaction process based on image recognition of distinct vehicle features obtained from digital images of the client device. It should be appreciated that the exemplary embodiment can be executed using a system, such as that described above with respect to FIG. 24.

Figure 33:
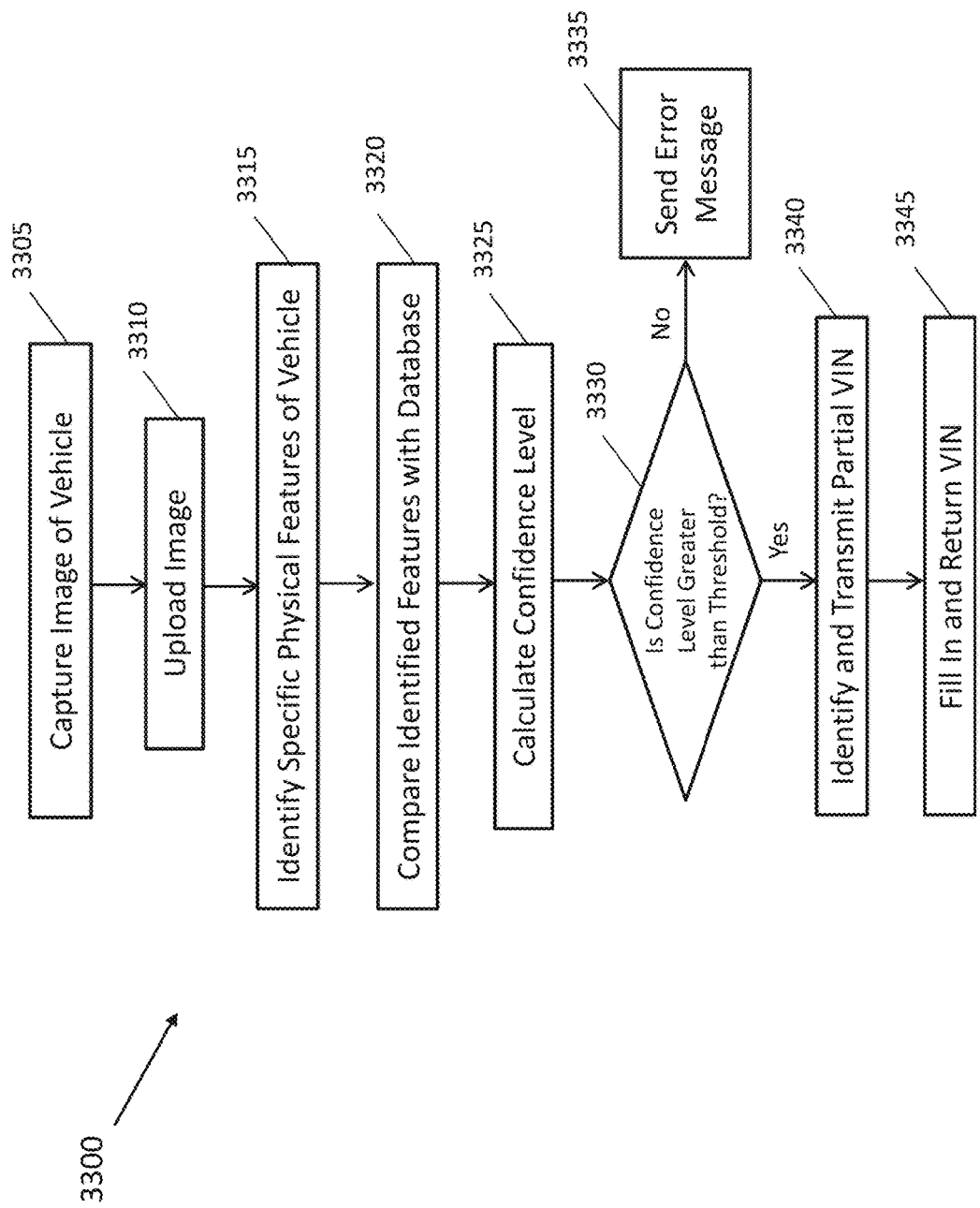
FIG. 33 illustrates a detailed flowchart of a method for automatically identifying and vehicle and receiving vehicle configuration information according to an exemplary embodiment.

FIG. 33 illustrates a detailed flowchart of a method 3300 for automatically identifying and vehicle and receiving vehicle configuration information according to an exemplary embodiment. As shown, initially at step 3305, a user (e.g., an individual seller or automobile seller), for example, captures one or more images of a potential vehicle for sale, using mobile device 2470, for example. The captured image(s) can then be uploaded at step 3310 to gateway/request router 2400, which in turn can relay the images to the OCR module 2410 for analysis.

Figure 34A:
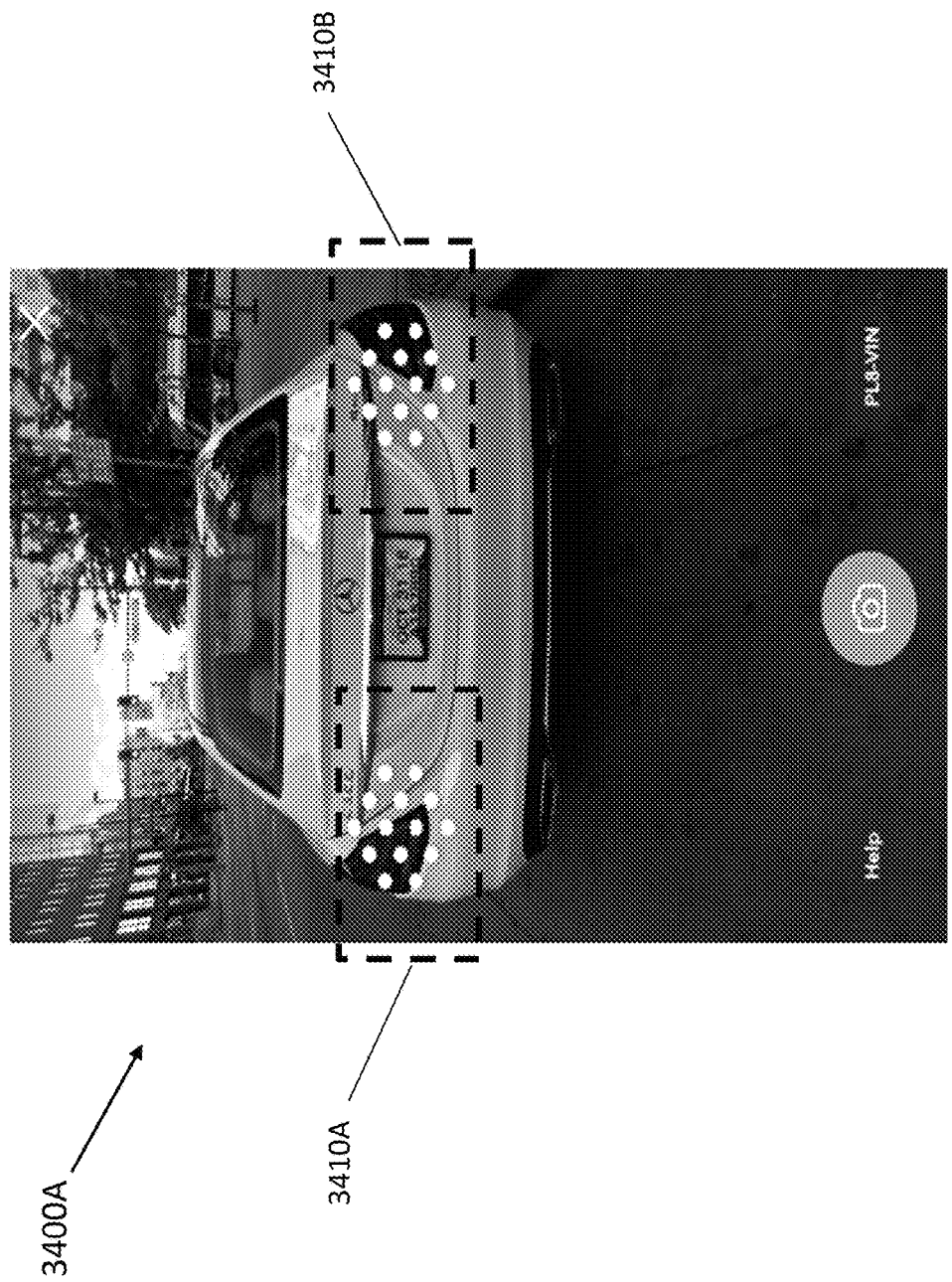
FIG. 34A illustrates a screenshot of an exemplary captured image according to an exemplary aspect.

FIG. 34A illustrates a screenshot of an exemplary captured image 3400A according to an exemplary aspect. As shown, the captured image of the vehicle is for a vehicle of Mercedes make and model C300. According to the exemplary aspect, the OCR module 2410 may include (or be coupled to) a unique vehicle feature database that includes information relating to unique vehicle features and correspond make and model number information. That is, as shown in FIG. 34A, the image may be from the rear of the vehicle (for example). Moreover, using feature recognition techniques (e.g., detecting of reference points or features or corners), the disclosed system is able to scan and identify identifiable physical features of the vehicle of the received image, such as rear tail light, rear window shape, trunk outline, and the like, at step 3315. For example, the physical features can be based on identifiable and recognizable geometric shapes, curved lines, grills, windows, lights, and the like.

Each of these features can then be compared at step 3320 to the unique vehicle feature database to try and identify a match that indicates the make and preferably the model number of the vehicle. For example, the identified unique features obtained from the capture image 3400 (e.g., unique features 3410A and 3410B), which correspond to the rear tail lights, can be identified as tail lights and compared with all vehicle tail lights in the database, for example. If not match is identified, the system may send the user an error message requiring additional images of the vehicle. Alternatively or in addition, upon determination of a match (or a certain percentage of a believed match), the method will proceed to step 3325.

It is noted that in the exemplary aspect, the remote server is configured to identify the specific features in the captured image (e.g., the rear tail light, rear window shape, trunk outline, etc.) and compare these features in the unique vehicle feature database. In alternative aspect, the application on the mobile apparatus may include software capable of identifying one or more of these features (similar to the license plate capture and determination described above) before these identified features are transmitted to the gateway/request router 2400 for processing as described herein.

In yet a refinement of the exemplary aspect, the unique vehicle feature database can be built as part of a neural network of the disclosed system. In other words, each time a user uploads one or more captured images and indicates the corresponding make and model (and possibly other information such as vehicle year), each vehicle component or feature can be identified as a sub-image (e.g., an image of the taillight) and stored in the database with the associated metadata (e.g., make, model and/or year). Then, as other images of similar vehicles having the same make and model number are received, the database can be expanded accordingly so that the system has a more confident understanding that each particular feature (e.g., the taillights) are indeed unique to that make and model. Thus, as this network builds, the system will in turn be able to identify the particular vehicle make and model number with more confidence based on the received images.

In yet a further refinement of the exemplary aspect, the unique feature can include a logo or model number found in the captured image. For example, in the captured image 3400, both the model number "C 300" and the Mercedes logo can be seen and identified (using OCR techniques described above, for example). Thus, these identified unique features can also be compared in the unique vehicle feature database, according to an exemplary aspect, to help further identify the make and model number of the vehicle.

As further shown in FIG. 33, at step 3325, the disclosed system (e.g., the OCR module 2410, which can include a feature comparison module, for example), is configured to calculate a confidence level based on the detected features of the captured image with corresponding features in the unique vehicle feature database. For example, the determined "confidence" can be on a scale of 0% to 100% with 100% being sure that the features of the captured image match the unique feature in the database. It should be appreciated that the confidence level can be set/designed by the system administrator and determined according to a set algorithm. For example, using detected corner features of the taillight, these detected corners can be compared with corners of each taillight image in the database. Based on the comparison results, the confidence level can be calculated (e.g., as 75% confidence of a match).

At step 3330, the calculated confidence level is compared with a predetermined percentage threshold, which can also be set by a system administrator for example. If the calculated confidence level does not meet the threshold (e.g., 80%), the system may be configured to transmit a message back to the user on the mobile device 2470 (i.e., step 3335), to display an error message, such "we could not detect a car, please try again." The user can then be prompted to resubmit one or more additional captured image of the vehicle.

Otherwise, if the calculated confidence level satisfies or exceeds the predetermined threshold at step 3330, the method proceeds to step 3340. In this instance, the disclosed system can identify the corresponding make and model number (and possibly year) of the vehicle based on the unique features. In this example, the make and model is a Mercedes C 300 as described above. This information can then be provided to VIN decoder 2430 for example, which may be further configured to identify the portion of the VIN that corresponds to the identified make, model and possibly vehicle year. This information can be collected from a known third-party database, for example. After the partial VIN number is identified at step 3340, this number can be transmitted back to the mobile device 2470, where the user is further prompted to complete the remainder of the VIN corresponding to trim level and serial number.

Figure 34B:
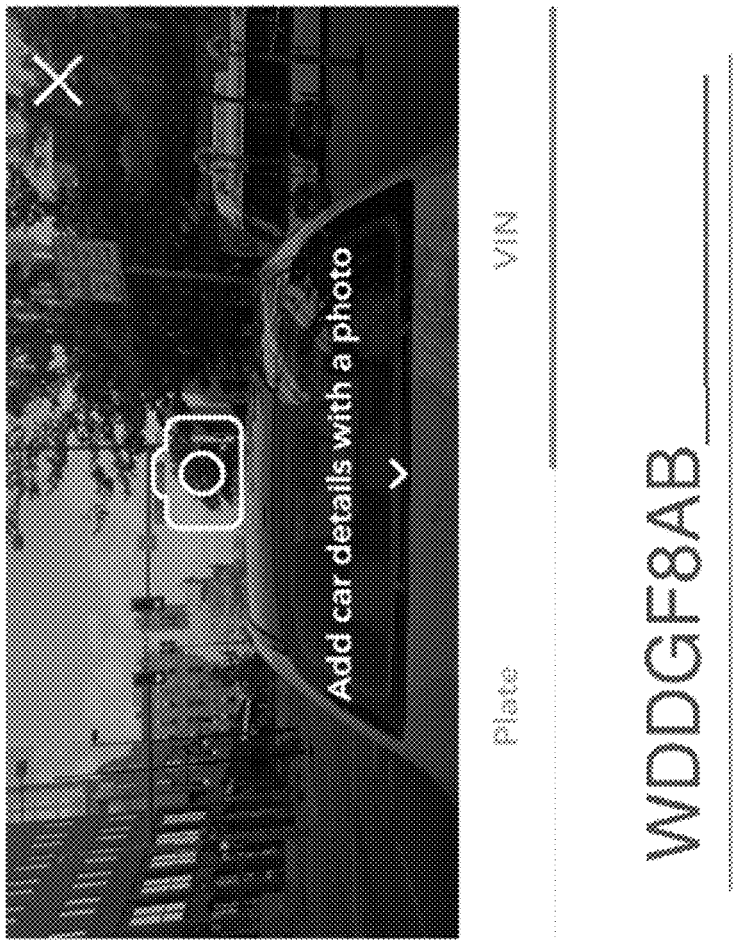
FIG. 34B illustrates a screenshot of an exemplary user prompt in a user interface for entering the complete VIN number according to an exemplary aspect.

FIG. 34B illustrates a screenshot of an exemplary user prompt 3400B in a user interface for entering the complete VIN number according to an exemplary aspect. As shown, the partial VIN number is displayed as "WDDGF8AB_____". The user is then prompted to fill in the remainder of the VIN. At step 3345, then user can then transmit the remainder of the VIN number, either by entering alphanumeric characters or taking an image of the VIN number, which is found in the "lower right hand corner of the windshield", for example. Once this VIN number is transmitted back to the gateway/request router 2400 at step 3345, the claim method can proceed to step 2540 of FIG. 25, for example, wherein the vehicle configuration information can be collected and presented to the mobile device as further explained above. The automated vehicle transaction process can then proceed as described above.

Figure 34C:
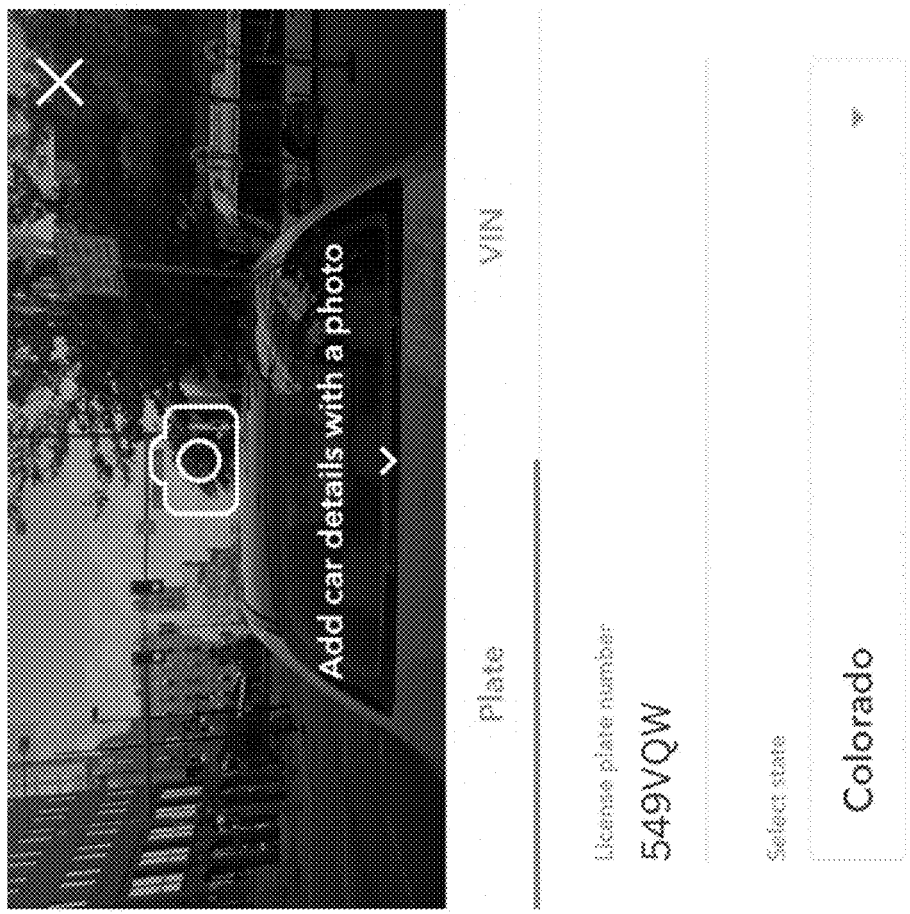
FIG. 34C illustrates a screen shot of a user interface including a correcting prompt for the user image capture according to an exemplary aspect.

In yet a further refinement of the exemplary aspects described above, the disclosed system and method is configured to provide a measure of redundancy (i.e., cross checking) to determine whether the state prediction and/or text OCR was incorrect. That is, the vehicle features identified using the feature comparison described above may identify a 2014 Mercedes Benz C 300, but this information can be used as a redundancy check in an exemplary aspect. More particularly, in this example, the license and registration, which can also be transmitted as described above, may be for a different type of vehicle (e.g., the registration may be registered to a licensed driver who is registered to own a Honda Accord). Therefore, if the system identifies the inconsistency between the registered vehicle and capture image, the user may be notified of this inconsistency or error via the user interface of the mobile device. In this aspect, the user may be further prompted to confirm that the above license plate information is correct. In other words, when the camera button of the mobile device 2470 is clicked to begin the process, the license plate is decoded using the exemplary aspects described above, but if the vehicle registration details do not match the prediction from the image, a confirmation form is displayed to prompt the user to correct the license plate state or text. An exemplary screen shot of this correcting prompt 3400C for a user interface is disclosed in FIG. 34C, according to an exemplary aspect. Once confirmed, the exemplary method and algorithms for facilitating the automatic transaction and proceed as described above.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other apparatuses, devices, or processes. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A system for automatically identifying vehicle information and facilitating a transaction related to a vehicle, the system comprising:
   a remote server having a computer processor and configured to:
      receive, from a first computing apparatus, an optical image captured by a camera of the first computing apparatus, with the optical image including at least one distinguishing feature of the vehicle,
      automatically scan the captured optical image to identify the at least one distinguishing feature of the vehicle,
      automatically compare the identified at least one distinguishing feature with a unique feature database that includes respective vehicle identification information associated with each of a plurality of unique vehicle features,
      automatically identify the respective vehicle identification information that corresponds to the vehicle upon determining a match between the identified at least one distinguishing feature of the vehicle and the respective one of the plurality of unique vehicle features,
      automatically identify corresponds vehicle configuration information based on the identified vehicle identification information,
      automatically transmit the identified vehicle configuration information to the first computing apparatus to be displayed thereon, and
      automatically provide access to vehicle sales information in response to a posting request from the first computing apparatus, wherein the posting request includes at least an offered sales price; and a second computing apparatus configured to display on a user interface the vehicle sales information and to automatically initiate the transaction related to the vehicle in response to a user input on the user interface of the second computing apparatus, wherein the remote server is further configured to:
automatically facilitate the transaction related to the vehicle upon the second mobile apparatus initiating the transaction based on the user input, and receive confirmation from both users of the respective computing apparatuses that the users have agreed to transfer ownership of the vehicle and, in response to the confirmation, facilitate the transaction as a transfer of ownership of the vehicle between the users.

2. The system according to claim 1, wherein the remote server is further configured to:
receive an electronic image of a driver's license of the user of the second computing apparatus,
automatically access credit information of the user of the second computing apparatus based on identification information determined from the electronic image of the driver's license,
automatically create a financing plan based on the accessed credit information, and
present the financing plan on the second computing apparatus.

3. The system according to claim 2, wherein the remote server is further configured to:
receive, from the second computing apparatus, an electronic confirmation of the financing plan and an offered purchase price, in response to the electronic confirmation,
automatically transmit the offered purchase price to the first computing apparatus for display thereon, and
receive, from the first computing apparatus, an electronic acceptance that the user of the first computing apparatus has accepted the offered purchase price.

4. The system according to claim 1, wherein the remote server is further configured to:
identify, based on respective GPS location information, a location of each of the first and second computing apparatuses;
access a database to identify a suggested test drive location based on the respective location of each of the first and second computing apparatuses; and
transmit the suggested test drive location to each of the first and second computing apparatuses.

5. The system according to claim 1, wherein the remote server is further configured to:
automatically access credit information of the user of the second computing apparatus based on identification information received from the user of the second computing apparatus,
automatically generate a buying power of the user of the second computing apparatus based on the accessed credit information, the buying power indicative of at least one of a required loan amount range, a required monthly payment range, and a required loan to vehicle value ratio, automatically generate a plurality of user configurable interfaces to be displayed on the user interface of the second computing apparatus that enable the user of the second computing apparatus to define a financing plan and payment offer for the vehicle, and receive the user defined financing plan and payment offer and generate a purchase offer to be automatically presented on the user interface of the first computing apparatus to facilitate the transaction of the vehicle.

6. The system according to claim 5, wherein the remote server automatically generates the buying power of the user of the second computing apparatus by assigning the user to one of a plurality of tiers based on the accessed credit information.

7. The system according to claim 6, wherein the remote server automatically generates the plurality of user configurable interfaces by:
accessing a predefined matrix in a database;
using the predefined matrix to compare the buying power of the user of the second computing apparatus with the vehicle sales information of the vehicle; and
setting minimum and maximum values for user adjustable sliders in at least a portion of the plurality of user configurable interfaces.

8. The system according to claim 1, further comprising a license plate detector of the first computing apparatus that is configured to:
process, by a processor, the captured optical image to identify one or more object images from the captured optical image, each of said one or more object images including a candidate vehicle license plate image;
crop, by the processor, the captured image to said identified one or more of the object images;
score, by the processor, each of said cropped one or more of the object images based on a probability that the cropped object image comprises the vehicle license plate image,
wherein each of the cropped one or more object images is scored by:
detecting a plurality of alphanumeric characters in the object image, and
applying a score based on a position of one of the plurality of characters relative to a position of another one of the plurality of characters, and based on said scored object images, process, by the processor, the captured optical image signal to recover information from the vehicle license plate image.

9. The system according to claim 8, wherein the first computing apparatus further comprises a display and a rendering module configured to render the captured optical image to the display and overlay a detection indicator on each of said identified one or more of the object images in the captured optical image.

10. The system according to claim 8, wherein the first computing apparatus further comprises an image filter configured to:
apply a set of filter parameters to the captured optical image; and
dynamically adjust the parameters based on at least one of color temperature, ambient light, object image location, and the location of the apparatus.

* * * * *

UNITED STATES PATENT AND TRADEMARK OFFICE
CERTIFICATE OF CORRECTION

PATENT NO. : 11,436,652 B1
APPLICATION NO. : 17/110219
DATED : September 6, 2022
INVENTOR(S) : Anthony Russell Wilbert et al.

It is certified that error appears in the above-identified patent and that said Letters Patent is hereby corrected as shown below:

On the Title Page

Please delete item (63) Related U.S. Application Data in its entirety and substitute therefore the following:
-- (63) Related U.S. Application Data
Continuation of application No. 15/785,741, filed on Oct. 17, 2017, now Pat. No. 10,867,327, which is a continuation-in-part of application No. 15/363,960, filed on Nov. 29, 2016, now Pat. No. 9,818,154, which is a continuation-in-part of application No. 14/716,808, filed on May 19, 2015, now Pat. No. 9,754,171, and a continuation-in-part of application No. 14/716,738, filed on May 19, 2015, now Pat. No. 9,607,236, and a continuation-in-part of application No. 14/716,743, filed on May 19, 2015, now Pat. No. 9,779,318, and a continuation-in-part of application No. 14/716,793, filed on May 19, 2015, now Pat. No. 10,572,758, and a continuation-in-part of application No. 14/716,651, filed on May 19, 2015, now Pat. No. 9,589,201, and a continuation-in-part of application No. 14/716,445, filed on May 19, 2015, now Pat. No. 9,563,814, said application No. 14/716,808, filed May 19, 2015, is a continuation-in-part of application No. 14/613,323, filed on Feb. 3, 2015, now Pat. No. 10,579,892, said application No. 14/716,738, filed May 19, 2015, is a continuation-in-part of application No. 14/613,323, filed on Feb. 3, 2015, now Pat. No. 10,579,892, said application No. 14/716,743, filed May 19, 2015, is a continuation-in-part of application No. 14/613,323, filed on Feb. 3, 2015, now Pat. No. 10,579,892, said application No. 14/716,793, filed May 19, 2015, is a continuation-in-part of application No. 14/613,323, filed on Feb. 3, 2015, now Pat. No. 10,579,892, said application No. 14/716,651, filed May 19, 2015, is a continuation-in-part of application No. 14/613,323, filed on Feb. 3, 2015, now Pat. No. 10,579,892, said application No. 14/716,445, filed on May 19, 2015, is a continuation-in-part of application No. 14/613,323, filed on Feb. 3, 2015, now Pat. No. 10,579,892, which is a continuation-in-part of application No. 14/455,841, filed on Aug. 8, 2014, now abandoned, and a continuation-in-part of application No. 14/318,397, filed on Jun. 27, 2014, now abandoned --.

Signed and Sealed this
Twenty-seventh Day of December, 2022

Katherine Kelly Vidal
*Director of the United States Patent and Trademark Office*